United States Patent
Iyer et al.

(10) Patent No.: US 12,034,994 B2
(45) Date of Patent: *Jul. 9, 2024

(54) REMOTELY CONTROLLING PLAYBACK DEVICES

(71) Applicant: Apple Inc., Cupertino, CA (US)

(72) Inventors: Deepak Iyer, Sunnyvale, CA (US);
Thomas Alsina, Burlingame, CA (US);
Edward T. Schmidt, Burlingame, CA (US); Elena Leyfman, Los Gatos, CA (US); David P. Saracino, Alameda, CA (US); Astrid Yi, Sunnyvale, CA (US);
Adam A. Sonnanstine, San Francisco, CA (US); Jonathan A. Bennett, San Francisco, CA (US); Gregory R. Chapman, San Jose, CA (US); Aparna S. Akella, Mountain View, CA (US);
Shreyas Nandagudi Sreesha, Los Altos, CA (US); Johannes P. Schmidt, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,966

(22) Filed: Apr. 5, 2022

(65) Prior Publication Data

US 2022/0232276 A1   Jul. 21, 2022

Related U.S. Application Data

(63) Continuation of application No. 16/287,960, filed on Feb. 27, 2019, now Pat. No. 11,297,369.
(Continued)

(51) Int. Cl.
*H04N 21/436* (2011.01)
*H02J 13/00* (2006.01)
(Continued)

(52) U.S. Cl.
CPC . *H04N 21/41265* (2020.08); *H02J 13/00026* (2020.01); *H04L 67/104* (2013.01);
(Continued)

(58) Field of Classification Search
CPC ........... H04N 21/4126; H04N 21/4131; H04N 21/4104; H04N 21/436; H04N 21/43615;
(Continued)

(56) References Cited

U.S. PATENT DOCUMENTS 4,807,224 A   2/1989  Naron et al.
5,534,911 A   7/1996  Levitan
(Continued)

FOREIGN PATENT DOCUMENTS

CN   102959544 A   3/2013
CN   103327377 A   9/2013
(Continued)

OTHER PUBLICATIONS

"Communication Relating to the Results of the Partial International Search" received in corresponding PCT Application No. PCT/US2006/062355 dated May 3, 2007.
(Continued)

*Primary Examiner* — Kyu Chae
(74) *Attorney, Agent, or Firm* — Invoke

(57) ABSTRACT

In some implementations, a system can be configured to allow remote control devices to quietly obtain status information related to various audio/video playback devices. For example, a streaming device (e.g., a user device, phone, etc.) can establish a streaming connection to a playback device. The playback device can be configured to only accept a single streaming connection (i.e., master connection). A remote control device (e.g., a user device, phone, etc.) can quietly connect (i.e., control connection) to the playback device without interrupting the master connection to obtain
(Continued)

status information related to the playback device and or the media being streamed to the playback device. The remote control device can provide commands through the control connection to adjust the playback of the streamed media at the playback device.

22 Claims, 23 Drawing Sheets

Related U.S. Application Data

(60) Provisional application No. 62/679,967, filed on Jun. 3, 2018, provisional application No. 62/650,728, filed on Mar. 30, 2018.

(51) Int. Cl.
*H04L 67/104* (2022.01)
*H04L 67/1061* (2022.01)
*H04L 67/1087* (2022.01)
*H04N 21/41* (2011.01)
*H04N 21/4363* (2011.01)
*H04N 21/482* (2011.01)
*H04W 84/18* (2009.01)
*H04W 84/20* (2009.01)

(52) U.S. Cl.
CPC ...... *H04L 67/1051* (2013.01); *H04L 67/1061* (2013.01); *H04L 67/1068* (2013.01); *H04L 67/1093* (2013.01); *H04N 21/4104* (2013.01); *H04N 21/4126* (2013.01); *H04N 21/4131* (2013.01); *H04N 21/43615* (2013.01); *H04N 21/4363* (2013.01); *H04N 21/482* (2013.01); *H04W 84/18* (2013.01); *H04W 84/20* (2013.01)

(58) Field of Classification Search
CPC ......... H04N 21/4363; H04N 21/41265; H04N 21/482; H04N 21/25816; H04W 12/003; H04W 84/18; H04W 84/20; H02J 13/00026; H04L 67/104; H04L 67/1051; H04L 67/1061; H04L 67/1068; H04L 67/1093

See application file for complete search history.

(56) References Cited

U.S. PATENT DOCUMENTS

| | | | |
|---|---|---|---|
| 5,535,381 A | 7/1996 | Kopper |
| 5,553,222 A | 9/1996 | Milne et al. |
| 5,559,945 A | 9/1996 | Beaudet et al. |
| 5,583,993 A | 12/1996 | Foster et al. |
| 5,587,404 A | 12/1996 | Kroener et al. |
| 5,613,863 A | 3/1997 | Klaus et al. |
| 5,616,876 A | 4/1997 | Cluts |
| 5,640,566 A | 6/1997 | Victor et al. |
| 5,664,044 A | 9/1997 | Ware |
| 5,664,226 A | 9/1997 | Czako et al. |
| 5,666,530 A | 9/1997 | Clark et al. |
| 5,696,948 A | 12/1997 | Cruz et al. |
| 5,709,521 A | 1/1998 | Glass et al. |
| 5,710,922 A | 1/1998 | Alley et al. |
| 5,721,949 A | 2/1998 | Smith et al. |
| 5,722,041 A | 2/1998 | Freadman |
| 5,727,202 A | 3/1998 | Kucala |
| 5,739,451 A | 4/1998 | Winsky et al. |
| 5,745,583 A | 4/1998 | Koizumi et al. |
| 5,751,997 A | 5/1998 | Kullick et al. |
| 5,790,521 A | 8/1998 | Lee et al. |
| 5,815,297 A | 9/1998 | Ciciora |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,875,354 A | 2/1999 | Charlton et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,931,906 A | 8/1999 | Fidelibus et al. |
| 5,953,350 A | 9/1999 | Higgins |
| 5,963,916 A | 10/1999 | Kaplan |
| 5,969,283 A | 10/1999 | Looney et al. |
| 6,000,000 A | 12/1999 | Hawkins et al. |
| 6,006,274 A | 12/1999 | Hawkins et al. |
| 6,008,777 A | 12/1999 | Yiu |
| 6,038,199 A | 3/2000 | Pawlowski et al. |
| 6,041,023 A | 3/2000 | Lakhansingh |
| 6,061,306 A | 5/2000 | Buchheim |
| 6,085,252 A | 7/2000 | Zhu et al. |
| 6,092,119 A | 7/2000 | Rossmere et al. |
| 6,101,591 A | 8/2000 | Foster et al. |
| 6,125,369 A | 9/2000 | Wu et al. |
| 6,138,245 A | 10/2000 | Son et al. |
| 6,166,314 A | 12/2000 | Weinstock et al. |
| 6,172,948 B1 | 1/2001 | Keller et al. |
| 6,208,044 B1 | 3/2001 | Viswanadham et al. |
| 6,212,359 B1 | 4/2001 | Knox |
| 6,216,131 B1 | 4/2001 | Liu et al. |
| 6,240,555 B1 | 5/2001 | Shoff et al. |
| 6,243,328 B1 | 6/2001 | Fenner et al. |
| 6,243,725 B1 | 6/2001 | Hempleman et al. |
| 6,243,772 B1 | 6/2001 | Ghori et al. |
| 6,247,135 B1 | 6/2001 | Feague |
| 6,248,946 B1 | 6/2001 | Dwek |
| 6,263,313 B1 | 7/2001 | Milsted et al. |
| 6,263,503 B1 | 7/2001 | Margulis |
| 6,272,545 B1 | 8/2001 | Flanagin et al. |
| 6,282,714 B1 | 8/2001 | Ghori et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,374,177 B1 | 4/2002 | Lee et al. |
| 6,380,947 B1 | 4/2002 | Stead |
| 6,389,467 B1 | 5/2002 | Eyal |
| 6,397,388 B1 | 5/2002 | Allen |
| 6,411,943 B1 | 6/2002 | Crawford |
| 6,429,880 B2 | 8/2002 | Marcos et al. |
| 6,453,281 B1 | 9/2002 | Walters et al. |
| 6,489,986 B1 | 12/2002 | Allen |
| 6,490,432 B1 | 12/2002 | Wegener et al. |
| 6,493,758 B1 | 12/2002 | McLain |
| 6,523,124 B1 | 2/2003 | Lunsford et al. |
| 6,529,233 B1 | 3/2003 | Allen |
| 6,529,804 B1 | 3/2003 | Draggon et al. |
| 6,546,428 B2 | 4/2003 | Baber et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,587,480 B1 | 7/2003 | Sanders |
| 6,621,768 B1 | 9/2003 | Keller et al. |
| 6,630,963 B1 | 10/2003 | Billmaier |
| 6,636,873 B1 | 10/2003 | Carini et al. |
| 6,659,861 B1 | 12/2003 | Faris et al. |
| 6,664,981 B2 | 12/2003 | Ashe et al. |
| 6,665,803 B2 | 12/2003 | Lunsford et al. |
| 6,684,060 B1 | 1/2004 | Curtin |
| 6,694,200 B1 | 2/2004 | Naim |
| 6,718,348 B1 | 4/2004 | Novak et al. |
| 6,721,489 B1 | 4/2004 | Benyamin et al. |
| 6,728,585 B2 | 4/2004 | Neoh |
| 6,728,729 B1 | 4/2004 | Jawa et al. |
| 6,731,312 B2 | 5/2004 | Robbin |
| 6,744,738 B1 | 6/2004 | Park et al. |
| 6,757,913 B2 | 6/2004 | Knox |

(56) References Cited

U.S. PATENT DOCUMENTS

| | | |
|---|---|---|
| 6,760,721 B1 | 7/2004 | Chasen et al. |
| 6,763,345 B1 | 7/2004 | Hempleman et al. |
| 6,766,376 B2 | 7/2004 | Price |
| 6,779,019 B1 | 8/2004 | Mousseau et al. |
| 6,785,542 B1 | 8/2004 | Blight et al. |
| 6,794,566 B2 | 9/2004 | Pachet |
| 6,798,838 B1 | 9/2004 | Ngo |
| 6,801,964 B1 | 10/2004 | Mahdavi |
| 6,831,881 B2 | 12/2004 | Patil et al. |
| 6,845,398 B1 | 1/2005 | Galensky et al. |
| 6,874,037 B1 | 3/2005 | Abram et al. |
| 6,898,159 B2 | 5/2005 | Kudo |
| 6,920,179 B1 | 7/2005 | Anand et al. |
| 6,925,595 B1 | 8/2005 | Whitledge et al. |
| 6,928,433 B2 | 8/2005 | Goodman et al. |
| 6,929,058 B2 | 8/2005 | Liu et al. |
| 6,935,627 B2 | 8/2005 | Jung |
| 6,941,324 B2 | 9/2005 | Plastina et al. |
| 6,944,880 B1 | 9/2005 | Allen |
| 6,947,598 B2 | 9/2005 | Yogeshwar et al. |
| 6,956,562 B1 | 10/2005 | O'Hara et al. |
| 6,959,288 B1 | 10/2005 | Medina et al. |
| 6,959,562 B2 | 11/2005 | Navedo et al. |
| 6,978,127 B1 | 12/2005 | Bulthuis et al. |
| 6,981,259 B2 | 12/2005 | Luman et al. |
| 6,985,966 B1 | 1/2006 | Gupta et al. |
| 6,987,221 B2 | 1/2006 | Platt |
| 6,993,532 B1 | 1/2006 | Platt et al. |
| 6,993,722 B1 | 1/2006 | Greer et al. |
| 6,999,826 B1 | 2/2006 | Zhou et al. |
| 7,010,758 B2 | 3/2006 | Bate |
| 7,016,443 B1 | 3/2006 | Splett |
| 7,022,905 B1 | 4/2006 | Hinman et al. |
| 7,024,214 B2 | 4/2006 | Loveland |
| 7,024,491 B1 | 4/2006 | Hanmann et al. |
| 7,024,575 B2 | 4/2006 | Lienhart et al. |
| 7,034,891 B2 | 4/2006 | Joung et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,310 B2 | 7/2006 | Hirayama et al. |
| 7,082,320 B2 | 7/2006 | Kattukaran et al. |
| 7,084,898 B1 | 8/2006 | Firestone et al. |
| 7,096,271 B1 | 8/2006 | Omoigui et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,143,939 B2 | 12/2006 | Henzerling |
| 7,146,322 B2 | 12/2006 | Cowgill |
| 7,166,791 B2 | 1/2007 | Robbin et al. |
| 7,174,560 B1 | 2/2007 | Crinon |
| 7,184,774 B2 | 2/2007 | Robinson et al. |
| 7,185,084 B2 | 2/2007 | Sirivara et al. |
| 7,194,692 B2 | 3/2007 | Marcos et al. |
| 7,200,357 B2 | 4/2007 | Janik et al. |
| 7,228,054 B2 | 6/2007 | Cowgill |
| 7,260,714 B2 | 8/2007 | Dawson et al. |
| 7,266,713 B2 | 9/2007 | Lienhart et al. |
| 7,281,141 B2 | 10/2007 | Elkayam et al. |
| 7,283,880 B2 | 10/2007 | Dick |
| 7,289,393 B2 | 10/2007 | Keller et al. |
| 7,295,809 B2 | 11/2007 | Moore |
| 7,295,983 B2 | 11/2007 | Fujiwara et al. |
| 7,302,239 B2 | 11/2007 | Jitsuhara |
| 7,305,691 B2 | 12/2007 | Cristofalo |
| 7,312,785 B2 | 12/2007 | Tsuk et al. |
| 7,330,868 B2 | 2/2008 | Kawasaki et al. |
| 7,336,675 B2 | 2/2008 | Naik et al. |
| 7,343,553 B1 | 3/2008 | Kaye |
| 7,346,698 B2 | 3/2008 | Hannaway |
| 7,359,671 B2 | 4/2008 | Richenstein et al. |
| 7,367,701 B2 | 5/2008 | Lee |
| 7,369,532 B2 | 5/2008 | Silvester |
| 7,370,129 B2 | 5/2008 | Green et al. |
| 7,391,791 B2 | 6/2008 | Balassanian et al. |
| 7,406,294 B1 | 7/2008 | Liu |
| 7,418,472 B2 | 8/2008 | Shoemaker et al. |
| 7,418,673 B2 | 8/2008 | Oh |
| 7,424,024 B2 | 9/2008 | Chen et al. |
| 7,430,753 B2 | 9/2008 | Gray et al. |
| 7,437,158 B2 | 10/2008 | Russell |
| 7,444,388 B1 | 10/2008 | Svendsen |
| 7,447,815 B2 | 11/2008 | Weaver et al. |
| 7,461,130 B1 | 12/2008 | Abdelaziz et al. |
| 7,469,283 B2 | 12/2008 | Eyal et al. |
| 7,471,988 B2 | 12/2008 | Smith et al. |
| 7,474,677 B2 | 1/2009 | Trott |
| 7,477,653 B2 | 1/2009 | Smith et al. |
| 7,480,746 B2 | 1/2009 | Simon et al. |
| 7,483,538 B2 | 1/2009 | McCarty et al. |
| 7,502,604 B2 | 3/2009 | Knox |
| 7,505,483 B2 | 3/2009 | Jeon et al. |
| 7,508,815 B2 | 3/2009 | Lapeyre et al. |
| 7,519,681 B2 | 4/2009 | Edwards et al. |
| 7,519,686 B2 | 4/2009 | Hong et al. |
| 7,532,862 B2 | 5/2009 | Cheshire |
| 7,539,777 B1 | 5/2009 | Aitken |
| 7,542,784 B2 | 6/2009 | Passier et al. |
| 7,543,245 B2 | 6/2009 | Irimajiri |
| 7,555,291 B2 | 6/2009 | Waessingbo |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |
| 7,620,011 B2 | 11/2009 | Kim et al. |
| 7,627,343 B2 | 12/2009 | Fadell et al. |
| 7,634,227 B2 | 12/2009 | De Jong |
| 7,647,346 B2 | 1/2010 | Silverman et al. |
| 7,650,470 B2 | 1/2010 | Poo |
| 7,657,706 B2 | 2/2010 | Iyer et al. |
| 7,680,849 B2 | 3/2010 | Heller et al. |
| 7,689,095 B2 | 3/2010 | Sugiyama et al. |
| 7,698,297 B2 | 4/2010 | Jawa et al. |
| 7,698,723 B2 | 4/2010 | Hicks et al. |
| 7,706,901 B2 | 4/2010 | Berreth |
| 7,724,780 B2 | 5/2010 | Baird et al. |
| 7,725,912 B2 | 5/2010 | Margulis |
| 7,734,688 B2 | 6/2010 | Langdon |
| 7,765,326 B2 | 7/2010 | Robbin et al. |
| 7,769,903 B2 | 8/2010 | Robbin et al. |
| 7,797,446 B2 | 9/2010 | Heller et al. |
| 7,821,574 B2 | 10/2010 | Black |
| 7,827,259 B2 | 11/2010 | Heller et al. |
| 7,853,341 B2 | 12/2010 | McCarty et al. |
| 7,890,661 B2 | 2/2011 | Spurgat et al. |
| 7,899,915 B2 | 3/2011 | Reisman |
| 7,903,690 B2 | 3/2011 | Wakid |
| 7,950,037 B2 | 5/2011 | Mensch |
| 7,996,505 B2 | 8/2011 | Krantz et al. |
| 8,037,220 B2 | 10/2011 | Moore et al. |
| 8,041,438 B2 | 10/2011 | Batson et al. |
| 8,169,938 B2 | 5/2012 | Duchscher et al. |
| 8,171,177 B2 | 5/2012 | Rostaing et al. |
| 8,184,657 B2 | 5/2012 | Dacosta |
| 8,185,674 B2 | 5/2012 | Moore et al. |
| 8,214,447 B2 | 7/2012 | Deslippe et al. |
| 8,266,657 B2 | 9/2012 | Margulis |
| 8,284,739 B2 | 10/2012 | Doyle et al. |
| 8,285,727 B2 | 10/2012 | Weber et al. |
| 8,301,790 B2 | 10/2012 | Morrison et al. |
| 8,374,087 B2 | 2/2013 | Dacosta |
| 8,423,893 B2 | 4/2013 | Ramsay et al. |
| 8,443,038 B2 | 5/2013 | Robbin et al. |
| 8,539,533 B2 | 9/2013 | Caspi et al. |
| 8,689,036 B2 | 4/2014 | Millington et al. |
| 8,797,926 B2 | 8/2014 | Kearney et al. |
| 8,918,541 B2 | 12/2014 | Morrison et al. |
| 8,957,972 B2 | 2/2015 | Gluskin et al. |
| 9,182,777 B2 | 11/2015 | Millington |
| 9,189,011 B2 | 11/2015 | Millington |
| 9,195,258 B2 | 11/2015 | Millington |

(56) References Cited

U.S. PATENT DOCUMENTS

| | | |
|---|---|---|
| 9,207,905 B2 | 12/2015 | Millington |
| 9,389,745 B1 | 7/2016 | Leatham |
| 9,417,689 B1 | 8/2016 | Ramaswamy |
| 9,448,683 B2 | 9/2016 | Robbin et al. |
| 9,729,630 B2 | 8/2017 | Bradley et al. |
| 9,763,018 B1 | 9/2017 | McPherson et al. |
| 9,826,012 B2 | 11/2017 | Hao et al. |
| 10,209,953 B2 | 2/2019 | Millington |
| 10,362,346 B2 | 7/2019 | Mayalil et al. |
| 10,439,896 B2 | 10/2019 | Millington et al. |
| 10,448,080 B1* | 10/2019 | Nijim ............ H04N 21/6131 |
| 10,523,740 B2* | 12/2019 | Igoe ............ H04N 21/42204 |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1 | 1/2002 | Baber et al. |
| 2002/0019984 A1 | 2/2002 | Rakib |
| 2002/0022453 A1 | 2/2002 | Balog et al. |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Coles et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta et al. |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2002/0196912 A1 | 12/2002 | Norris |
| 2003/0013332 A1 | 1/2003 | Lin |
| 2003/0013492 A1 | 1/2003 | Bokhari et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0045955 A1 | 3/2003 | Janik |
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1 | 9/2003 | Cheshire |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |
| 2004/0017997 A1 | 1/2004 | Cowgill |
| 2004/0027930 A1 | 2/2004 | Kudo |
| 2004/0031058 A1 | 2/2004 | Reisman |
| 2004/0045030 A1 | 3/2004 | Reynolds et al. |
| 2004/0055446 A1 | 3/2004 | Robbin et al. |
| 2004/0057446 A1 | 3/2004 | Varsa et al. |
| 2004/0068536 A1 | 4/2004 | Demers et al. |
| 2004/0072584 A1 | 4/2004 | Kern |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139233 A1 | 7/2004 | Kellerman et al. |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1 | 9/2004 | Weber et al. |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215611 A1 | 10/2004 | Jawa et al. |
| 2004/0215810 A1 | 10/2004 | Tan et al. |
| 2004/0216108 A1 | 10/2004 | Robbin |
| 2004/0220926 A1 | 11/2004 | Lamkin et al. |
| 2004/0221088 A1 | 11/2004 | Lisitsa et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Guillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker et al. |
| 2005/0089052 A1 | 4/2005 | Chen et al. |
| 2005/0147130 A1 | 7/2005 | Hurwitz et al. |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0210101 A1 | 9/2005 | Janik |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1 | 12/2005 | Kearney et al. |
| 2005/0282494 A1 | 12/2005 | Kossi et al. |
| 2005/0289224 A1 | 12/2005 | Deslippe et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Lin |
| 2006/0062242 A1 | 3/2006 | Dacosta |
| 2006/0062243 A1 | 3/2006 | Dacosta |

(56) References Cited

U.S. PATENT DOCUMENTS

| | | |
|---|---|---|
| 2006/0067463 A1 | 3/2006 | Hack et al. |
| 2006/0069724 A1 | 3/2006 | Langdon |
| 2006/0074637 A1 | 4/2006 | Berreth |
| 2006/0083194 A1 | 4/2006 | Dhrimaj et al. |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling et al. |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159109 A1 | 7/2006 | Lamkin et al. |
| 2006/0167982 A1 | 7/2006 | Jawa et al. |
| 2006/0168340 A1 | 7/2006 | Heller et al. |
| 2006/0168351 A1 | 7/2006 | Ng et al. |
| 2006/0224620 A1 | 10/2006 | Silverman et al. |
| 2006/0245451 A1 | 11/2006 | Wakid |
| 2006/0253279 A1 | 11/2006 | Sung |
| 2006/0274747 A1 | 12/2006 | Duchscher et al. |
| 2006/0277216 A1 | 12/2006 | Shukhman |
| 2006/0288057 A1 | 12/2006 | Collins et al. |
| 2007/0033052 A1 | 2/2007 | Cowgill |
| 2007/0038941 A1 | 2/2007 | Wysocki et al. |
| 2007/0067309 A1 | 3/2007 | Klein et al. |
| 2007/0067808 A1 | 3/2007 | DaCosta |
| 2007/0073723 A1 | 3/2007 | Ramer et al. |
| 2007/0073728 A1 | 3/2007 | Klein et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0110074 A1 | 5/2007 | Bradley et al. |
| 2007/0124680 A1 | 5/2007 | Robbin et al. |
| 2007/0130541 A1 | 6/2007 | Louch et al. |
| 2007/0169115 A1 | 7/2007 | Ko et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0250761 A1 | 10/2007 | Bradley et al. |
| 2007/0271312 A1 | 11/2007 | Heller et al. |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0040758 A1 | 2/2008 | Beetcher et al. |
| 2008/0065247 A1 | 3/2008 | Igoe |
| 2008/0086494 A1 | 4/2008 | Heller et al. |
| 2008/0164581 A1 | 7/2008 | Cho et al. |
| 2008/0168185 A1 | 7/2008 | Robbin et al. |
| 2008/0168245 A1 | 7/2008 | De et al. |
| 2008/0168391 A1 | 7/2008 | Robbin et al. |
| 2008/0168525 A1 | 7/2008 | Heller et al. |
| 2008/0168526 A1 | 7/2008 | Robbin et al. |
| 2008/0168568 A1 | 7/2008 | Brodersen et al. |
| 2008/0229335 A1 | 9/2008 | Robbin et al. |
| 2009/0006671 A1 | 1/2009 | Batson et al. |
| 2009/0170546 A1 | 7/2009 | Nishida |
| 2009/0172200 A1 | 7/2009 | Morrison et al. |
| 2009/0290725 A1 | 11/2009 | Huang |
| 2010/0309962 A1 | 12/2010 | Freundlich et al. |
| 2011/0210820 A1 | 9/2011 | Talty et al. |
| 2011/0264732 A1 | 10/2011 | Robbin et al. |
| 2012/0180093 A1 | 7/2012 | Ishihara et al. |
| 2013/0007819 A1 | 1/2013 | Choi et al. |
| 2013/0058593 A1 | 3/2013 | Kanalakis et al. |
| 2013/0174208 A1 | 7/2013 | Lee et al. |
| 2013/0243199 A1 | 9/2013 | Kallai et al. |
| 2013/0311694 A1 | 11/2013 | Bhamidipati et al. |
| 2014/0006946 A1 | 1/2014 | Robbin et al. |
| 2014/0006947 A1 | 1/2014 | Garmark et al. |
| 2014/0032778 A1 | 1/2014 | Sim |
| 2014/0037097 A1 | 2/2014 | Labosco |
| 2014/0096165 A1 | 4/2014 | Bei et al. |
| 2014/0178028 A1 | 6/2014 | Park et al. |
| 2014/0181202 A1 | 6/2014 | Gossain |
| 2014/0244863 A1 | 8/2014 | Bradley et al. |
| 2014/0250219 A1 | 9/2014 | Hwang |
| 2014/0302787 A1 | 10/2014 | Rantala et al. |
| 2014/0307585 A1 | 10/2014 | Kearney et al. |
| 2014/0351876 A1 | 11/2014 | Kano |
| 2014/0380167 A1 | 12/2014 | Bloch et al. |
| 2015/0092947 A1 | 4/2015 | Gossain et al. |
| 2015/0181286 A1 | 6/2015 | Gonzalez |
| 2015/0373401 A1 | 12/2015 | Kwon et al. |
| 2016/0027399 A1 | 1/2016 | Wilde et al. |
| 2016/0044367 A1 | 2/2016 | Matsubara et al. |
| 2016/0066184 A1 | 3/2016 | Bhargav-Spantzel et al. |
| 2016/0073197 A1 | 3/2016 | Hammer et al. |
| 2016/0140546 A1 | 5/2016 | Taratine et al. |
| 2016/0149891 A1 | 5/2016 | Kuper et al. |
| 2016/0198198 A1 | 7/2016 | Iwami et al. |
| 2016/0219329 A1 | 7/2016 | Jee et al. |
| 2016/0255391 A1 | 9/2016 | Noble |
| 2016/0266868 A1 | 9/2016 | Allen |
| 2016/0342378 A1 | 11/2016 | Coburn |
| 2017/0019443 A1 | 1/2017 | Conan et al. |
| 2017/0054774 A1 | 2/2017 | Robbin et al. |
| 2017/0208357 A1 | 7/2017 | Greene |
| 2017/0242651 A1 | 8/2017 | Lang et al. |
| 2017/0242653 A1 | 8/2017 | Ang et al. |
| 2017/0242656 A1 | 8/2017 | Plagge et al. |
| 2017/0269900 A1 | 9/2017 | Triplett |
| 2017/0311368 A1 | 10/2017 | Kandur et al. |
| 2018/0049146 A1 | 2/2018 | Daley et al. |
| 2018/0070122 A1 | 3/2018 | Baek et al. |
| 2018/0167373 A1 | 6/2018 | Anderson et al. |
| 2018/0337924 A1 | 11/2018 | Graham et al. |
| 2018/0337953 A1 | 11/2018 | Maher et al. |
| 2021/0344669 A1 | 11/2021 | Yang et al. |

FOREIGN PATENT DOCUMENTS

| | | |
|---|---|---|
| CN | 104469413 A | 3/2015 |
| CN | 104581190 A | 4/2015 |
| CN | 104980820 A | 10/2015 |
| CN | 105144130 A | 12/2015 |
| CN | 105379177 A | 3/2016 |
| CN | 105493115 A | 4/2016 |
| CN | 106063283 A | 10/2016 |
| CN | 106254903 A | 12/2016 |
| CN | 106412665 A | 2/2017 |
| CN | 106416130 A | 2/2017 |
| CN | 106452644 A | 2/2017 |
| CN | 106465057 A | 2/2017 |
| CN | 110677700 A | 1/2020 |
| EP | 0146334 A2 | 6/1985 |
| EP | 0830026 A2 | 3/1998 |
| EP | 0917077 A2 | 5/1999 |
| EP | 0982732 A1 | 3/2000 |
| EP | 1028425 A2 | 8/2000 |
| EP | 1112931 A2 | 7/2001 |
| EP | 1122931 A2 | 8/2001 |
| EP | 1143719 A2 | 10/2001 |
| EP | 1353269 A2 | 10/2003 |
| EP | 1408427 A2 | 4/2004 |
| EP | 1429569 A1 | 6/2004 |
| EP | 1463334 A2 | 9/2004 |
| EP | 1523171 A1 | 4/2005 |
| EP | 1548740 A2 | 6/2005 |
| EP | 1751949 A1 | 2/2007 |
| EP | 1942430 A1 | 7/2008 |
| EP | 2360887 A1 | 8/2011 |
| EP | 2375678 A1 | 10/2011 |
| JP | 2000-339917 A | 12/2000 |
| JP | 2001-093226 A | 4/2001 |
| JP | 2001-117800 A | 4/2001 |
| JP | 2003-077214 A | 3/2003 |
| JP | 2003-303137 A | 10/2003 |
| JP | 2003-319485 A | 11/2003 |
| KR | 10-2001-0063284 A | 7/2001 |
| KR | 10-2001-0079176 A | 8/2001 |
| KR | 10-2002-0001127 A | 1/2002 |
| KR | 10-2002-0011027 A | 2/2002 |
| KR | 10-2006-0035634 A | 4/2006 |
| KR | 10-0599204 B1 | 7/2006 |

(56) References Cited

FOREIGN PATENT DOCUMENTS

| | | |
|---|---|---|
| WO | 94/08337 A1 | 4/1994 |
| WO | 95/16950 A1 | 6/1995 |
| WO | 00/16533 A1 | 3/2000 |
| WO | 00/43914 A1 | 7/2000 |
| WO | 01/26374 A1 | 4/2001 |
| WO | 01/33569 A1 | 5/2001 |
| WO | 01/67753 A1 | 9/2001 |
| WO | 02/25610 A1 | 3/2002 |
| WO | 02/25935 A2 | 3/2002 |
| WO | 02/65723 A1 | 8/2002 |
| WO | 02/65732 A1 | 8/2002 |
| WO | 2003/009601 A1 | 1/2003 |
| WO | 2003/023786 A2 | 3/2003 |
| WO | 03/38637 A1 | 5/2003 |
| WO | 2003/036541 A1 | 5/2003 |
| WO | 2004/004338 A1 | 1/2004 |
| WO | 2004/034286 A1 | 4/2004 |
| WO | 2004/057474 A1 | 7/2004 |
| WO | 2004/084413 A2 | 9/2004 |
| WO | 2005/060387 A2 | 7/2005 |
| WO | 2005/114472 A1 | 12/2005 |
| WO | 2005/122531 A1 | 12/2005 |
| WO | 2006/007322 A2 | 1/2006 |
| WO | 2006/047578 A2 | 5/2006 |
| WO | 2007/079360 A1 | 7/2007 |
| WO | 2007/079334 A3 | 8/2007 |
| WO | 2008/033771 A2 | 3/2008 |

OTHER PUBLICATIONS

AccelerateYourMac.com, Apple posts Automated Scripts for iTunes 2.03, 9 pgs, 2001 (downloaded Apr. 11, 2012 from http://www.x1r8yourmac.com/archive/dec01/1121801.html).
Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).
Andrew Birrell, "Personal Jukebox (PJB)," Oct. 13, 2000 available from http://birrell.org/andrew/talks/pjb-overview.ppt. (U.S. Appl. No. 11/519,429).
Apple Inc. "Apple Introduces iTunes—World's Best and Easiest to Use Jukebox Software," MacWorld Expo, San Francisco, 2 pgs. Jan. 9, 2001 https://www.apple.com/newsroom/2001/01/09Apple-Introduces-iTunes-Worlds-Best-and-Easiest-To-Use-Jukebox-software/.
Apple Inc., "Apple Announces iTunes 2," Press Release, 2 pp. Oct. 23, 2001 (downloaded from http://www.apple.com/pr/library/2001/10/23Apple-Announces-iTunes-2.html).
Apple Inc., "Apple-Downloads-Dashboard," 1 pg (downloaded Apr. 2016 from http://www.apple.com/downloads/dashboard).
Apple Inc., "iTunes 2, Digital Music for the Mac," Specification Sheet, 2 pgs, Oct. 2001.
Apple Inc., "iTunes, Playlist Related Help Screens," iTunes v1.0, 8 pgs, Jan. 2001.
Apple, "Airport Express," Technology Overview, Jul. 2004, 31-pgs.
Apple, "Mac OS X: Bonjour," Technology Brief, Apr. 2005, 6-pgs.
Awbrey, "Apple's iPod Available in Stores Tomorrow," Press Release, Nov. 9, 2001 (downloaded Jul. 14, 2011 from http://www.apple.com/pr/library/2001/11/09Apple-s-iPod-Available).
Book, "Special Edition Using Microsoft 1-18 Windows Millennium Passage", Special Edition Using Microsoft Windows Millennium Edition, Nov. 3, 2000, pp. 1-24. (U.S. Appl. No. 11/519,429).
Bridgman, "Windows XP Expert Zone Community Columnist", Using Windows Mobile-based Portable Media Centers and Windows Media Player 10, Aug. 25, 2004, 1-11. (U.S. Appl. No. 11/519,429).
Butler, "Archos Jukebox 6000 Challenges Nomad Jukebox," 6 pgs, Aug. 13, 2001 (from http:/db.tidbits.com/getbits.acgi?tbart=06521 (downloaded Jul. 13, 2011 from http://www.tidbits.com/article/6521?printversion=1).

Butler, "Portable MP3: The Nomad Jukebox," Aug. 1, 2001 (http:lldb.tidbits.com/getbits.acgi? tbart=06261, downloaded Jul. 13, 2011 from http://www.tidbits.com/article/6261).
Chakarova et al., "Digital Still Cameras, Downloading Images to a Computer," Multi-Media Reporting and Convergence, 2 pgs.
Clifton, David, Pipe.c, A Kla2 Module, 2003, 10 pages. (Retrieved on Oct. 17, 2011) from http://www.codelode.com/Kemel/kla2pepec.html. [Apr. 18, 2012 downloaded from http:/web.archive.org/20040107l9482/http:l/www.codelode.com/Kernel/kla2p- ipec . . . ] (U.S. Appl. No. 11/306,557).
Communication from European Patent Office for European Patent Application No. EP05731980, dated Dec. 8, 2010; 6 pages.
Compaq Computer Corp., "Personal Jukebox," 2 pgs, Jan. 24, 2001 (downloaded from http:/research.compaq.com/SRC/pjb/).
Compaq Computer Corp., "Systems Research Center and PAAD," Personal Jukebox (PJB), 25 pgs, Oct. 13, 2000 (downloaded from http://research.compaq.com/SRC/pjb/; redownloaded Apr. 2016 from http://birrell.org/andrew/talks/pjb-overview.pdf).
Search Report and Written Opinion received in Co-pending PCT patent application (PCT/US2005/011635) dated Oct. 21, 2005.
Search Report From Co-pending PCT patent application (PCT/US2005/011635) dated Jul. 28, 2005.
D-Link's New Wireless Media Device Plays Digital Music, Videos, and Photos on Home Television and Stereo; Retrieved from URL:http://presslink.dlink.com/pr/?prid=136, dated Jan. 20, 2004; 2-pgs.
De Herrera, Chris, "Microsoft ActiveSync 3.1" Version 1.02, (Oct. 13, 2000 Downloaded Aug. 16, 2011 From http://www.pocketpcfaq.eom/wce/activesync3.1.htm (U.S. Appl. No. 11/519,429).
Erdmann et al., "iPod+iTunes," O'Reilly, 157 pgs, 2006 (German).
Etchison, "Accelerated discrete Adjustment of the Parameters of a Process", IBM Technical Disclosure Bulletin, vol. 15, No. 5, Oct. 1, 1972, 2 pgs. (U.S. Appl. No. 11/519,429).
Extended European Search Report for EP Patent Application No. EP10184674 mailed on Dec. 13, 2010, 9 pages.
Final Office Action of Apr. 27, 2011 for U.S. Appl. No. 11/306,557, 13 pages.
Final Office Action of Jun. 23, 2011 for U.S. Appl. No. 11/696,679, 19 pages.
Final Office Action of Nov. Aug. 9, 2010 for U.S. Appl. No. 11/306,557; 24 pages.
Final Office Action of Nov. 25, 2008, for U.S. Patent Application No. 10/862, 115; 22 pages.
Firewire, IEEE 1394 (also known as Sony's iLink), (http://www.wikipedia.org/wiki/Firewire (1995)). Download Jul. 13, 2011— http://en.wikipedia.org/wiki/IEEE.sub.~1393.sub-interface (U.S. Appl. No. 11/519,429).
Fukuda, "Perfect Guide for Digital/Auio Technique to Enjoy Music in PC," Nikkei Click, Japan, Nikkei Business Publications, Inc., vol. 6, No. 10, p. 169, Sep. 8, 1999.
Glenn Fleishman, "Handheld iPod joins MP3 band a bit late, but is standout player," Nov. 6, 2001, http://seattletimes,nwsource.com/html/businesstechnology/134361811.sub.-ptmacc040.html. [Downloaded Jul. 21, 2011 from http://web.archive.org/...001110233639/http://seattletimes.nwsource.com/h-tml/businesstechnology/134361811.sub.--ptmacc040.html] (U.S. Appl. No. 11/519,429).
Handbook for Palm.TM. m500 Series Handhelds, User Manual.— (286 pages) (U.S. Appl. No. 11/519,429).
Harmony Central, "Diamond Multimedia Announces Rio PMP300 Portable MP3 Music Player", Press Release, 4 pgs, Sep. 14, 1998 (http://news.harmony-central.com/Newp/1988/Rio- Pump300.html, downloaded Aug. 16, 2011 from http://web.archive.org/web/20030811055941/http://news.harmony-central.com/Newp/1998/Rio-PMP300.html.
Hei et al., "iPod+iTunes," iTunes7, Markt+Technik Verlag, 54 pgs, Dec. 22, 2006 (German).
Hewlett Packard, "Hewlett Packard Jornada 525 Color Pocket PC," (downloaded Jan. 25, 2002, http://www.pc4d.com/electronics/products/56/jornada 525 color pocket pc.shtml).
Hughes, M., "Turning Streams Inside Out, Part 2: Optimizing internal Java 1/0", Sep. 3, 2002, 12 pages. Retrieved on Oct. 19, 2011 from http://50001.com/language/javaside/lec/javaibm/%BD%BA%%C6%AE%B8%B2%20% . . . .

(56) References Cited

OTHER PUBLICATIONS

Hughes, M., "Turning Streams Inside Out, Part 2: Optimizing internal Java I/O", Sep. 3, 2002, 12 pages. [downloaded Apr. 11, 2012 at: http://underpop.free.fr/j/java/streams/j-io2.pdf] (U.S. Appl. No. 11/306,557).
International Preliminary Report on Patentability of Dec. 28, 2006 and Written Opinion for PCT Patent Application No. PCT/US2005/020139, 12 pages.
International Search Report and Written Opinion for Patent Application No. PCT/US2006/062003 mail date of Jul. 10, 2007, 21 pages.
International Search Report and Written Opinion for PCT/US2007/078043, mailed Aug. 18, 2008 (U.S. Appl. No. 11/519,429).
International Search Report and Written Opinion received in corresponding PCT application No. PCT/US2006/062003 dated Aug. 30, 2007.
International Search Report of Mar. 29, 2006 for PCT Patent Application No. PCT/US2005/020139, 7 pages.
International Search Report received in PCT application No. PCT/US2006/062355 dated Jun. 6, 2007.
Interview Summary of May 20, 2010 for U.S. Appl. No. 11/306,557; 3 pages.
Interview Summary of Nov. 1, 2010 for U.S. Appl. No. 11/306,557; 3 pages.
Inver, "PMP140/120," 2 pgs, Sep. 13, 2004.
IPod +iTunes, Markt+Technik Verlag, 2007. (U.S. Appl. No. 11/519,429).
Iriver, "PMP140/120," 2 pgs, Sep. 13, 2004.
ITunes 2, Playlist Related Help Screens, iTunes v2.0 Apple Computer, Inc., Oct. 23, 2001 (U.S. Appl. No. in U.S. Appl. No. 11/519,429).
Itunes, Digital Music for your Mac, Apple Computer, Inc., downloaded Oct. 22, 2011, http://www.apple.com/itunes/ (U.S. Appl. No. 11/519,429).
Itunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/ Usage) (U.S. Appl. No. 11/519,429).
K*Software, "kquery.com," obtained from http://www.kquery.com/index.php?page=software.sub.-info&subpage=1&id=8, generated Jun. 8, 2006, copyright 2004, 4-pgs.
Lindauer, "What's in Your Pocket?," Edgereview, 2 pgs (downloaded Jan. 25, 2002 from http://www.edgereview.com/print.cfm?Type+aag&ID=286).
Linksys "New Linksys Wireless Home Products Showcased at CEBIT 2004" Internet Article (Mar. 18, 2004) www.broadbandbuyer.co.uk/Shop/pageTextDetail.asp?Setl0=2&Textl0=473.
Markt+Technik Verlag, "iPod+iTunes," 2007 (German).
Maulik and Ryan, "Synchronizing mp3 playback, version #17," http://snarfed.org/exec/version?name=synchronizing+mp3+playback&version=17, generated Jun. 8, 2006, version #17 dated Feb. 5, 2006 in history, 4 pgs.
Maulik and Ryan, "Synchronizing mp3 playback, version #5," obtained from http://snarfed.org/exec/version?name=synchronizing+mp3+playback&version=5, generated Jun. 8, 2006, version #5 dated Jan. 19, 2005 in history, 3-pgs.
Maulik and Ryan, "Synchronizing mp3 playback, version #6," obtained from http://snarfed.org/exec/version?name=synchronizing+mp3+playback&version=6, generated Jun. 8, 2006, version #6 dated Feb. 2, 2005 in history, 3-pgs.
Maulik and Ryan, "Synchronizing mp3 playback, version #7," http://snarfed.org/exec/version?name=synchronizing+mp3+playback&version=7, generated Jun. 8, 2006, version #7 dated Feb. 21, 2005 in history, 3 pgs.
Maulik and Ryan, Synchronizing mp3 playback, version #4, obtained from http://snarfed.org/exec/version?name=synchronizing+mp3+playback&version-4-, generated Jun. 8, 2006, version #4 dated Jan. 3, 2005 in history, 3 pgs.
Maulik and Ryan, Synchronizing mp3 playback, version #8, obtained from http://snarfed.org/exec/version?name=synchronizing+mp3+playback&version=8-, generated Jun. 8, 2006, version #8 dated Feb. 23, 2005 in history, 3 pgs.
Maulik and Ryan, Synchronizing mp3 playback, version #9, obtained from http://snarfed.org/exec/version?name=synchronizing+mp3+playback&version=9-, generated Jun. 8, 2006, version #9 dated Mar. 3, 2005 in history, 3 pgs.
Maulik and Ryan. "Synchronizing mp3 playback. version #3." obtained from http://snarfed.org/exec/version?name=synchronizing+mp3+playback&version=3. generated Jun. 8, 2006. version #3 dated Jan. 2, 2005 in history. 3-pgs.
Maulik, "Synchronizing mp3 playback, version #1," obtained from http://snarfed.org/exec/version?name=synchronizing+mp3+playback&version=1, generated Jun. 8, 2006, version #1 dated Nov. 8, 2004 in history, 2-pgs.
Maulik, "Synchronizing mp3 playback, version #2," obtained from http://snarfed.org/exec/version?name=synchronizing+mp3+playback&version=2, generated Jun. 8, 2006, version #2 dated Dec. 28, 2004 in history, 2-pgs.
Mcgavren, "iTunes-perl," 2004-2006 (http://code.googlecom, 5 pgs (downloaded Jan. 13, 2012 from http://code.google.com/p/itunes-perl/wiki/ Usage).
MediaGate, "Portable MPEG4 Player (MG-25)," 3 pgs, Jul. 29, 2004.
Microsoft Corp., "Window's Media Player 6.4," 2 p. 1999 (software downloadable at http://www.oldversion.com/program php?n=wmp, downloaded Jul. 13, 2011 from http://www.microsoft.com/download/en/confirmation.axps?displaylangen&id=2- 2758).
Mills, David L., "Request for Comments: 1305," Network Working Group, Mar. 1992, 113-pgs.
Miniman, "Applian Software's Replay Radio and Player v1.02," Product review, pocketnow.com, http://www.pocketnow.com/review/replay.htm, Jul. 31, 2001. Downloaded Aug. 25, 2011 http://web/archive.org/web/20010805081914/http://www.pocketnow.com/review- s/reply/reply.HTM (U.S. Appl. No. 11/519,429).
MusicMatch, "About MusicMatch Jukebox," MusicMatch Jukebox v4 Help, 4 pgs, 1999.
MusicMatch, "Musicmatch and Xing Technology Introduce Musicmatch Jukebox," May 18, 1998 (http://www.musicmatch.com/info/company/press/rel eases/?year +1998& release=2, downloaded Aug. 16, 2011 from http://www.thefreelibrary.com/MusicMatch+and+Xing+Technolo).
Myradus, LLC, "Myradus Media Player Puppeteer for iTunes," obtained from http://www.myradus.com/ ProductMediaPlayerPuppeteerForm.aspx, generated Jun. 8, 2006, copyright 2004-2005, 1-pg.
Myradus, LLC, "Myradus Media Player Puppeteer for iTunes," obtained from http://www.myradus.com/Product.sub.--MediaPlayerPuppeteerFrom.aspx, generated Jun. 8, 2006, copyright 2004-2005, 1 pg.
Nilsson, "ID3 tag version 2.3.0," 30 pgs, Feb. 3, 1999 (downloaded from http://www.id3.org/id3v2.3.0?action=print).
Nilsson, "IDS tag versions 2.4.0.—Main Structure," Nov. 1, 2000 (downloaded from http://www.id3.org/id3v2.4.0-structure?-action=print).
Nilsson, "IDS tag versions 2.4.0.—Main Structure," 12 pgs, Nov. 1, 2000 (downloaded from http://www.id3.org/id3v2.4.0-structure?-action=print).
Nomad Jukebox, User Guide, Creative Technology Ltd., Version 1, Aug. 2000. [38 pages downloaded Aug. 16, 2011] (U.S. Appl. No. 11/519,429).
Non-final office action for U.S. Appl. No. 11/306,557 dated Jul. 19, 2011.
Non-Final Office Action of Feb. 4, 2010 for U.S. Appl. No. 11/306,557; 25 pages.
Non-Final Office Action of Jan. 4, 2011 for U.S. Appl. No. 11/696,679, 18 pgs.
Non-Final Office Action of Jan. 4, 2011 for U.S. Appl. No. 11/696,679; 18 pages.
Non-Final Office Action of Mar. 20, 2008 for U.S. Appl. No. 10/862,115; 16 pages.

(56) References Cited

OTHER PUBLICATIONS

Non-Final Office Action of Nov. 21, 2008 for U.S. Appl. No. 11/306,557; 18 pages.
Non-Final Office Action of Nov. 22, 2010 for U.S. Appl. No. 11/306,557; 14 pages.
NormSoft, Inc., "Pocket Tunes 5.0.0," pp. 1-25, 2009 (http://www.pocket-tunes.com/userguide/en.win, downloaded 18 pages on Apr. 10, 2012 from http://www.pocket-tunes.com/userguide/enl).
Nullsoft, "winamp.com / Plug-ins," obtained from http://winamp.com/plugins/details.php?id=15667, generated Jun. 8, 2006, copyright 2006, 2 pgs.
Nutzel et al., "Sharing System for Future HiFi Systems", Proceedings of the Fourth International Conference on Web Delivering of Music, Sep. 13, 2004, 8 pgs. [9 pages downloaded] (U.S. Appl. No. 11/519,429).
Office Action for U.S. Appl. No. 11/530,855 dated Oct. 12, 2010.
Office Action for U.S. Appl. No. 11/306,557 dated Aug. 18, 2009.
Office Action for U.S. Appl. No. 11/530,855 dated Apr. 5, 2011.
Office Action for U.S. Appl. No. 11/530,855 dated Dec. 29, 2009.
Office Action for U.S. Appl. No. 11/530,855 dated Jun. 24, 2009.
Office Communication of Dec. 30, 2009 for U.S. Appl. No. 10/862,115, Board of Patent Appeals and Interferences Docketing Notice, 2 pages.
Palacharla, S. et al., "Design and implementation of a Real-time Multimedia Presentation System using RTP", Computer Software and Applications Conference, COMPSAC '97, Aug. 1997, pp. 376-381.
Palm, Inc., "Handbook for PalmTM m500 Series Handhelds, User Manual," 109 pgs.
Perkins, C., "RTP Audio and Video for the Internet, Chapter 5, RTP Control Protocol", 2003, Addison-Wesley, Boston, USA, pp. 95-111.
Personal Jukebox (PJB), "Systems Research Center and PAAD," Compaq Computer Corp., Oct. 13, 2000, http://research.compaq.com/SRC/pjb/. (U.S. Appl. No. 11/519,429).
Pocket PC Phone User Manual, High Tech Computer Corp., 2006; 208 pages, Downloaded Jul. 2011 www.htc.com (U.S. Appl. No. 11/519,429).
Pocket Tunes 5.0.0. copyright 2002-2009 Normsoft, Inc., (pp. 1-25, obtained from the Internet at: http://www.pocket-tunes.com/userguide/en.win)—[Downloaded 18 pages on Apr. 10, 2012 at http://www.pocket-tunes.com/userguide/en/) (U.S. Appl. No. 11/519,429).
RCA, "Lyra User's Guide," RD2201/2202/2204, www.lyrazone.com, pp. 1-37, 1999.
Real Networks, Inc., "RealJukebox Plus Manual," pp. 1-83, 1999 (downloaded Oct. 27, 2005 http://www.real.com/Jukebox/release notes.html#).
Replay Gain, "Replay Gain—A proposed Standard," Oct. 7, 2001 (downloaded from http:/replaygain.hydrogenaudio.org/index.html and http://replaygain.hydrogenaudio.orgioutline.html).
Robbin et al., "SoundJam MP Plus Digital Audio System Version 2," Representative Screens, published by Cassady & Greene, Inc., Salinas, CA, 6 pgs, 2000.
Rosenberg, J et al., "SIP: Session Initiation Protocol", Jun. 1, 2002; Jun. 2002, Jun. 1, 2001, Retrieved from ftp://frp-editor.org/in-notes/rfc3261.txt on Aug. 18, 2011, 232 pages.
Schulzrinne Comumbia U A RAO Netscape R Lanphier RealNetworks H: "Real Time Streaming Protocol (RTSP)" IETF Standard, Internet Engineering Task Force, IETF, CH, April.
Shulzrinne et al., "Request for Comments: 2326," Network Working Group, Apr. 1998, 92-pgs.
Shulzrinne et al., "Request for Comments: 3550," Network Working Group, Jul. 2003, 104-pgs.
Sinitsyn, "A Synchronization Framework for Personal Mobil Servers," Proceedings of the Second IEEE Annual Conference on Pervasive Computing and communications Workshops, Piscataway, NJ, Mar. 14, 2004, pp. 1-4 5 pages retrieved from IEEE on Jul. 2011 (U.S. Appl. No. 11/519,429).
Skarlatos et al., "Sprite Backup 5.0", Internet Publication, Mar. 6, 2005 (downloaded www.pocketnow.com/index.php?a+portal print &t=review&id=788).

Slim Devices, Inc., "Slim Devices: Squeezebox: Free Your Music.," obtained from http://www.slimdevices.com/index.html, generated Jun. 8, 2006, copyright 2002-2004, 1-pg.
Slim Devices, Inc., "Squeezebox 2: Owners Guide," copyright 2005, 28-pgs.
Slim Devices, Inc., "Squeezebox: Owner's Guide," copyright 2006, 32-pgs.
Slim Devices. Inc. "Slim Devices: Squeezebox: Overview." obtained from http://www.slimdevices.com/pi_overview.html. generated Jun. 21, 2006. copyright 2002-2006. 3-pgs.
Slim Devices. Inc. "Slim Devices: Support: FAQ." obtained from http://www.slimdevices.com/su_faq.html. generated Jun. 21, 2006. copyright 2002-2006. 31-pgs.
snarfed.org, "History of Synchronizing mp3 playback," http:/snarfed.org/exec/history?name=synchronizing+mp3+playback, generated Jun. 8, 2006, 2 pgs.
snarfed.org, "libmsntp," obtained from http://snarfed.org/space/libmsntp, generated Jun. 8, 2006, undated, 2-pgs.
SoundJam MP Plus Manual, version 2.0—MP3 Player and Encoder for Macintosh by Jeffrey Robbin, Bill Kincaid and Dave Heller, manual by Tom Negrino, published by Casady & Greene, Inc. 2000. 80 pages (U.S. Appl. No. 11/519,429).
Steinberg, "Sonicblue Rio Car," Product Review, Dec. 12, 2000 (downloaded from http://electronics.cnet.com/electronics/0-6342420-1304-4098389.html).
Stenton, Stuart P., Richard Hull, Patrick M. Goddi, Josephine E. Reid, Ben JC Clayton, Tom J. Melamed, and Susie Wee. "Mediascapes: Context-aware multimedia experiences." IEEE Multi Media 14, No. 3 (2007): 98-105. (Year: 2007).
Stewart et al., "Request for Comments: 3758," Network Working Group, May 2004, 22-pgs.
Titmus, Richard, "Softsqueeze 2.0," obtained from http://softsqueeze.souceforge.net/, generated Jun. 8, 2006, copyright 2004, 2005, 3-pgs.
Top Stores of Dec. 18, 2001: Apple posts Automated Scripts for iTunes 2.03. downloaded 9 pages on Apr. 11, 2012 from the internet at: http://www.xlr8yourmac.com/archive/dec01/121801.html (U.S. Appl. No. 11/519,429).
Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?printversion=1 (U.S. Appl. No. 11/519,429).
Travis Butler, "Portable MP3: The Nomad Jukebox," Aug. 1, 2001, available from http://db.tidbits.com/getbits.acgi?tbart=06261. downloaded Jul. 13, 2011 at http://www.tidbits.com/article/6261 (U.S. Appl. No. 11/519,429).
TuneBase 100 User Guide, A CD Library Management System, Escient, Inc. copyright 1999. (101 Pages) (U.S. Appl. No. 11/519,429).
TuneBase Pro Mk-II User's Guide, Escient, Inc., (1999) Downloaded Jul. 25, 2011 (U.S. Appl. No. 11/519,429).
Vetro et al., "Media Conversions to Support Mobile Users," IEEE Canadian Conference on Electrical and Computer Engineering, Piscataway, NJ, May 13, 2001, pp. 606-612 pp. 1-6 from IEEE on Jul. 2011 (U.S. Appl. No. 11/519,429).
WebReviews.com, "Rio Portable Music Player," 1999 (downloaded Jan. 25, 2002 from download http://www.webreviews.com/9901/rio.html).
Wikipedia, "IEEE 1394" (Firewire and also known as Sony's ilink) (downloaded from https://en.wikipedia.org/wiki/IEEE1394).
Wikipedia: "iTunes", www.wikipedia.com, May 9, 2005, 6 pages. (U.S. Appl. No. 11/519,429).
Window's Media Player 6.4, Microsoft Corp., copyright 1999, software available at http://www.oldversion.com/program.php?n=wmp [.about.Downloaded Jul. 13, 2011 at: http://www.microsoft.com/download.en/confirmation.axps?displaylang-en&id =- 22758] (U.S. Appl. No. 11/519,429).
Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011 (U.S. Appl. No. 11/519,429).

\* cited by examiner

REMOTELY CONTROLLING PLAYBACK DEVICES

RELATED APPLICATIONS

This application claims the benefit of U.S. Non-Provisional patent application Ser. No. 16/287,960 filed on Feb. 27, 2019; U.S. Provisional Patent Application No. 62/679,967 filed on Jun. 3, 2018; U.S. Provisional Patent Application No. 62/650,728 filed on Mar. 30, 2018, which are hereby incorporated by reference.

TECHNICAL FIELD

The disclosure generally relates to managing media playback across networked playback devices.

BACKGROUND

Wireless audio/video (A/V) devices are becoming ubiquitous. For example, wireless speaker systems are used in many homes to play music. Wireless streaming devices are used to play video to television sets and/or audio through connected speaker systems. Sometimes the wireless speaker systems and/or streaming devices are smart computing devices that can be configured to stream and/or receive streaming audio and video data. In some cases, several smart A/V devices can be placed around the home and in different configurations to provide various A/V capabilities throughout the home and/or in different rooms of the home. Systems are needed for configuring, monitoring, and controlling these various A/V devices.

SUMMARY

In some implementations, a system can be configured to allow remote control devices to quietly obtain status information related to various audio/video playback devices. For example, a streaming device (e.g., a user device, phone, etc.) can establish a streaming connection to a playback device. The playback device can be configured to only accept a single streaming connection (i.e., master connection). A remote control device (e.g., a user device, phone, etc.) can quietly connect (i.e., control connection) to the playback device without interrupting the master connection to obtain status information related to the playback device and or the media being streamed to the playback device. The remote control device can provide commands through the control connection to adjust the playback of the streamed media at the playback device.

In some implementations, a system can be configured to manage groups of playback devices. For example, playback devices can be dynamically grouped in a variety of ways. Each playback device can store attributes that define the group to which the playback device belongs. Each playback device can send its group attributes to remote control devices and the remote control devices can determine groups of playback devices based on the group attributes. The remote control devices can then configure and present graphical user interfaces that represent the various groups of playback devices. In some implementations, a group of playback devices can be configured as a persistent group. For example, a pair of playback devices (e.g., wireless speakers) can be configured as a stereo pair. The pair of playback devices can store and send attribute data indicating that the pair of playback devices is a persistent group so that remote control devices can present and control the persistent group as a single device.

In some implementations, a system can be configured to reduce the burden of pairing user devices with playback devices. For example, all users (or user devices) who commonly operate within a particular environment (e.g., a home) can be configured as authorized users of playback devices within the particular environment. When one of the authorized users pairs a user device with a playback device, all of the user devices for all authorized users can be automatically paired with the playback device as a result of the single pairing. Thus, only a single authorized user is burdened with the pairing process in order to pair all authorized users with the playback device.

In some implementations, a system can be configured to route media data to playback devices based on a context associated with the media data. For example, the media data can include audio and/or video data associated with media items, such as music, movies, television shows, etc. The media data can include audio and/or video data generated by software, such as audio/video output from gaming applications and/or an operating system. The context can be determined based on the source of the media data and the media data can be routed to playback devices based on the determined context. For example, when the context is a media context associated with a media item source, the media data can be routed to remote playback devices for presentation. When the context is a system context associated with a software source, the media data can be presented by a local device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
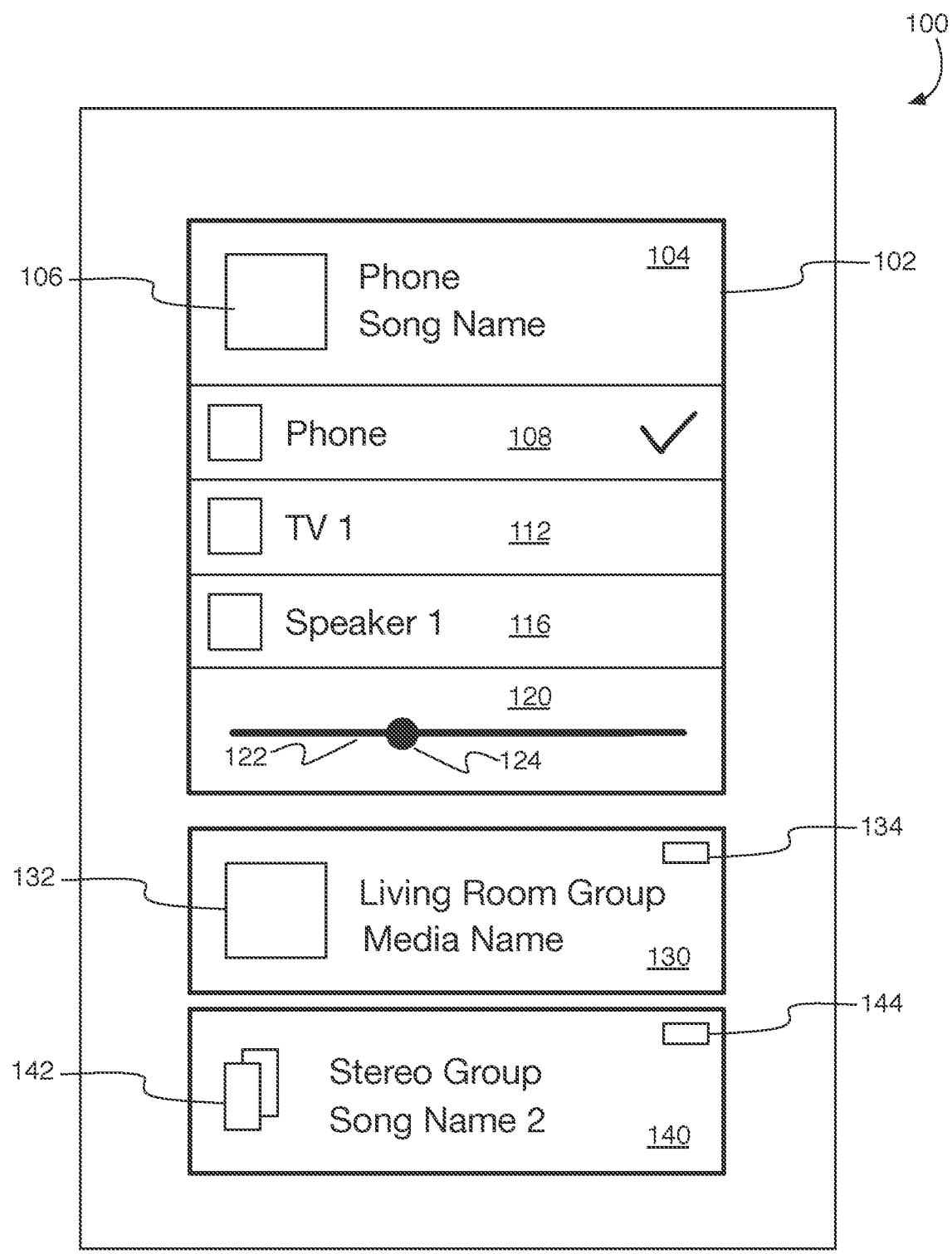
FIG. 1 is an example graphical user interface (GUI) for controlling playback devices.

FIG. 1 is an example graphical user interface (GUI) 100 for controlling playback devices. For example, GUI 100 can be presented by a computing device, such as a smartphone, a tablet computer, a laptop computer, a wearable computing device or any other type of computing device that has a connected display. To generate GUI 100, the computing device (e.g., a remote control device, streaming device, etc.) can wirelessly connect to various playback devices (e.g., wireless speakers, set top boxes, televisions, etc.) and collect state and attribute information from the playback devices. Based on the received attribute data, the computing device can generate GUI 100 that includes representations of individual playback devices (e.g., in graphical element 102) and/or groups of playback devices (e.g., represented by graphical elements 130 and 140). Using the state information provided by the playback devices, the computing device can present information describing the media currently being played by the playback devices, the playback controls available for adjusting the playback of the media being played, and/or other information, as may be described further herein below.

In some implementations, GUI 100 can include graphical element 102 for selecting and/or controlling individual playback devices. For example, individual playback devices can advertise the ability of the playback devices to receive media streamed from the computing device. When the computing device receives the information identifying the individual playback devices, the computing device can generate graphical element 102 that identifies the playback devices. In some implementations, the computing device itself can be identified within graphical element 102. For example, graphical element 102 can include display area 104 for identifying the media item (e.g., song, movie, television show, etc.) being played and the device playing the media. In the example of FIG. 1, display area 104 indicates that the user's phone is playing a song.

In some implementations, graphical element 102 can include graphical elements 108, 112, and/or 116 that identify playback devices. In the example of FIG. 1, the computing device presenting GUI 100 is the user's phone, so the user's phone is identified in graphical element 108. Also, graphical element 108 can include an indicator (e.g., checkmark) indicating that the user's phone is the currently selected playback device. Graphical element 102 may also include graphical element 112 indicating that a television or set-top-box is available for playing the selected media item. Graphical element 102 may include graphical element 116 indicating that a wireless speaker is available for playing the selected media item. When the computing device (e.g., user's phone) receives a selection of one or both of graphical elements 112 and/or 116, the computing device can stream the selected media item (e.g., song) to the selected playback devices and stop playing the selected media item through the output components (e.g., speakers, display, etc.) of the computing device. When streaming media from the computing device, the computing device becomes the master device relative to the playback device or devices to which the media item is being streamed. In some implementations, each playback device is configured to only have one master device. Thus, if a second computing device starts streaming to one of the selected playback devices, the second computing device takes over (e.g., hijacks) the connection and becomes the master of the playback device.

In some implementations, graphical element 102 can include media playback control area 120. For example, area 120 can include media playback controls (e.g., play button, rewind button, fast forward button, volume control, etc.) for the media being played by or streamed from the computing device. In the example of FIG. 1, area 120 presents a volume control 122 for specifying and/or adjusting the volume at which the media item is played by the selected playback devices. For example, the user can slide volume handle 124 along the volume slider 122 to adjust the volume up or down.

In some implementations, GUI 100 can include graphical element 130 representing a dynamic playback device group. For example, a user can provide input to the computing device to configure playback devices into playback device groups (i.e., playback groups). In some implementations, the user can provide input to a software application (e.g., home application 332, described below) on the computing device to indicate which playback devices should be included in a particular dynamic playback group. For example, the user can drag and drop playback devices into the particular dynamic playback group. The user can designate that playback devices within the same room of the user's house (e.g., as determined by home application 332) should be part of the particular dynamic playback group. The user can, for example, designate that two playback devices (e.g., wireless speakers) in the user's living room should playback media as a group. The dynamic playback group can be configured and reconfigured according to the user's desires. For example, the user may want to listen to music in the living room and create a group of speakers in the living room. Later, the user may wish to group speakers in the living room and kitchen and can reconfigure the playback devices in the living room and kitchen into a new group. In some implementations, a single playback device can be part of multiple different dynamic playback groups. For example, the user may configure a dynamic playback group that includes living room playback devices. The user may configure a different dynamic playback group that includes kitchen playback devices. The user may configure yet another dynamic playback group that includes living room and kitchen playback devices. Thus, a playback device in the living room may belong to the living room playback group and the combined kitchen/living room playback group.

In response to receiving the group designation, the designated playback devices can be dynamically configured with group attributes that identify to other devices (including the computing device) that the designated playback devices belong to the same group, as described in more detail below. For example, the software application (e.g., home application 332) on the computing device can send group attributes corresponding to the designated groups for each playback device to each playback device.

When the computing device receives the group attributes from the playback devices in the group, the computing device can determine that the playback devices belong to the same group and present graphical element 130 representing the playback group. For example, graphical element 130 can include state information reported by the playback group (e.g., the name of the group, the media item being played by the group, an image 132 representing the group, identifiers for the playback devices in the group, etc.). The user can select graphical element 134 to cause the computing device to present GUI 200 of FIG. 2 so that the user can view the state of the playback group and control the playback group.

In some implementations, GUI 100 can include graphical element 140 representing a persistent playback device group. For example, the user may want to configure two or more playback devices into a persistent playback device group (e.g., analogous to a stereo configuration or surround sound configuration). When the user creates a persistent group of playback devices, the playback devices can be treated by the computing device as if the persistent group of playback devices is a single device (e.g., single playback device). Thus, the persistent group of playback devices is not subject to the same dynamic rearrangement as described above with respect to the dynamic group of playback devices. However, the persistent group may be a member of a dynamic group such that the persistent group is treated as a single playback device within the dynamic group of devices. Because the persistent playback device group is considered a single playback device, in some implementations, the persistent playback group can be presented as a single playback device in graphical element 102 (e.g., like the television and/or speaker playback devices). Similarly to dynamic playback device groups, the user can select graphical element 144 to cause the computing device to present GUI 200 of FIG. 2 so that the user can view the state of the persistent playback group and control the playback group.

In some implementations, the computing device can establish remote control connections (i.e., control connections) to playback devices to collect state information and control playback at the playback devices. For example, as opposed to the master connection which is hijacked by other streaming devices when the other streaming devices wish to stream media to a playback device, the control connection is a quiet connection that does not interrupt the master connection. The control connection does not stream media to the playback device(s). Instead, the control connection is used to obtain state information and control the playback of the media being played by the playback device(s). Thus, the computing device may both stream media to a first set of playback devices and receive and present status information related to another set of playback devices.

Figure 2:
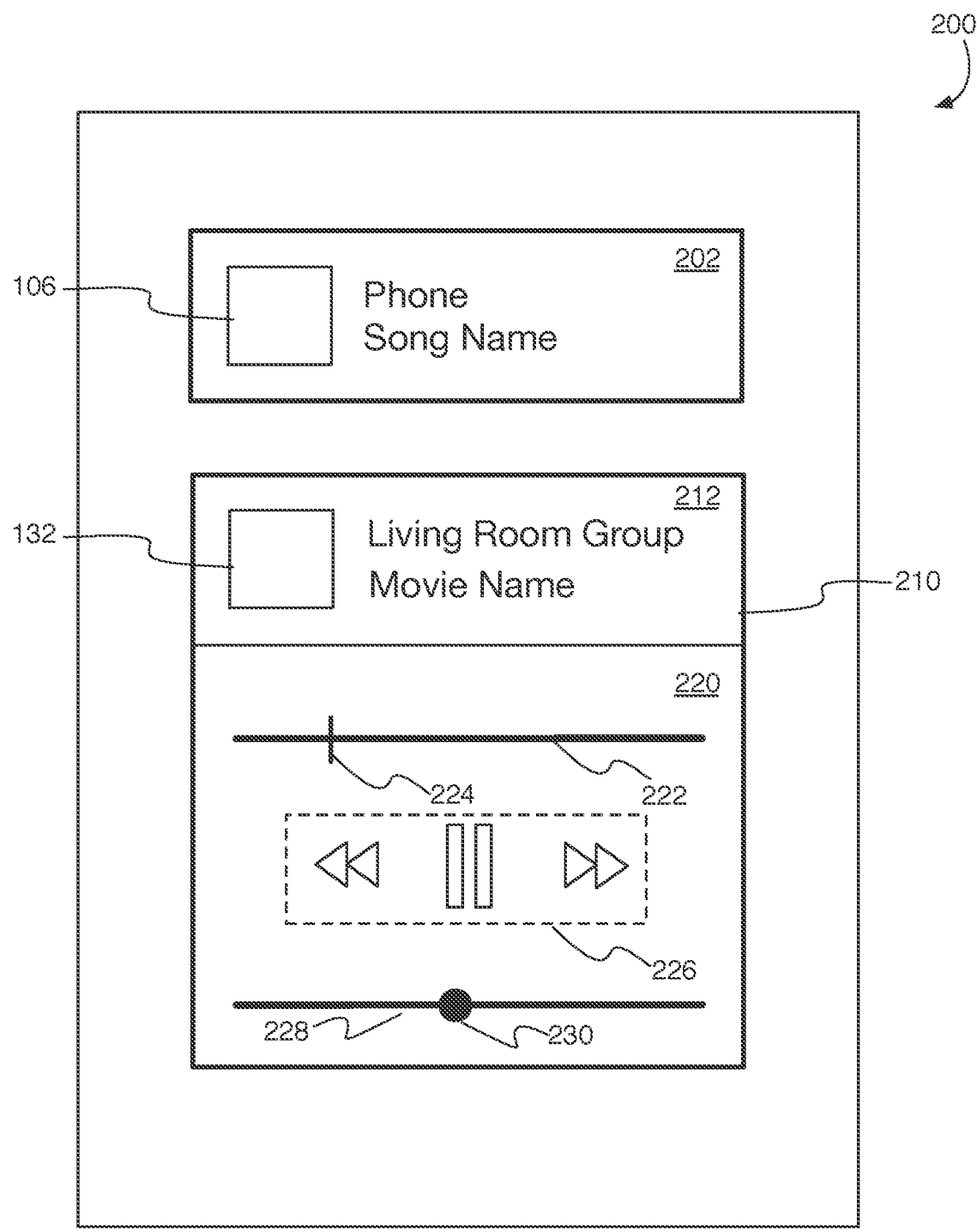
FIG. 2 illustrates an example graphical user interface for presenting controls for a playback group.

FIG. 2 illustrates an example graphical user interface 200 for presenting controls for a playback group. For example, GUI 200 can be presented by the computing device in response to the user selecting graphical element 134 or graphical element 144 of FIG. 1, described above. For example, when the computing device receives a selection of graphical element 134 or graphical element 144, the computing device can minimize graphical element 102 into graphical element 202 corresponding to display area 104 of FIG. 1. Thus, graphical element 102 represents the media item being played or streamed by the computing device.

When the computing device receives a selection of graphical element 134 or graphical element 144, the computing device can expand the corresponding graphical element 130 or 140 representing a dynamic playback group or persistent playback group into graphical element 210 to present additional information and/or controls for the selected playback group. For example, graphical element 210 can include information area 212 that identifies the name of the playback group and/or the media item being played (or recently played) by the playback group.

Graphical element 210 can include control area 220 for presenting controls for the playback group. For example, the controls presented in control area 220 can be dynamically determined based on the capabilities and/or features of the playback devices in the playback group, the media item being played by the playback group, and/or the software application providing the media item being played by the playback group. For example, if the playback group includes a device with video capability, then video controls can be presented in area 220. However, if the playback group does not include a device with video capability, only audio controls may be presented. For example, control area 220 can include media playback timeline 222 and indicator 224 (e.g., play head) to indicate the current playback location of the media item in the playback timeline. Control area 220 can include playback controls 226 (e.g., play, pause, rewind, fast forward, etc.) for controlling the playback of the playing media item in the playback group. Control area 220 can include volume control 228. For example, the user can use touch input (e.g., touch, drag, release, etc.) to adjust the volume of playback at the playback devices within the playback group by selecting volume handle 230 and sliding it along volume control 228.

When the user interacts with the playback controls to specify settings for the various playback controls for the playback group, the computing device can send the specified settings to the playback group. In some implementations, the playback settings can be sent to a primary playback device in the playback group and the primary playback device can propagate the playback settings to other playback devices within the playback group. In some implementations, the computing device can send the playback settings directly to each playback device in the playback group. In either case, the playback settings can be sent to playback devices using the non-hijacking (e.g., quiet) control connection, described above.

Figure 3:
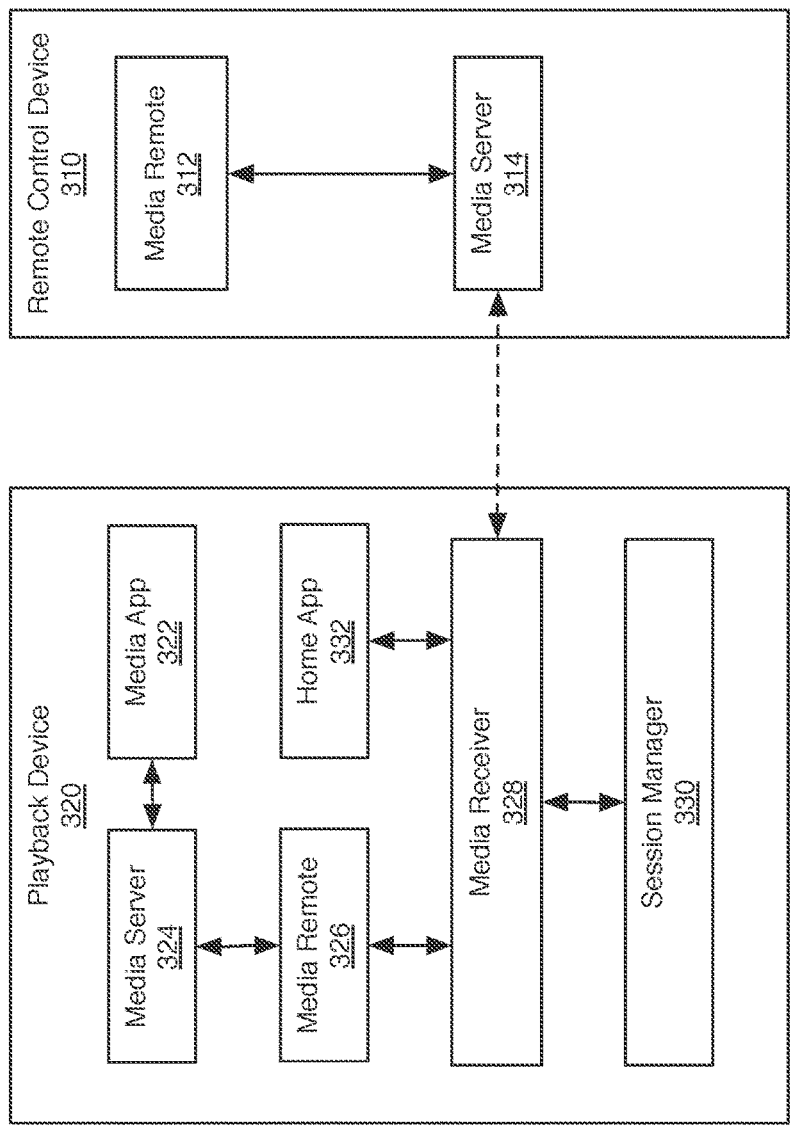
FIG. 3 is a block diagram of an example system for remotely controlling playback devices from a remote control device.

FIG. 3 is a block diagram of an example system 300 for remotely controlling playback devices from a remote control device. For example, remote control device 310 can correspond to the computing device that presents graphical user interfaces 100 and 200, as described above. FIG. 3 is used here to describe how playback device status data and control commands are managed between remote control device 310 and playback device 320.

As used throughout this specification, a remote control device (e.g., remote control device 310) represents a computing device (e.g., smartphone, tablet computer, laptop computer, etc.) that establishes a quiet, non-hijacking, control connection (e.g., control channel, control pipe, etc.) with the playback device (e.g., playback device 320) represented in the figures. However, the remote control device may establish a control connection with playback device 320 to obtain state information for playback device 320 and provide control input to playback device 320, while also maintaining a streaming connection with another playback device (not shown). Thus, remote control device 310 may also be a streaming device (i.e., a master device) with respect to another playback device, as described further below.

As used throughout this specification, playback device (e.g., playback device 320) represents a computing device (e.g., a wireless speaker, a television, a set-top-box, etc.) configured to present audio and/or video to one or more users. A playback device can originate media streams through software applications installed on the playback device. A playback device can receive media streams from other computing devices. For example, playback devices can advertise (e.g., using wireless signals) that they are capable of receiving and presenting media streams. Other computing devices (e.g., other playback devices, streaming devices, etc.) can detect the advertisement and connect to the playback device to stream media to the playback device, as described above with reference to FIG. 1. Thus, playback devices are discoverable by other devices that are in close proximity to the playback devices and/or on the same local area network as the playback devices and/or otherwise reachable. This is in contrast to other computing devices (e.g., single user devices such as a smartphone or tablet computer) that may not be discoverable, as described further below. The various devices (e.g., remote control device, playback device, streaming device, etc.) can communicate using through various types of networks, including wide area networks, local area networks, Wi-Fi, Bluetooth, and/or various peer to peer connections (e.g., over Bluetooth, Wi-Fi, etc.).

In some implementations, system 300 includes remote control device 310 and playback device 320. In the example of FIG. 3, playback device 320 is originating the media stream being played by playback device 320. For example, playback device 320 can include media application 322. Media application 322 can be a music application, a video application, or any other type of media software application. Media application 322 can obtain media for playback by playback device 320 from a local media library on playback device 320. Media application 322 can obtain media for playback by playback device 320 from a remote source, such as an internet media service. Media application 322 can cause playback device 320 to present media by sending the media stream to media server 324. For example, media server 324 can be a software service that manages playback of media items on playback device 320. Thus, media server 324 can provide an interface to the media presentation components (e.g., speakers, display, etc.) of playback device 320.

In some implementations, playback device 320 can include media remote 326. For example, media remote 326 can be a software server or service that allows for remotely controlling media server 324. Remote control devices (e.g., remote control device 310) can request playback state information from media remote 326 and send media playback control settings to media remote 326. Media remote 326 can communicate with media server 324 to obtain the playback state information and/or provide the playback control settings to media server 324.

In some implementations, playback device 320 can include media receiver 328. For example, media receiver 328 provides the network and/or logical interfaces for receiving media streams and remote control requests from other computing devices. Media receiver 328 works in conjunction with session manager 330 to route messages to and from connected external devices, such as remote control device 310. For example, session manager 330 manages the network and/or logical communication channels for streaming media connections and control connections for playback device 320. Session manager 330 can maintain a database of channels or connections. For example, when a computing device connects to media receiver 328, session manager 330 can store information that identifies the type of connection (e.g., streaming/master connection or remote control connection) and an identifier (e.g., token) for the computing device making the connection. Since playback device 320 may only have one master connection (e.g., incoming streaming connection), session manager 330 can store information describing a single master connection and, possibly, multiple control connections. This connection data can be used by media receiver 328 and/or session manager 330 to route control messages and/or streaming media to the various devices connected to playback device 320.

In some implementations, media receiver 328 can cause session manager 330 to store the communication channel information so that subsequent messages can be routed to remote control device 310. For example, the communication channel information can include a channel type (e.g., control, streaming) and a channel identifier (e.g., an identifier associated with the requesting device). After media receiver 328 receives the playback state request, media receiver 328 can send the request to media remote 326. Media remote 326 can obtain playback state information from media server 324 and send the playback state information to media receiver 328. For example, the playback state information can include descriptive information (e.g., title, artwork, artist, length, etc.) about the media item being played. The playback state information can indicate a current position or location within the media item at which playback device 320 is playing. The playback state information can include information describing the capabilities and/or features of media application 322 and/or playback device 320 so that media remote 312 can generate and present the appropriate user interface controls. Media receiver 328 can then send the playback state information to media server 314 on remote control device 310 over the previously established control communication channel. Media server 314 can send the playback state information to media remote 312. Media remote 312 can generate GUI 100 and/or GUI 200 using the playback state information received from playback device 320.

In some implementations, after generating GUI 100 and/or GUI 200, media remote 312 on remote control device 310 may send playback commands to playback device 320. For example, the user of remote control device may select a playback control (e.g., volume, fast forward, rewind, skip, pause, etc.) from one of the graphical user interfaces generated by media remote 312. Media remote 312 can detect the selection of the control and send a corresponding control command to media server 314. Media server 314 can send the control command to media receiver 328 and media receiver can send the control command to media remote 326. Media remote 326 can then cause media server 324 to perform the indicated media control command (e.g., adjust volume, play, pause, fast forward, etc.). After the command is executed, media remote 326 can send playback state information back to media remote 312 on remote control device 310, as described above so that media remote 312 can update its graphical user interfaces.

In some implementations, after generating GUI 100 and/or GUI 200, media remote 312 on remote control device 310 may send playback commands to playback device 310. For example, the user of remote control device may select a playback control (e.g., volume, fast forward, rewind, skip, pause, etc.) from one of the graphical user interfaces generated by media remote 312. Media remote 312 can detect the selection of the control and send a corresponding control command to media server 314. Media server 314 can send the control command to media receiver 328 and media receiver can send the control command to media remote 326. Media remote 326 can then cause media server 324 to perform the indicated media control command (e.g., adjust volume, play, pause, fast forward, etc.). After the command is executed, media remote 326 can send playback state information back to media remote 312 on remote control device 310, as described above so that media remote 312 can update its graphical user interfaces.

Figure 4:
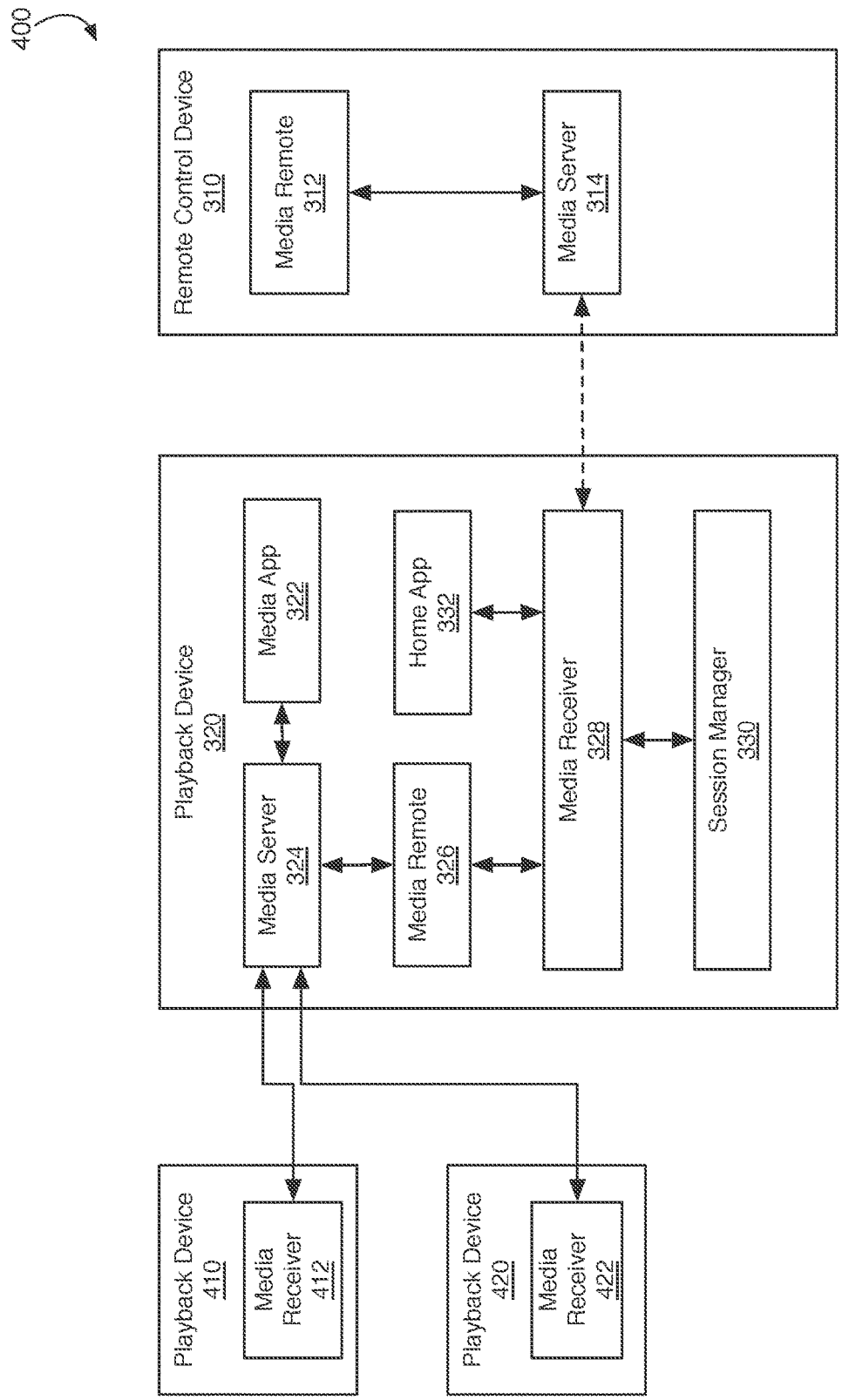
FIG. 4 is a block diagram of an example system for remotely controlling a playback group from a remote control device.

FIG. 4 is a block diagram of an example system 400 for remotely controlling a playback group from a remote control device. For example system 400 can be similar to system 300. However, in system 400 playback device 320 is not only playing a media item (e.g., through a local speaker) but is also streaming the media item to playback device 410 and playback device 420 for synchronous playback. Thus, playback device 320, playback device 410, and playback device 420 form a group (e.g., dynamic or persistent) of playback devices. The group may be dynamic or persistent depending on configuration, as described further below. Playback devices 410 and/or 420 may be configured similarly to playback device 320. Playback devices 410 and/or 420 may have the same features (e.g., all wireless speakers) or may have different features (e.g., set-top-box and wireless speakers).

In some implementations, remote control device 310 can connect to and receive playback state information from playback device 410 and/or playback device 420 in a similar manner as playback device 320. For example, while all of the components of playback device 320 are not represented in playback device 410 and playback device 420, these components exist within these playback devices. Thus, remote control device 310 can establish a quiet control channel to media receiver 412 on playback device 410 and media receiver 422 on playback device 420 and receive playback state information using similar mechanisms as described above for playback device 320. Since playback device 320 is the device streaming media to playback device 410 and playback device 420, playback device 320 will establish a streaming communication channel (e.g., a master channel) with media receiver 412 on playback device 410 and media receiver 422 on playback device 420.

In some implementations, remote control device 310 will only send control commands playback device 320 (e.g., the primary device, master device, etc.). For example, although remote control device 310 establishes network connections with all three playback devices, remote control device will only send information requests and commands to the primary or master playback device (e.g., discoverable streaming device) that is controlling playback of the media item. Remote control device 310 can determine the primary playback device based on group member attributes provided to remote control device 310 by each playback device. For example, the group member attributes can be sent from each playback device to remote control device 310 when remote control device 310 establishes a network connection with each playback device.

The group member attributes can include a group identifier. The group identifier can be assigned to playback devices by the primary playback device. For example, each playback device 410, 420, and 320 can initially be considered a group of one, where each playback device is the primary device in the group and each device has a different group identifier. When the user commands playback device 320 to stream media to playback device 410 and playback device 420, playback device 320 can push its group identifier to playback devices 410 and 420 so that they also have the same group identifier.

The group member attributes can include a group leader flag. For example, if the playback device (e.g., playback device 320) is the group leader (e.g., primary playback device), the group leader flag will be set to true. If the playback device (e.g., playback device 410) is not the group leader, the group leader flag will be set to false. Thus, media remote 312 on remote control device 310 can quickly identify the primary playback device based on the group leader flags received from the playback devices.

The group member attributes can include a flag indicating whether the group leader is discoverable. For example, some streaming devices are discoverable (e.g. wireless speakers, set-top-boxes, televisions, etc.) and some streaming devices are not discoverable (e.g., single user devices, smartphones, tablet computers, etc.). The group leader discoverable flag indicates whether the group leader (e.g., primary playback device, streaming device, etc.) can be reached directly by remote control device 310. If the streaming device is not discoverable, then one of the forwarding mechanisms described below will be used to pass messages, requests, or commands to the non-discoverable streaming device.

In some implementations, the group member attributes can include a flag indicating whether the playback device supports relaying messages to non-discoverable streaming devices (e.g., primary or master devices). If this flag is set to true, then the playback device can be used to forward messages from remote control device 310 to a non-discoverable streaming device, as described below. Additional group member attributes may be described below when describing persistent groups.

In some implementations, media remote 312 can present a group of playback devices as a single entity on GUI 100 and/or GUI 200, as described above. For example, when remote control device 310 receives group member attributes from playback device 320, playback device 410, and playback device 420, media remote 312 can determine that all three playback devices have the same group identifier and, therefore, belong to the same playback group. Thus, instead of presenting three different playback devices on GUI 100 and/or GUI 200, media remote 312 will present a single playback group graphical element (e.g. graphical element 130, graphical element 140) to represent all three devices.

When the user provides input to a playback control on GUI 200 to adjust the media playback (e.g., volume, play, pause, skip, etc.) of the playback group, media remote 312 will send the command to adjust the media playback to the primary playback device (e.g., playback device 320), as indicated by the playback group member attributes. Upon receipt of the command, primary playback device 320 will adjust the media playback for all members of the playback group. For example, primary playback device 320 will cause secondary playback devices 410 and 420 to adjust playback according to the command received from media remote 312.

Figure 5:
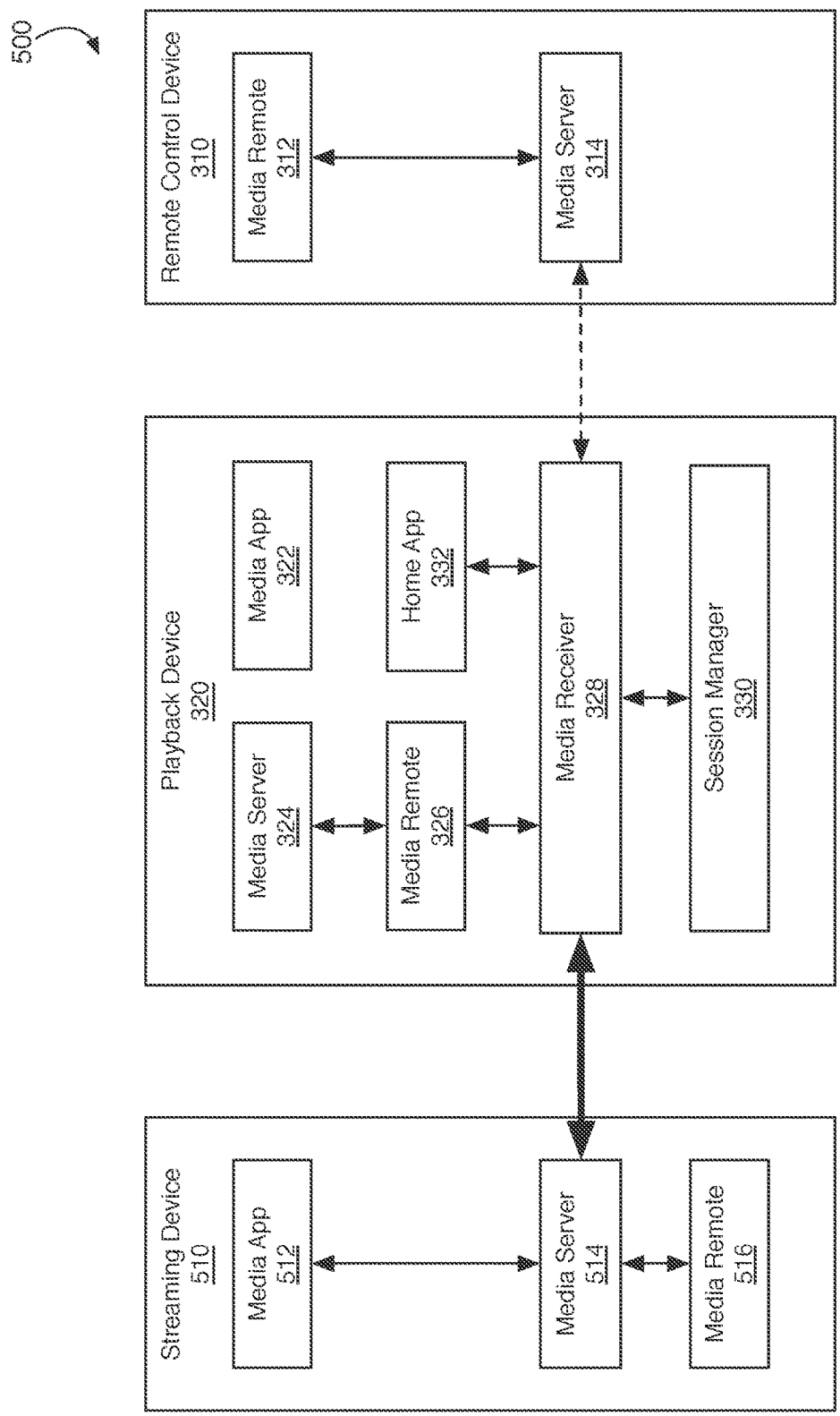
FIG. 5 is a block diagram of an example system for remotely controlling a non-discoverable playback device from a remote control device.

FIG. 3 and FIG. 4 above describe the playback and remote control architecture where the primary playback device (e.g., streaming device, master device, etc.) is directly reachable by remote control device 310. For example, playback device 320 is reachable because it advertises its existence and ability to accept control and/or streaming connections. FIG. 5 below describes the playback and remote control architecture where the primary playback device (e.g., streaming device, master device, etc.) is not directly reachable by remote control device 310. In this situation, remote control device 310 relies upon a playback device (e.g., playback device 320) to relay or forward requests and commands to the primary playback device using the streaming connection established by the primary playback device.

FIG. 5 is a block diagram of an example system 500 for remotely controlling a non-discoverable playback device from a remote control device. As described above, a non-discoverable playback device can be a computing device that does not advertise its existence and where a connection to the non-discoverable device cannot be initiated by another device.

In some implementations, system 500 can include remote control device 310, playback device 320, and/or streaming device 510. For example, streaming device 510 may be a non-discoverable device. Streaming device 510 may be a computing device with features similar to remote control device 310. For example, streaming device 510 may be both a streaming device that streams media to playback device 320 and a remote control device that is connected to other playback devices (not shown).

In some implementations, streaming device 510 can include media application 512. For example, media application 512 can be an application configured to play media from a local media library on streaming device 510 or from a network resource, like a network media service. The user of streaming device 510 can provide input to media application 512 to cause media application 512 to stream media to playback device 320. Media application 512 can send a request to media server 514 to establish a streaming connection (e.g., a master connection) with playback device 320. Media server 514 can establish a streaming connection by sending a request to establish a streaming connection to media receiver 328 on playback device 320. If another streaming device is already streaming media to playback device 320, media receiver 328 may terminate the existing streaming connection and establish a streaming connection with streaming device 510. Thus, streaming device 510 effectively hijacked the streaming connection to playback device 320. After establishing the streaming connection (indicated by bold line with arrows), session manager 330 can store connection information indicating the type of connection (e.g., streaming or master) and an identifier for the connection (e.g., a device identifier for streaming device 510).

After establishing the streaming connection to media receiver 328, media application 512 can send media data to media server 514 and media server 514 can stream the media data (e.g., song, movie, tv show, podcast, etc.) to media receiver 328. Media receiver 328 can send the streamed media data to media server 324 and media server 324 can cause the media data to be presented by playback device 320 (e.g., through speakers, display, etc.). In some implementations, if playback device 320 is part of a playback group, playback device 320 can send the streamed media to the other playback devices in the group for playback. In some implementations, if playback device 320 is part of a playback group, streaming device 510 can send the streamed media directly to the other playback devices in the group for playback. Streaming device 510 can determine the playback devices that are members of the same group based on the group attribute information described above.

In some implementations, playback device 320 relays messages from remote control device 310 to streaming device 510. As described above, since streaming device 510 is not discoverable, remote control device 310 cannot send control messages directly to streaming device 510. To obtain playback state information and send playback commands to streaming device 510, remote control device 310 can send requests and commands for the master device (e.g., streaming device 510) to playback device 320 and playback device 320 can forward the requests and commands to streaming device 510.

As described above, media remote 312 can receive group attribute information from playback device 320. If the group attributes indicate that the group leader is not discoverable and that playback device 320 supports relaying requests to the group leader (e.g., streaming device 510), then media remote 312 can determine that remote control requests and commands should be routed to streaming device 510 through playback device 320.

In some implementations, media remote 312 on remote control device 310 can send a request to media server 314 to obtain playback state information for the playback group corresponding to playback device 320. Media receiver 328 can determine that, since playback device 320 is not the group leader (e.g., primary device), the request should be forwarded to streaming device 510. Media receiver 328 can send the request for playback state information to media server 514 on streaming device 510 along with an identifier for the control channel established for remote control device 310. Media server 514 can send the playback state request to media remote 516 on streaming device 510. Media remote 516 can determine the playback state information and send the playback state information to media receiver 328 on playback device 320 along with the identifier for the control channel associated with remote control device 310. Media receiver 328 can use the identifier to determine which control channel managed by session manager 330 to use to send the playback state information to remote control device 310. After determining the correct control channel, media receiver 328 can send the playback state information to media server 314 on remote control device 310. Media server 314 can send the playback state information to media remote 312 on remote control device 310 so that media remote 312 can generate and present GUI 100 and/or GUI 200 having the state information provided by streaming device 510.

In some implementations, media playback control commands can be routed from remote control device 310 to streaming device 510 through playback device 320 in a similar manner as playback state information request. When media remote 516 on streaming device 510 receives the playback control command, media remote 516 can execute the command locally (e.g., on streaming device 510) and cause all playback devices being streamed to (e.g., playback device 320) to execute the same command. However, in some situations, media playback control commands that are forwarded by playback device 320 can be intercepted and executed at playback device 320. For example, instead of waiting to receive a "pause" command from streaming device 510 that was routed through playback device 320, playback device 320 can intercept the pause command as it is routed from remote control device 310 through playback device 320 to streaming device 510 and execute the pause command. Thus, playback device 320 can stop playing the currently playing media more quickly than if playback device 320 waited to receive the pause command from streaming device 510.

Figure 6:
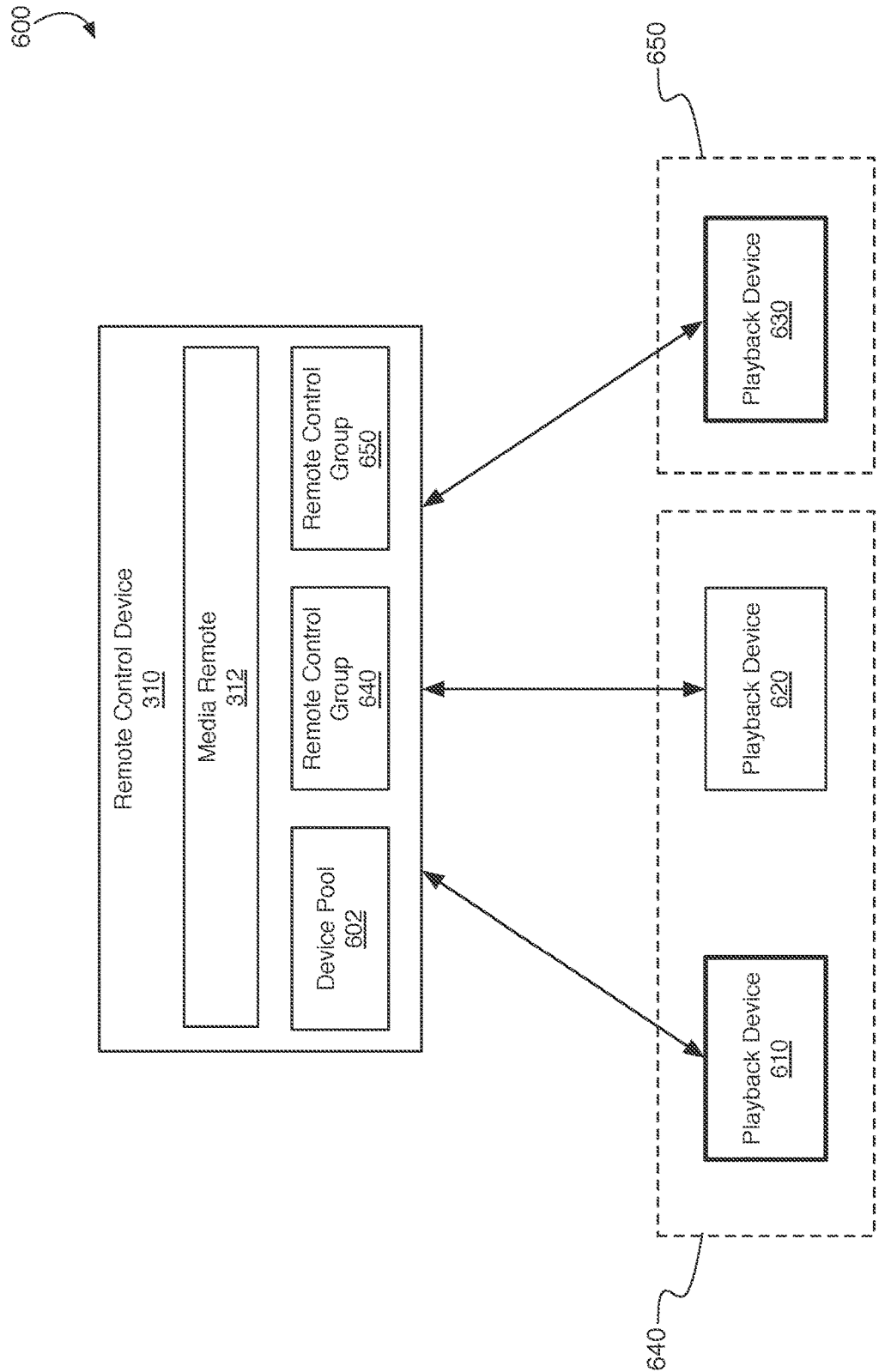
FIG. 6 is a block diagram of an example system for managing dynamic playback device groups.

FIG. 6 is a block diagram of an example system 600 for managing dynamic playback device groups. In some implementations, system 600 can be configured similarly to systems 300, 400, and 500 described above. For example, system 600 can include remote control device 310 and playback devices 610, 620, and/or 630. Playback devices 610, 620, and/or 630 can be configured similarly to playback device 320 described above. For example, playback devices 610, 620, and/or 630 can advertise their availability using wired or wireless network broadcasts. Playback devices 610, 620, and/or 630 can advertise the services they provide, such as the streaming media receiver and message relay services described above.

After receiving the advertisement messages, remote control device 310 can establish network connections (e.g., wired, wireless, peer-to-peer, Wi-Fi, etc.) with each of the playback devices 610, 620, and/or 630. These network connections may be maintained (e.g., persistent), even though the type of logical connection (e.g., master, control, streaming, etc.) and/or data routing to or through these playback devices may change. Maintaining a persistent network connection with each of these playback devices allows remote control device 310 to adjust to the dynamically changing topology of the network (e.g., changing playback groups) without having to incur the expense (e.g., in both time and processing) of tearing down and reestablishing the network connections, as may be required if remote control device 310 only established a network connection with the primary playback device in a group.

In some implementations, remote control device 310 may store and maintain playback device pool 602. For example, device pool 310 can be a database that stores information describing or identifying each network connection to each playback device (e.g., playback devices 610, 620, 630). Device pool 310 can store all of the playback group attributes (e.g., dynamic and/or persistent group attributes) reported by each playback device. For example and as briefly described above, each playback device can report (e.g., broadcast, advertise, etc.) its playback group attributes to remote control device 310 upon establishing a network connection with remote control device 310 and/or anytime these playback group attributes change.

In some implementations, the playback group attributes can include a group identifier that identifies the dynamic playback group or dynamic playback groups to which the playback device belongs. The playback group attributes can include a group leader flag that when set to true indicates that the reporting playback device is the leader or primary device of the dynamic playback group. The playback group attributes can include a flag (e.g., true, false) indicating whether the dynamic playback group leader is discoverable, as described above. The playback group attributes can include a flag that when set to true, indicates that the reporting playback device supports relaying messages to/from a non-discoverable group leader (e.g., master device, streaming device, single user device, etc.).

In some implementations, the playback group attributes can include persistent group attributes. For example, the persistent group attributes can include a persistent group identifier that can be used to identify playback devices that belong to the same persistent group (e.g., stereo pair of playback devices, surround sound group of playback devices. In some implementations, playback devices that have the same persistent group identifier can be treated as if they were a single device, as described above. The persistent group attributes can include a persistent group leader flag that indicates whether the reporting playback device is the leader or primary device within the persistent group. The persistent group attributes can include a group member is reachable flag that indicates whether all other persistent group members are reachable or not. In the case of a stereo pair of playback devices (e.g., a persistent group of two), when the group member is reachable flag is set to false, this indicates that the other playback device in the persistent group is not reachable. In the case of a surround sound speaker group (e.g., persistent group of more than two playback devices), when the group member is reachable flag is set to false, this indicates that at least one other playback device in the persistent group is not reachable. This reachable flag can have an impact on streaming media and/or control message routing, as described further below.

After collecting group attributes from each connected playback device (e.g., playback devices 610, 620, 630, etc.), media remote 312 on remote control device 310 can determine how to group the reporting playback devices based on the playback group attributes stored in device pool 602. For example, playback device 610 may report a playback group identifier value of one (1), a group leader flag value of true, and a group leader discoverable flag value of true, among other group attributes. Playback device 620 may report a playback group identifier value of one (1), a group leader flag value of false, and a group leader discoverable flag value of true, among other group attributes. Playback device 630 may report a playback group identifier value of two (2), a group leader flag value of true, and a group leader is discoverable flag value of true, among other group attributes.

Based on these reported group attributes, media remote 312 can determine that playback device 610 and playback device 620 are members of the same playback group 640 because they have reported the same playback group identifier (e.g., playback group identifier=1). Media remote 312 can also determine that playback device 610 is the group leader based on the fact that playback device 610 reported a playback group leader flag value of true. Thus, a logical control channel can be established between playback device 610 and remote control device 310 so that playback state and playback control requests for playback group 640 can be directed to playback device 610 since playback device 610 is the leader or primary device in group 640. Media remote 312 can also determine that playback state and control requests can be routed directly to playback device 610, e.g., rather than being forwarded or relayed through another device, since the playback group leader is discoverable flag reported by playback device 610 has a value of true.

Similarly, media remote 312 can determine that playback device 630 is in a group 650 by itself since playback device 630 is the only playback device to report a playback group identifier having the value two (2). Media remote 312 can determine that playback device 630 is the group leader for playback group 650 based on the fact that playback device 610 reported a playback group leader flag value of true. Thus, a logical control channel can be established between playback device 630 and remote control device 310 so that playback state and playback control requests for playback group 650 can be directed to playback device 630 since playback device 630 is the leader or primary device in group 650. Media remote 312 can also determine that playback state and control requests can be routed directly to playback device 630, e.g., rather than being forwarded or relayed through another device, since the playback group leader is discoverable flag reported by playback device 610 has a value of true.

As described above, a single playback device can belong to multiple dynamic playback groups. For example, playback device 610 and playback device 620 can report group attributes that indicate they belong to the same dynamic playback group 640. Playback device 620 and playback device 630 can report group attributes that indicate they belong to the same dynamic playback group that is different than group 640. Thus, playback device 620 may belong to and report group attributes for two different playback dynamic groups.

After media remote 312 determines the playback groups based on the reported playback group attributes, media remote 312 can generate GUI 100 and/or GUI 200 based on the determined playback groups. The user of remote control device 310 can then view playback status information related to the playback groups and/or control the playback of media being played by the playback groups using the user interface features described above with respect to FIG. 1 and FIG. 2.

After changing these playback group attributes, playback devices 610, 620, and/or 630 can report the playback attributes to remote control device 310 and remote control device 310 can store the playback group attributes in device pool 602 as described above. After receiving the updated playback group attributes from playback devices 610, 620, and/or 630 at remote control device 310, media remote 312 can determine, based on the reported playback group attributes, that playback devices 610, 620, and/or 630 now belong to the same playback group (e.g., playback group 650) and that playback device 630 is the primary playback device in the playback group. Media remote 312 can then reconfigure GUI 100 and/or GUI 200 to represent the new playback group topology and send playback state information requests and/or playback commands for playback group 650 to the primary playback device, playback device 630. Thus, playback groups can be dynamically configured and reconfigured and media remote can dynamically configure and reconfigure the GUIs needed to remotely control the playback groups.

After changing these playback group attributes, playback devices 610, 620, and/or 630 can report the playback attributes to media remote 312 and remote control device 310 can store the playback group attributes in device pool 602 as described above. After receiving the updated playback group attributes from playback devices 610, 620, and/or 630 at remote control device 310, media remote 312 can determine, based on the reported playback group attributes, that playback devices 610, 620, and/or 630 now belong to the same playback group (e.g., playback group 650) and that playback device 630 is the primary playback device in the playback group. Media remote 312 can then reconfigure GUI 100 and/or GUI 200 to represent the new playback group topology and send playback state information requests and/or playback commands for playback group 650 to the primary playback device, playback device 630. Thus, playback groups can be dynamically configured and reconfigured and media remote can dynamically configure and reconfigure the GUIs needed to remotely control the playback groups.

In some implementations, remote control device 310 can be a streaming device similar to streaming device 510 described above. The user of remote control device 310 can provide input to remote control device 310 to stream media to playback group 650 (now including playback device 610, 620, and 630). In some implementations, remote control device 310 can stream media to only the primary playback device in playback group 650 (e.g., playback device 630) and the primary playback device can stream the received media to other playback devices in the group. In some implementations, remote control device 310 can stream media directly to each playback device in playback group 650 and avoid the delays and connectivity issues involved in forwarding the media stream from the primary playback device to the other playback devices in the playback group.

Figure 7:
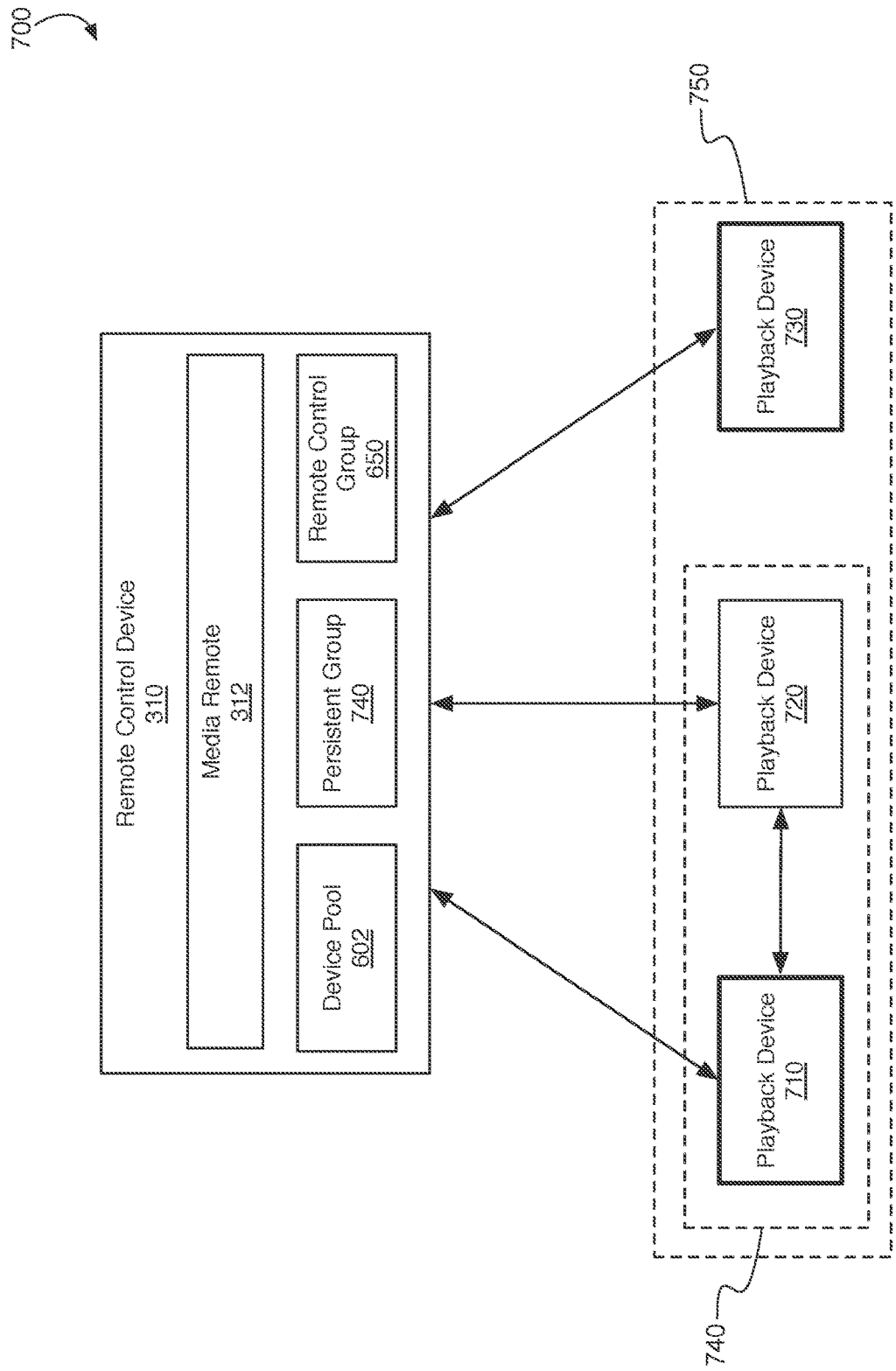
FIG. 7 is a block diagram of an example system for managing persistent playback groups.

FIG. 7 is a block diagram of an example system 700 for managing persistent playback groups. For example, system 700 can correspond to system 600 described above. System 700 can include remote control device 310 and playback devices 710, 720, and/or 730. As described above, remote control device 310 can establish a network connection with each playback device 710, 720, and 730. Each playback device can report its playback group attributes, including persistent group attributes, to remote control device 310. Remote control device 310 can store the playback group attributes, network connection identifiers, control channel identifiers, and/or streaming channel identifiers in device pool 602.

In some implementations, the playback group attributes reported by playback devices 710, 720, and/or 730 can include persistent group attributes. For example, a user can configure two or more devices as a persistent group. For example, the user can configure a persistent group to operate as a stereo pair of smart speakers. The user can configure a persistent group to operate as a surround sound system (e.g., 5.1 surround sound).

In some implementations, the persistent group attributes can include a persistent group identifier. Similar to dynamic playback groups, playback devices that are members of a persistent playback group can be assigned the same persistent group identifier. For example, initially, individual playback devices can each have a unique persistent group identifier. When playback devices are combined into a persistent playback group, the playback group identifier of one of the playback devices (e.g., the playback device the user is interacting with to create the persistent playback group) can be pushed to the other playback devices in the persistent playback group so that all playback devices in the persistent playback group have the same persistent group identifier. If a user provides input to playback device 710 having a persistent group identifier of 10 to create a persistent playback group with playback device 720, playback device 710 can send the persistent group identifier 10 to playback device 720 and playback device 720 can change its persistent group identifier to 10. Thus, playback device 710 and playback device 720 can be configured as a stereo pair (e.g., of speakers) and can both be assigned a persistent group identifier of 10. When media remote 312 analyzes the data in device pool 602, media remote 312 can determine that playback device 710 and playback device 720 have the same persistent group identifier and can determine that playback device 710 and playback device 720 form persistent group 740. Media remote 312 can then present persistent group 740 on GUI 100 and/or GUI 200 as if persistent group 740 were a single device.

In some implementations, the persistent group attributes can include a flag indicating whether the reporting playback device is the persistent group leader. Media remote 312 can use the leader flag to determine to which playback device in a persistent group to send control requests (e.g., information requests, control commands, etc.). For example, even though remote control device 310 maintains network connections to each playback device, media remote information requests and/or commands are directed to the leader (e.g., primary device, master device, etc.) in each persistent group.

In some implementations, the persistent group attributes can include a group member is reachable flag that indicates whether the other playback devices in a persistent group are reachable by the reporting playback device. For example, members of a persistent group can monitor the availability of other members of the persistent group. For example, playback device 710 can establish a control connection with playback device 720. If playback device 720 is unplugged, moved, or otherwise unavailable, playback device 710 will determine that playback device 720 is unreachable and will set its group member is reachable flag to false. After changing this persistent group attribute (or any group attribute), playback device 710 will report the updated group attributes to remote control device 310. Media remote 312 can then update its GUIs to reflect the change in status of the persistent playback group.

In some implementations, a persistent group can be a playback device within a dynamic playback group. For example, persistent group 740 can be added to a dynamic playback group 750 where playback device 730 is the primary device within the dynamic playback group. Upon adding persistent group 740 to dynamic group 750, the dynamic group identifier for playback device 730 can be pushed to playback devices 710 and 720, as described above with reference to FIG. 6. However, playback devices 710 and 720 will have a different persistent group identifier (e.g., identifier 10) than playback device 730. Thus, playback device 710 and playback device 720 will be treated as a persistent group 740 within the dynamic group 750.

This difference between persistent groups and dynamic groups may cause differences in how each playback device presents media items. For example, a media item (e.g., a music track, movie, etc.) can be composed of different audio/video channels (e.g., left, right, front left, front center, front right, rear right, rear left, subwoofer, etc.). When combined into a persistent group, a playback device may present just one channel. For example, in the stereo pair persistent group 740, playback device 710 may be configured to play the right channel of audio for a music media item while playback device 720 may be configured to play the left channel of audio for the same music media item thereby creating stereo playback. Similarly, in a 5.1 surround sound persistent group configuration having six playback devices, each playback device can be configured to present one of six audio channels associated with a movie media item soundtrack (e.g., front left, front center, front right, rear right, rear left, subwoofer, etc.). This is different than how playback device 730 would behave since playback device 730 is not part of a persistent group. When the same music media item is streamed to playback device 730, playback device 730 would present all of the audio channels for the music media item.

In some implementations, when a member of a persistent group is not reachable, the remaining members revert back to non-persistent group behavior. For example, in the stereo pair persistent group 740, playback device 710 may be configured to play the right channel of audio for a music media item while playback device 720 may be configured to play the left channel of audio for the same music media item thereby creating stereo playback. If playback device 720 becomes unreachable, playback device 710 can revert to non-persistent group behavior and play all audio channels (e.g., both right and left audio channels) for the music media item. When playback device 720 becomes reachable again, playback device 710 and playback device 720 can dynamically return to playing right and left audio channels as a stereo pair persistent group. Playback devices in a persistent playback group corresponding to a 5.1 surround sound configuration can behave similarly to the stereo pair persistent group.

In some implementations, a persistent group can include a streaming device (e.g., streaming device 510). For example, the persistent group can include streaming device 510 (e.g., a set-top-box, streaming media player, etc.) and one or more playback devices. The streaming device 510 can be configured as the primary playback device in the persistent group. In some implementations, the playback devices can correspond to a persistent playback group (e.g., stereo pair, 5.1 surround sound, etc.). Thus, the persistent group can be configured to emulate the functionality of a wired in-home entertainment system that includes video (e.g., set-top-box, television, etc.) and stereo or surround sound audio output. Moreover, by configuring streaming device 510 and the playback devices into a persistent group, the audio output from the streaming device 510 will be routed to the playback devices whenever audio output is provided by any media item presented by streaming device 510. Thus, the playback devices in the persistent group can playback media items as if they were a single device.

In some implementations, playback devices within a persistent group are inseparable. For example, if playback device 710 and playback device 720 are both reachable and working properly, the both playback devices 710 and playback device 720 will playback media items together or not at all. For example, if playback device 710 is playing a music media item, then playback device 720 will be playing the same music media item. If playback device 710 receives a command to pause playback, then playback on playback device 720 will be paused as well. If the connection to playback device 720 is hijacked (e.g., a streaming device starts streaming media to playback device 720), then the connection to playback device 710 will be hijacked as well. This behavior for the persistent group ensures that the playback devices within the persistent group behave as a single playback device.

In some implementations, older versions of remote control device 310 may not be able to determine dynamic and/or persistent groups based on group attributes received from playback devices. Thus, instead of presenting one graphical element on GUI 100 and/or GUI 200 for each playback group (e.g., dynamic or persistent), the older remote control devices may represent each playback device individually on GUI 100 and/or GUI 200, described above. To avoid presenting members of a group individually, the playback devices can be configured such that only the primary playback device (e.g., group leader, primary device, master device, etc.) in a playback group advertises its availability and connects to remote control devices. In another variation on this approach, primary playback devices may be configured to advertise to older remote control devices using an advertisement message that the older devices are configured to receive, while secondary playback devices in the playback group advertise to new remote control devices (e.g., remote control device 310) using advertising messages that only newer remote control devices are configured to receive. Thus, newer remote control devices can be configured to receive the old and the new advertisement messages and generate and present playback groups based on the playback attributes that they receive, while older remote control devices will only present the primary playback devices in each playback group which can serve as a proxy for the playback group when presenting GUI 100 and GUI 200, as described above.

Figure 8:
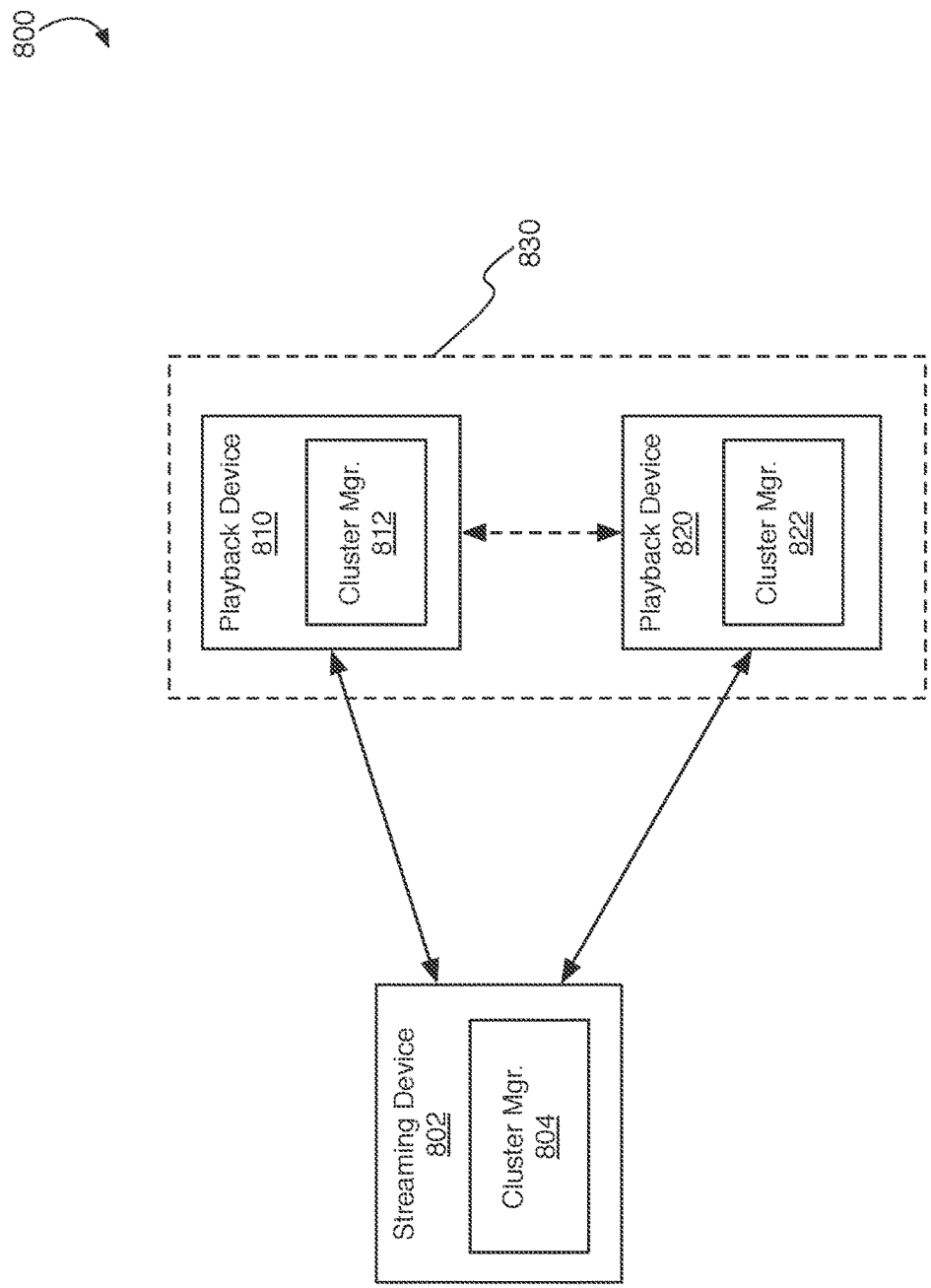
FIG. 8 is a block diagram of a system for streaming media items to a persistent group.

FIG. 8 is a block diagram of a system 800 for streaming media items to a persistent group. In some implementations, streaming devices can interact with persistent groups in various ways. For example, system 800 can correspond to any of the systems described above. System 800 can include streaming device 802 (e.g., corresponding to streaming device 510) and/or playback devices 810 and 820 (e.g., corresponding to playback device 320). Streaming device 802 may have all of the same capabilities of remote control device 310, described above, and therefore is able to determine or detect dynamic and persistent playback groups.

In the example of FIG. 8, playback devices 810 and 820 can be configured as a persistent group 830 (e.g., stereo pair). Based on its software and/or hardware configuration, streaming device 802 may be able to stream to only one playback device or streaming device 802 may be able to stream to multiple playback devices simultaneously. In the example of FIG. 8, streaming device 802 is capable of streaming media items to multiple playback devices simultaneously. Therefore, when the user of streaming device 802 provides input indicating that streaming device 802 should stream media items to persistent group 830, cluster manager 804 of streaming device 802 may establish and manage streaming connections to both playback device 810 and playback device 820. When the streaming connections are established, cluster manager 812 and/or cluster manager 822 can determine (e.g., based on software or hardware version information provided by streaming device 802) that streaming device 802 is capable of streaming to multiple playback device simultaneously and will not attempt to forward the media stream to the other playback device(s) in the persistent group 830.

As described above, when playback device 810 and 820 are configured as a stereo pair, one playback device (e.g., playback device 810) can be configured to present the left audio channel for the streamed media item and the other playback device (e.g., playback device 820) can be configured to present the right audio channel for the streamed media item. If playback device 810 in persistent group 830 becomes unreachable (e.g., unplugged, moved out of range, etc.), then playback device 820 can detect the absence of playback device 810 and automatically play both left and right audio channels. When playback device 810 becomes reachable again, playback device 820 can detect that playback device 810 is reachable and send a message to streaming device 802 to cause streaming device 802 to reconnect to playback device 810. Playback device 820 can then automatically resume presenting only the right audio channel and playback device 810 can resume playing the left audio channel of the media item streamed from streaming device 802.

Figure 9:
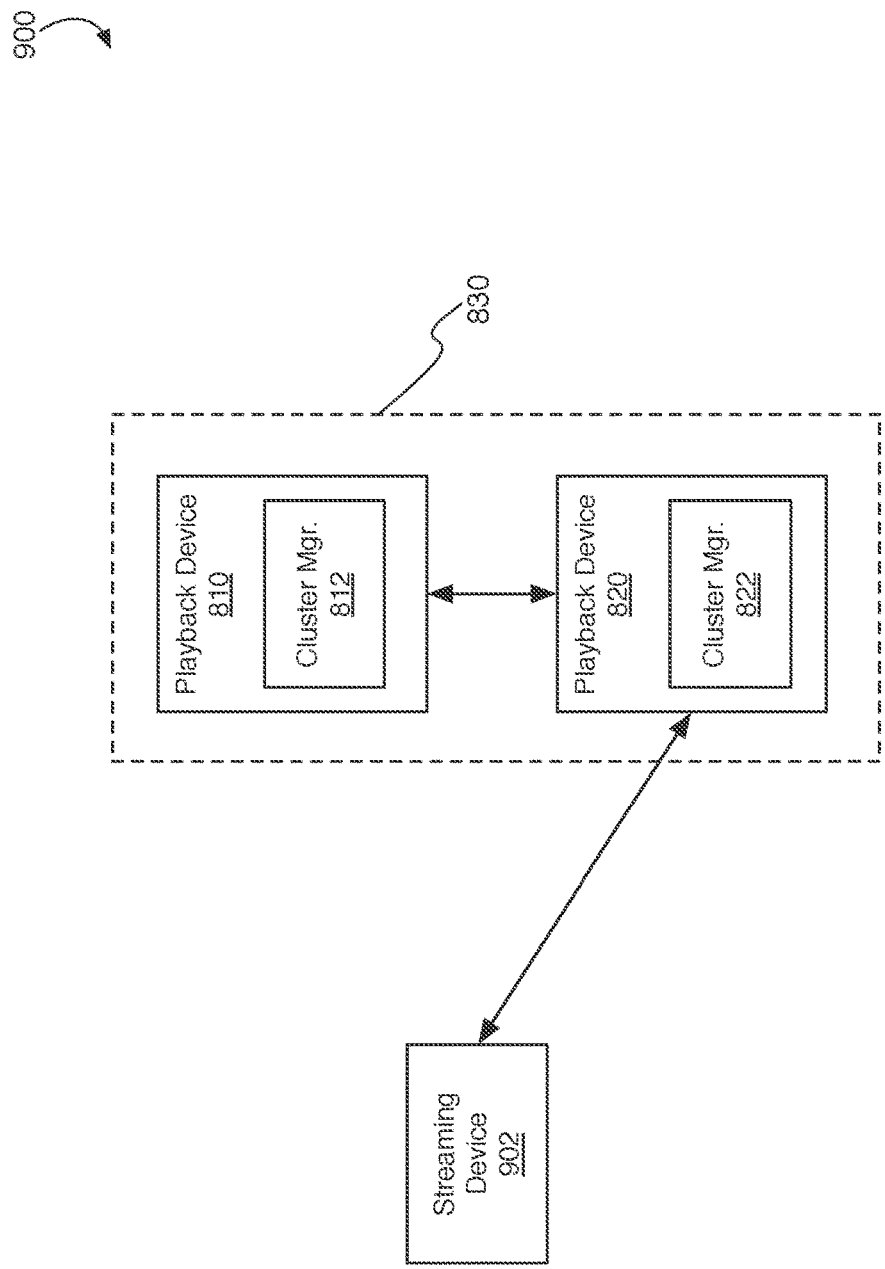
FIG. 9 is a block diagram of a system for streaming media items to a persistent group.

FIG. 9 is a block diagram of a system 900 for streaming media items to a persistent group. In some implementations, streaming devices can interact with persistent groups in various ways. For example, system 900 can correspond to any of the systems described above. System 900 can include streaming device 902 (e.g., configured similarly to streaming device 510) and/or playback devices 810 and 820 (e.g., configured similarly to playback device 320). Streaming device 802 may have all of the same capabilities of remote control device 310, described above, and therefore is able to determine or detect dynamic and persistent playback groups.

In the example of FIG. 9, playback devices 810 and 820 can be configured as a persistent group 830 (e.g., stereo pair). Based on its software and/or hardware configuration, streaming device 902 may be able to stream to only one playback device or streaming device 902 may be able to stream to multiple playback devices simultaneously. In the example of FIG. 9, streaming device 902 is capable of streaming media items to only one playback device at a time. Therefore, when the user of streaming device 902 provides input indicating that streaming device 902 should stream media items to persistent group 830, streaming device 902 will establish a streaming connection to the leader or primary playback device in persistent group 830, playback device 820. When the streaming connection is established, cluster manager 822 can determine (e.g., based on software or hardware version information provided by streaming device 902) that streaming device 902 is not capable of streaming to multiple playback device simultaneously and will forward the media stream to the other playback device(s) (e.g., playback device 810) in the persistent group 830.

As described above, when playback device 810 and 820 are configured as a stereo pair, one playback device (e.g., playback device 810) can be configured to present the left audio channel for the streamed media item and the other playback device (e.g., playback device 820) can be configured to present the right audio channel for the streamed media item. If playback device 810 in persistent group 830 becomes unreachable (e.g., unplugged, moved out of range, etc.), then playback device 820 can detect the absence of playback device 810, will stop forwarding the media stream to playback device 810, and will automatically begin playing both left and right audio channels. When playback device 810 becomes reachable again, playback device 820 can detect that playback device 810 is reachable and resume forwarding the media stream to playback device 810. Playback device 820 can then automatically resume presenting only the right audio channel and playback device 810 can resume playing the left audio channel of the media item streamed from streaming device 902.

Figure 10:
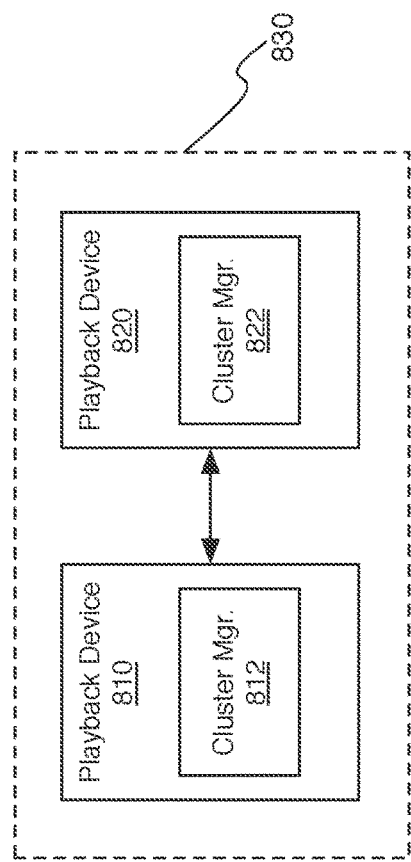
FIG. 10 is a block diagram of a system for presenting media items streamed from a primary playback device within a persistent group.

FIG. 10 is a block diagram of a system 1000 for presenting media items streamed from a primary playback device within a persistent group. For example, system 1000 can correspond to any of the systems described above. System 1000 can include playback devices 810 and 820 (e.g., configured similarly to playback device 320). Playback devices 810 and/or 820 may have all or some of the same capabilities of remote control device 310, described above, and therefore is able to determine and/or detect dynamic and persistent playback groups.

In the example of FIG. 10, playback devices 810 and 820 can be configured as a persistent group 830 (e.g., stereo pair, 5.1 surround sound configuration, etc.). When a user provides input (e.g., voice input, touch input, etc.) to playback device 810 to cause playback device 810 to begin playing a media item (e.g., from an internal media application, media application 322, etc.), playback device 810 can become the primary playback device in persistent group 830. Cluster manager 812 on playback device 810 can then control or manage the streaming connections to the playback devices (e.g., playback device 820) within the persistent group and/or manage streaming the media item to playback device 820.

In some implementations, within a persistent group, the playback device receiving the user input becomes the primary playback device within the persistent group. Because the cluster manager is responsible for managing the devices within the persistent group, the cluster manager only runs on the primary device. Thus, the cluster manager may run on different playback devices depending on with which playback device in a persistent group the user chooses to interact. The cluster manager is configured such that when the primary playback device is playing a media item, the cluster manager causes other playback devices in the persistent group to play the media item as well as long as the other playback devices are available or reachable.

As described above, when playback device 810 and 820 are configured as a stereo pair, one playback device (e.g., playback device 810) can be configured to present the left audio channel for the streamed media item and the other playback device (e.g., playback device 820) can be configured to present the right audio channel for the streamed media item. If playback device 810 in persistent group 830 becomes unreachable (e.g., unplugged, moved out of range, etc.), then cluster manager 822 on playback device 820 can detect the absence of playback device 810, will cause playback device 820 stop streaming the media stream to playback device 810, and will cause playback device 810 to automatically begin playing both left and right audio channels. When playback device 810 becomes reachable again, cluster manager 822 on playback device 820 can detect that playback device 810 is reachable and resume streaming the media stream to playback device 810. Playback device 820 can then automatically resume presenting only the right audio channel and playback device 810 can resume playing the left audio channel of the media item streamed from playback device 820.

Figure 11:
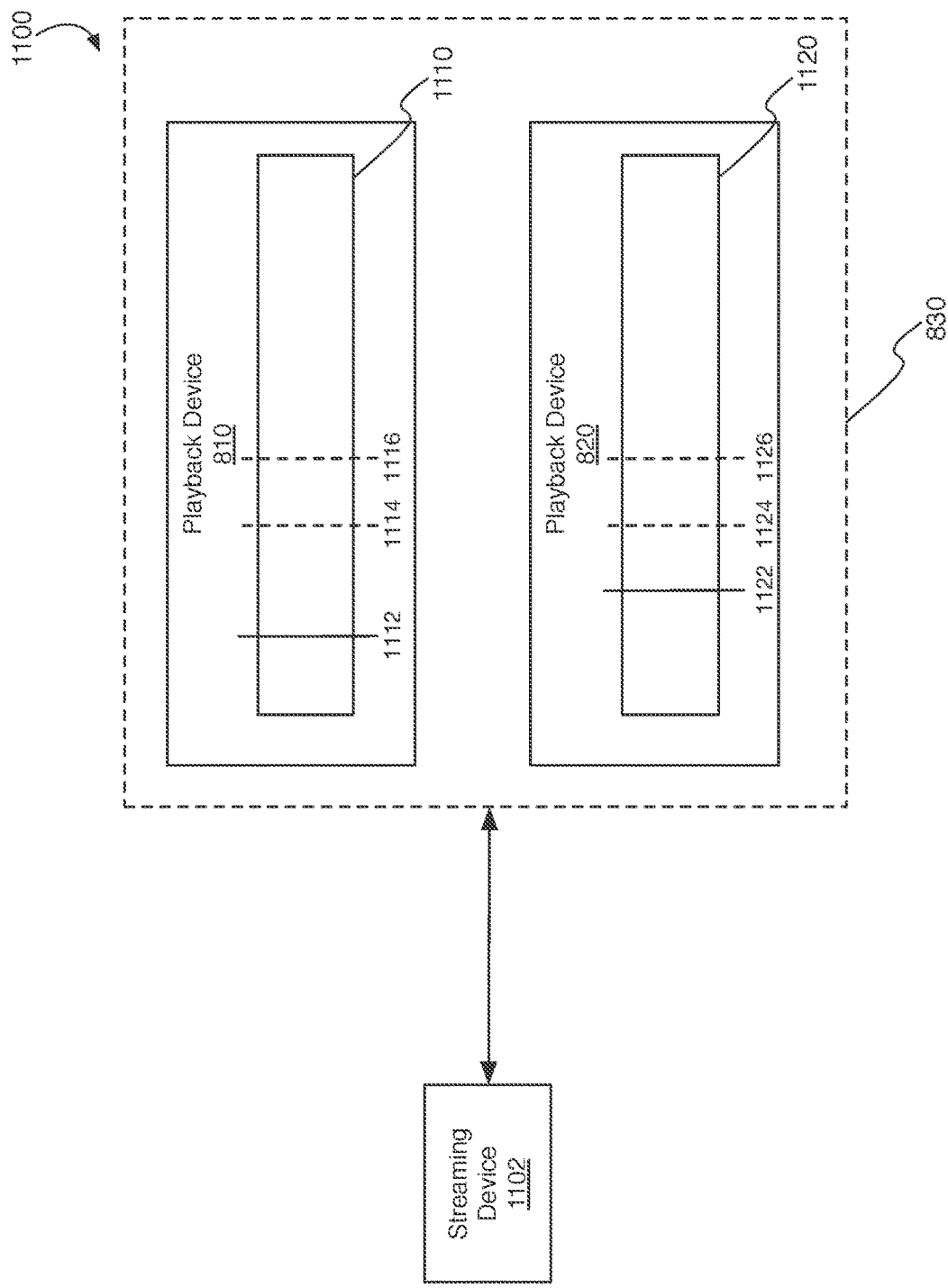
FIG. 11 is a block diagram of an example system for synchronizing resumption of playback between playback devices in a playback group.

FIG. 11 is a block diagram of an example system 1100 for synchronizing resumption of playback between playback devices in a playback group. For example, system 1100 can correspond to any of the systems described above. System 1100 can include playback devices 810 and 820 (e.g., configured similarly to playback device 320). Playback devices 810 and/or 820 may have all or some of the same capabilities of remote control device 310, described above, and therefore is able to determine and/or detect dynamic and persistent playback groups. System 1100 can include streaming device 1102. Streaming device 1102 can correspond to streaming device 510, described above. Streaming device 1102 can correspond to a playback device, such as playback device 320, 810, or 820, described above. Media items can be streamed from streaming device 510 to playback group 830 using any of the mechanisms described above.

In some implementations, streaming device 1102 can synchronize the resumption of playback between playback devices. For example, when streaming media to playback devices 810 and 820, streaming device 1102 can send media data to the playback devices faster than the playback devices can play the media data. Thus, each playback device 810 and 820 can store the media data in respective buffers 1110 and 1120 as it is received and present the media data according to a defined timeline or speed so that the audio and/or video output from playback device 810 and 820 is synchronized.

When the user provides input (e.g., touch, voice, etc.) to streaming device 1102 to pause playback of the streamed media item, streaming device 1102 can send a command to each playback device 810 and 820 to stop playback of the media data. However, due to network latency issues or other causes of delay in receiving the stop command, playback device 810 may stop playback of the media item at a media sample corresponding to location 1112 in buffer 1110 and playback device 820 may stop playback of the media item at a media sample corresponding to location 1122 in buffer 1120. Location 1112 may correspond to media sample at time 1:00 (e.g., one minute) into the media item, for example, while location 1122 may correspond to a media sample at 1:05 into the media item. Since played media samples are removed from the buffers, playback device 820 does not have the media samples necessary to resume playback from location 1112 (e.g., time index 1:00). Thus, if playback is resumed from location 1112, playback device 820 will be silent until playback device 810 reaches location 1122 (e.g., time index 1:05).

To avoid the situation where playback device 810 in playback group 830 plays while playback device 820 in playback group 830 is silent, playback can be resumed from a location in buffers 1110 and 1120 where both playback devices 810 and 820 have media samples available. To accomplish this, in response to receiving the pause command from streaming device 1102, each playback device 810 and 820 can report the position within their respective buffers 1110 and 1120 where each actually stopped playback. Stated differently, each playback device 810 and 820 can report its first available media sample in their respective buffers 1110 and 1120. For example, playback device 810 can send streaming device 1102 an identifier (e.g., time index) for the media sample at location 1112 in buffer 1110. Playback device 820 can send streaming device 1102 an identifier (e.g., time index) for the media sample at location 1122 in buffer 1120.

In some implementations, streaming device can generate a resume playback command that includes a time index and network time for anchoring a playback timeline, and a time index for playing audible sound so that playback of the media item at each playback device 810 and 830 is synchronized. For example, the anchor time index can be used to identify a media item sample in media buffers 1110 and 1120. The anchor time index can be selected such that it occurs at or after the latest (e.g., largest) time index reported by each playback device in the playback group 830. Continuing the example above, since playback device 820 reported a last played sample time index of 1:05 (e.g., corresponding to location 1122) and playback device 810 reported a last played sample time index of 1:00 (e.g., corresponding to location 1112), streaming device 1102 can select anchor sample time index that is 1:05 or later.

Streaming device 1102 can also select an anchor network time for the playback timeline. For example, when streaming device 1102 receives user input indicating that the user wishes to resume playback, streaming device 1102 can select a network time that is close to the current time.

Streaming device 1102 can also select a presentation sample time index for beginning audible (and/or visual) playback of the media item. For example, if streaming device 1102 has determined that the anchor sample time index is 1:10 at network time 'T', then the playback timeline for the media item can start from sample time index 1:10 at network time T. However, the audible and/or visual playback of the media item does not have to occur until a later time specified by the determined presentation sample time index (e.g., at time index 1:10). When streaming device 1102 sends a command to playback devices 810 and 820 to resume playback and specifies an anchor sample time index of 1:10 and an anchor network time 'T' with a presentation sample time index of 1:15, then each playback device 810 and 820 can start their respective playback timelines at sample index 1:10 (e.g., buffer locations 1114/1124) at network time 'T' and delay presenting any audio or video output until sample time index 1:15 (e.g., buffer locations 1116/1126). This allows the devices to synchronize their playback timelines and also begin (resume) human perceptible playback simultaneously. By specifying an anchor sample time index, an anchor network time, and a presentation sample time index, streaming device 1102 can ensure that both playback devices 810 and 820 resume playback at the same time.

Figure 12:
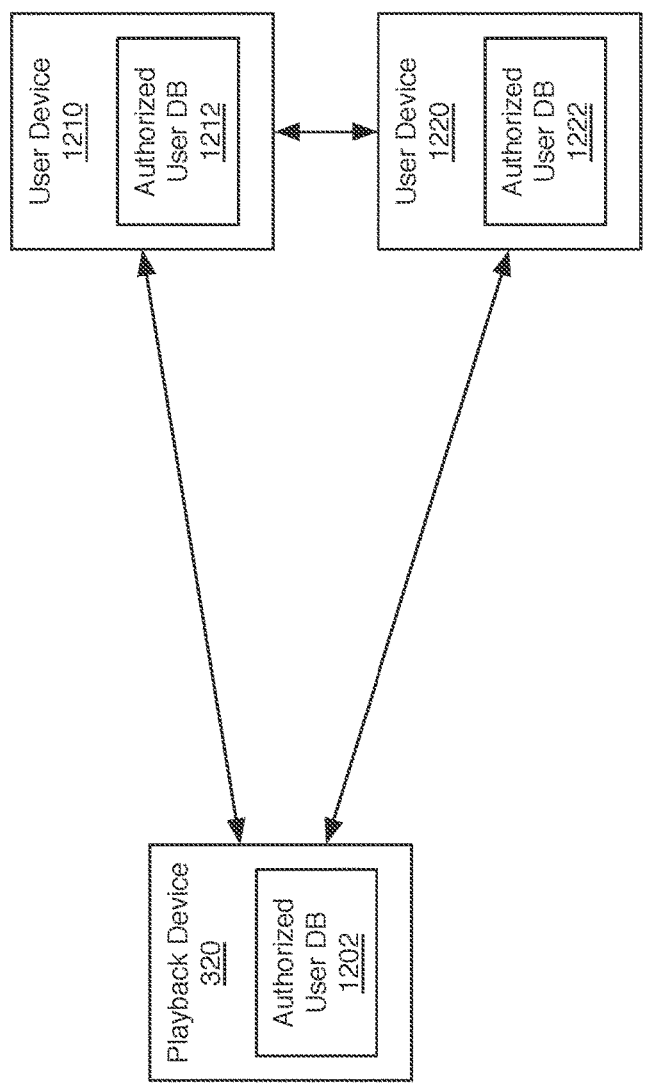
FIG. 12 is a block diagram of an example system for automatically pairing user devices with playback devices.

FIG. 12 is a block diagram of an example system 1200 for automatically pairing user devices with playback devices. For example, system 1200 can correspond to any of the systems described above. Because user devices (e.g., streaming devices, remote control devices, etc.) can connect to the playback devices through peer-to-peer connections (e.g., Bluetooth, peer to peer Wi-Fi, etc.), user devices typically need to go through a pairing process in order to connect to playback devices. The pairing process often requires that each user device connect to a playback device and that a user enters a code or password to pair to and interact with (e.g., stream media, obtain state information, etc.) the playback devices. This pairing process often has to be repeated for each playback device and each user device. System 1200 can reduce the burden of pairing user devices with playback devices by automatically pairing authorized user devices.

In some implementations, a user of user device 1210 can generate authorized users database 1212. For example, user device 1210 may include a home application 332 that allows the user (e.g., home owner, home administrator, etc.) of user device 1210 to specify users and/or user devices (e.g., user device 1220) that are authorized to user playback devices (e.g., playback device 320) within the user's home or other environment. Authorized user database 1212 can include user identifiers and/or device identifiers for each authorized user and/or user device. If the identified users and/or user devices have already been paired with some playback devices, the authorized user database 1212 can include pairing tokens generated and provided by the paired playback devices. For example, authorized user database 1212 can include a mapping of authorized user device identifiers to corresponding pairing tokens generated for each of the authorized user device identifiers. However, when authorized user database 1212 is first created on user device 1210, the authorized user database may not include any pairing tokens.

In some implementations, user device 1210 may be paired with playback device 320. For example, user device 1210 may receive an advertisement from playback device 320 indicating that playback device 320 is available and provides some services (e.g., media streaming, remote control access, etc.). User device 1210 can present a notification to the user of user device 1210 indicating that playback device 320 has been detected. The user of user device 1210 can provide input to user device 1210 to initiate a pairing process between playback device 320 and user device 1210. For example, playback device 320 may present a code to the user and the user can enter the code into a user interface of user device 1210. User device 1210 can send the code to playback device 320 to verify that user device 1210 is proximate to playback device 320 and should be paired.

In some implementations, after pairing with playback device 320, user device 1210 can automatically pair the user devices identified in authorized user database 1212 with playback device 320. To initiate the pairing of the user devices identified in authorized user database 1212 with playback device 320, user device 1210 can send authorized user database 1212 to playback device 320. For example, user device 1210 can send the authorized user database 1212, or a portion of the database 1212 that includes the user identifiers and/or device identifiers for the authorized users in authorized user database 1212, to playback device 320. Playback device 320 can store the received portion of authorized user database 1212 as authorized user database 1202. Playback device 320 can then generate unique pairing tokens for each identified user and/or identified user device in authorized user database 1202. Playback device 320 can store the pairing tokens in authorized user database 1202 in association with each token's respective user identifier and/or device identifier. Playback device 320 can then send a copy of authorized user database 1202, including the pairing tokens, to user device 1210 to complete the pairing process. User device 1210 can then update authorized user database 1212 with the pairing tokens received from playback device 320 so that each user identifier and/or user device identifier in authorized user database 1212 is associated with the appropriate pairing token generated for the user identifier and/or user device identifier by playback device 320.

In some implementations, user device 1210 can synchronize authorized user database 1212 with other authorized user devices. For example, user device 1220 may be an authorized user device of an authorized user identified in authorized user database 1212. User device 1210 can send a portion of the authorized user database 1212 related to the user of user device 1220, including the pairing tokens generated by playback device 320, to user device 1220. For example, user device 1220 can receive and store in authorized user database 1222 the user identifier, devices identifiers, and/or pairing tokens associated with the user of user device 1220. User device 1220 will not receive and store user identifiers, devices identifiers, and/or pairing tokens associated with other users of other devices since the user of user device 1220 is not the home or environment administrator or owner.

User device 1220 can store the received authorized user database 1212 as authorized user database 1222 or update authorized user database 1222 with the data and/or tokens in authorized user database 1212. After saving or updating authorized user database 1222, database 1222 now has the pairing token generated for the device identifier of user device 1220 and/or the user identifier of the user of user device 1220 by playback device 320. When user device 1220 attempts to pair with playback device 320 for the first time, user device 1220 can send the pairing token and its device identifier and/or user identifier to playback device 320 instead of requiring the user to participate in the pairing process by entering a code or other input. When playback device 320 receives the user identifier or device identifier and the pairing token from user device 1220, playback device 320 can compare the pairing token with the pairing tokens stored in authorized user database 1202 to verify that the received pairing token is the same as the pairing token generated by playback device 320 for the identified user or device. After the pairing token is verified (or validated), playback device 320 can allow user device 1220 to utilize the services provided by playback device 320. Thus, user device 1220 can be paired with playback device 320 without requiring the user to participate in the pairing process since the pairing process was performed on behalf of user device 1220 by user device 1210. Thus, user device 1210 served as a proxy for user device 1220 while performing the pairing process on behalf of user device 1220. If the pairing token cannot be verified, playback device 320 can prevent user device 1220 from accessing playback device 320 and/or can initiate a user interactive pairing process with user device 1220, as described above. For example, when the pairing token does not match a token in authorized user database 1202 or when the user identifier or device identifier provided by user device 1220 cannot be found in authorized user database 1202, then playback device 320 can initiate a user interactive pairing process with user device 1220, as described above.

Figure 13:
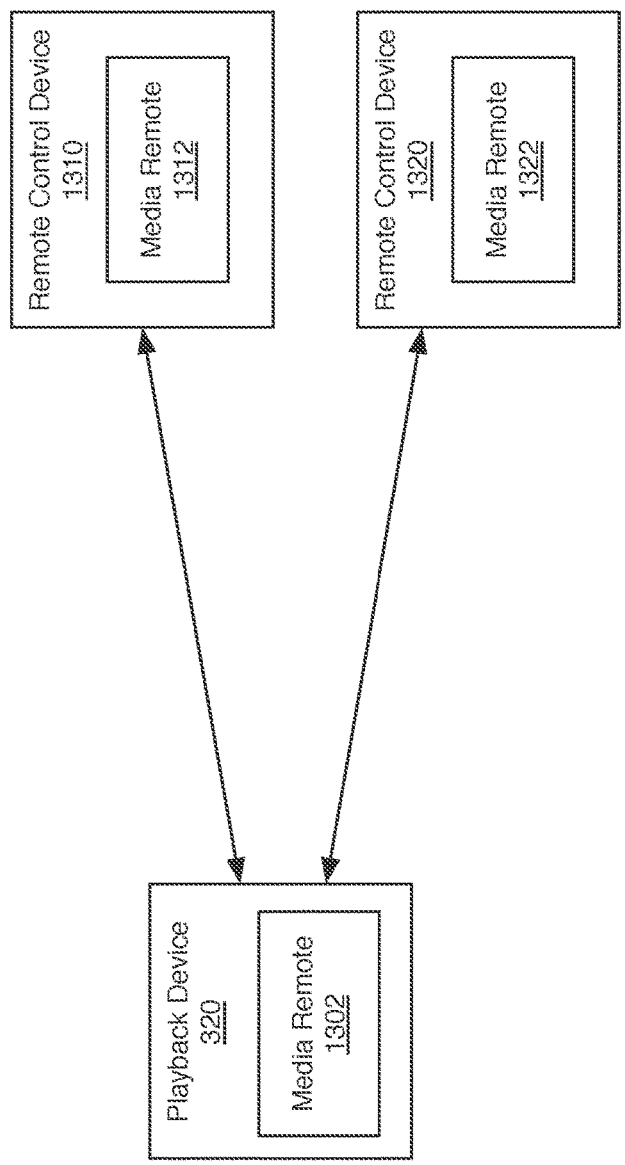
FIG. 13 is a block diagram of an example system for managing volume changes among networked playback devices.

FIG. 13 is a block diagram of an example system 1300 for managing volume changes among networked playback devices. For example, system 1300 can correspond to any of the systems described above. Remote control devices 1310 and/or 1320 can be configured similarly to remote control device 310 described above. Media remote 1312 and media remote 1322 can be configured to present GUI 100 and/or GUI 200 described above and may present volume controls for remotely controlling the playback volume of playback device 320. Media remote 1312 and media remote 1322 can communicate with media remote 1302 using the mechanisms described above to adjust the playback volume on playback device 320 and/or a playback group (e.g., dynamic or persistent group) where playback device 320 is the primary or master playback device in the playback group.

In order to reduce network traffic related to volume input errors, in some implementations, remote control device 1310 can implement an adaptive volume change threshold. For example, volume changes at remote control device 1310 with respect to the volume at playback device 320 where the difference in volume is less than a threshold amount can be ignored and not sent to playback device 320. Volume changes that are less than the threshold can be considered input error (e.g., related to inaccuracies in touch input) and ignored. This threshold can be adaptive such that volume changes at higher volumes (e.g., toward the louder end of the volume range) have a larger change threshold (e.g., 5% of the volume range) that must be exceeded before sending a volume change while volume changes at lower volumes (e.g., closer to zero volume) have a smaller change threshold (e.g., 1% of the volume range) that must be exceeded before sending a volume change to playback device 320.

In some implementations, remote control device 1310 can implement a delay before sending a volume change to playback device 320. For example, instead of sending volume changes to playback device 320 immediately, remote control device 1310 can cache volume changes for a period of time (e.g., 0.5 seconds, 1 second, etc.) after the user has stopped providing input to change the volume and before sending the volume change. Delaying sending the volume change to playback device 320 allows the user time to finalize his or her volume change decision and prevents immediately sending volume changes that the user may not actually want to apply to playback device 320.

In some implementations, remote control device 1310 can delay updating the volume user interface control to reflect the current volume at a network device when the user is currently providing input to the volume user interface control or when the user has recently finished providing input to the user interface control. For example, the user of remote control device 1310 may be providing input to a volume user interface control (e.g., volume control 228, handle 230 of FIG. 2) while another user of remote control device 1320 also adjusts the volume of playback device 320. To avoid a situation where the volume handle 230 moves away from the user's finger while providing the user input to adjust volume, remote control device 1310 can delay updating the volume control display to reflect the actual volume of playback device 320 until a period of time has passed after the user stops providing input to the volume control. For example, if the delay period is one second, then if the user is providing input or was providing input within the last one second, any volume status information received from playback device 320 will be ignored. However, one second after the user stops providing volume input, the volume control presented by media remote 1312 on remote control device 1310 will be updated to reflect the actual volume of playback device 320. Thus, the user will not be confused by a volume control that is not consistent with the user input provided.

Figure 14:
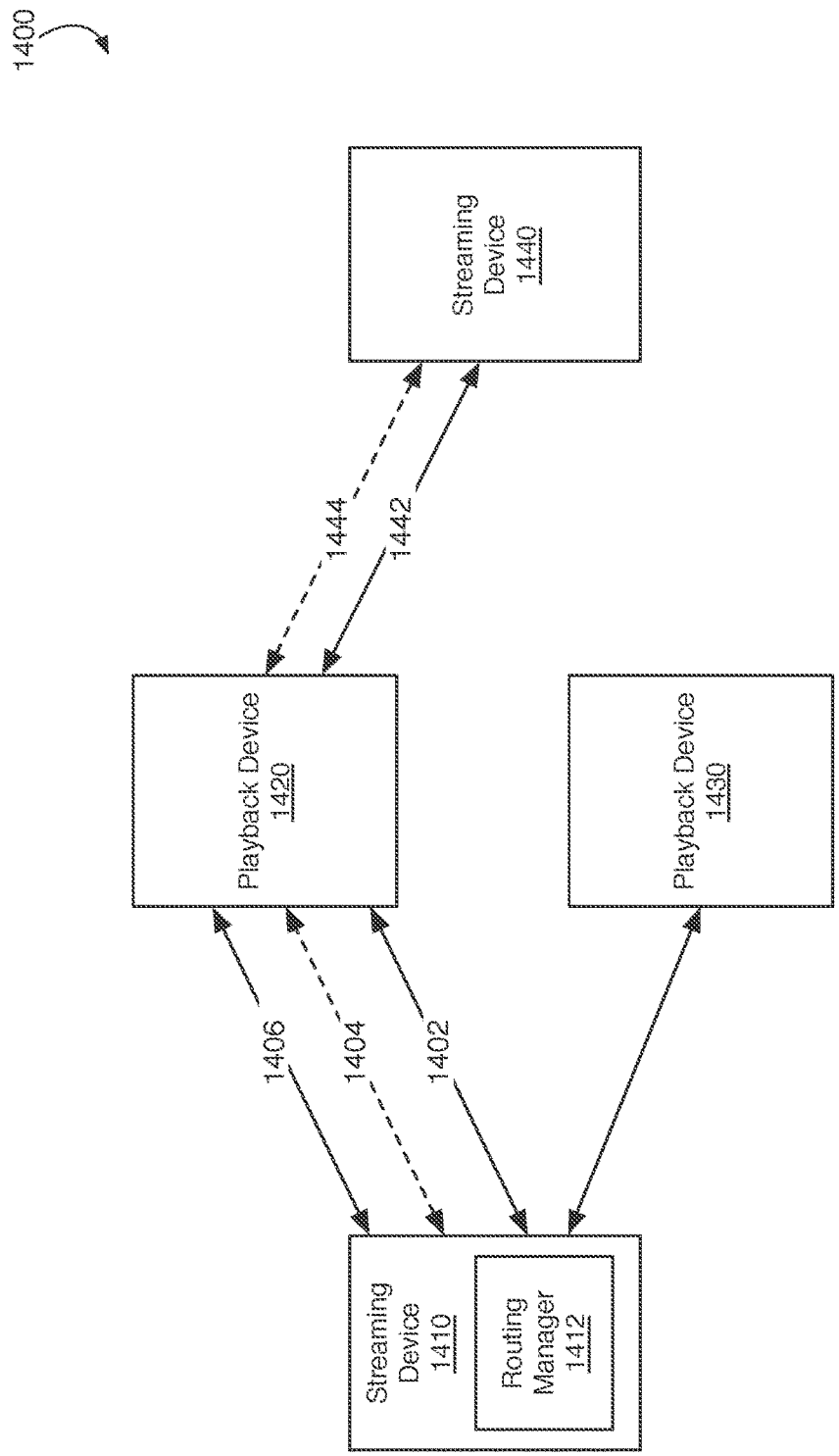
FIG. 14 is a block diagram of an example media system configured to automatically establish streaming media connections between playback devices.

FIG. 14 is a block diagram of an example media system 1400 configured to automatically establish streaming media connections between playback devices. For example, a streaming device can be configured to automatically establish and/or reestablish media streaming connections to playback devices after the connections have been hijacked by another media streaming device.

In some implementations, media system 1400 can include streaming device 1410. For example, streaming device 1410 can correspond to streaming device 510 and/or playback device 320 described above. For example, in some instances, streaming device 1410 can be a playback device 320 that performs the media streaming functions described with reference to streaming device 510.

In some implementations, streaming device 1410 can include routing manager 1412. For example, routing manager 1412 can correspond to session manager 330 described above. Routing manager 1412 can manage a repository of routing information describing available playback devices (e.g. playback devices 1420, 1430, etc.), current connections between streaming device 1410 and other devices, previous connections between streaming device 1410 and other devices, and/or playback group configurations (e.g., which playback devices are in which room of a house, which playback devices are in which dynamic and/or persistent playback groups, etc.).

In some implementations, streaming device 1410 can stream media data to playback device 1420 and/or playback device 1430. For example, streaming device 1410 may be a media streaming device connected to a television, speakers, etc. A user of streaming device 1410 can provide input to streaming device 1410 to cause streaming device 1410 to stream media data (e.g., audio data, video data, etc.) to playback device 1420 and/or playback device 1430. In some implementations, this user input designating playback device 1420 and/or playback device 1430 as playback devices for streaming device 1410 can cause streaming device 1410 to automatically create a dynamic playback group that includes playback device 1420, playback device 1430 and/or streaming device 1410. Streaming device 1410 can establish a connection to playback device 1420 and/or playback device 1430 and stream the user selected media to playback device 1420 and/or playback 1430.

In some implementations, routing manger 1412 can store routing information identifying the routing of the streamed media to playback devices. For example, routing manager 1412 can store routing information indicating the last (e.g., most recent) media routing configuration for streaming device 1410. Thus, routing manager 1412 can store routing information indicating that streaming device 1410 is routing media data to playback device 1420 and/or playback device 1430. Active connections between the devices are represented by solid double arrow lines in FIG. 14. For example, the current streaming media connection between streaming device 1410 and playback device 1420 is represented by line 1402.

As described above, streaming media connections are established between devices using a connection hijacking mechanism. For example, the last device to request the streaming media connection gets to use the streaming media connection. Thus, when streaming device 1440 (e.g., another device similar to streaming device 1410) starts streaming media data to playback device 1420 (e.g., connection 1442), streaming device 1440 will hijack the streaming connection 1402 to playback device 1420. Thus, the connection 1402 between streaming device 1410 and playback device 1420 may be terminated, as illustrated by dashed line 1404.

In some implementations, streaming device 1410 can stop (e.g., pause) presenting (e.g., streaming, playing, etc.) a media item when a playback device is hijacked away from streaming device 1410. For example, when streaming device 1440 hijacks the connection to playback device 1420, streaming device 1410 may receive a message that the connection to playback device 1420 has been hijacked. When playback device 1420 is hijacked away from streaming device 1410, streaming device 1410 may stop presenting (e.g., playing, streaming, etc.) the media item that streaming device 1410 was streaming to playback device 1420. In some implementations, streaming device 1410 will continue presenting the media item when the playback device hijacked by streaming device 1440 is in a different room (e.g., in a house, office, building, etc.) than streaming device 1410.

In some implementations, streaming device 1410 will continue presenting video corresponding to the media item while muting audio corresponding to the media item when the playback device hijacked by streaming device 1440. For example, when streaming device 1410 is streaming live media (e.g., media that cannot be paused, a live sporting event, etc.), streaming device 1410 can continue presenting or streaming video data corresponding to the live media while stopping the stream of audio data when a playback device is hijacked away from streaming device 1410.

In some implementations, a playback device 1420 can prevent a streaming device 1440 from hijacking a connection to playback device 1420. For example, playback device 1420 can receive from streaming device 1410 information indicating the type of media item being streamed from streaming device 1410 to playback device 1420. If the media item is of a particular type (e.g., a movie), playback device 1420 can refuse a streaming media connection requested by another streaming device (e.g., streaming device 1440). Thus, the user or users of streaming device 1410 can continue to enjoy the media item (e.g., movie) being played by streaming device 1410 uninterrupted. Playback device 1420 can send a notification to streaming device 1440 indicating the reason for the refused connection. Streaming device 1440 can then present a message indicating the reason for the refused connection on a display associated with streaming device 1440 or through speakers (e.g., using speech) associated with streaming device 1440.

In some implementations, streaming device 1410 can automatically reconnect to playback device 1420. For example, streaming device 1410 can be configured to automatically hijack the connections to playback devices identified in the last media routing configuration for playback device 1420 stored by routing manager 1412. For example, when streaming device 1410 receives user input indicating that streaming device 1410 should present a media item, streaming device 1410 can determine the playback devices identified in the last (e.g., previous) media routing configuration (e.g., playback device 1420 and/or playback device 1430) and re-hijack the media streaming connections to playback devices 1420 and 1430, as necessary. For example, streaming device 1410 can re-hijack the connection to playback device 1420 thereby establishing streaming connection 1406 and terminating connection 1442 between streaming device 1440 and playback device 1420, as indicated by dashed line 1444.

In some implementations, this automatic hijacking mechanism can be implemented by a group of streaming devices 1410. For example, a dynamic playback group can be created that includes multiple streaming devices 1410. Each streaming device 1410 can be configured to stream media data to a different set of playback devices. When the group receives input to start presenting a media item, each streaming device 1410 (e.g., video streaming devices) can re-hijack their respective last playback devices and present the media item. An example of this could include a multi-television environment (e.g., sports bar, home with multiple TVs, etc.) where each streaming device 1410 presents video for the media item on respective televisions simultaneously while streaming audio output for the media item to wireless speakers (e.g., playback devices).

Dynamic Media Routing

Figure 15:
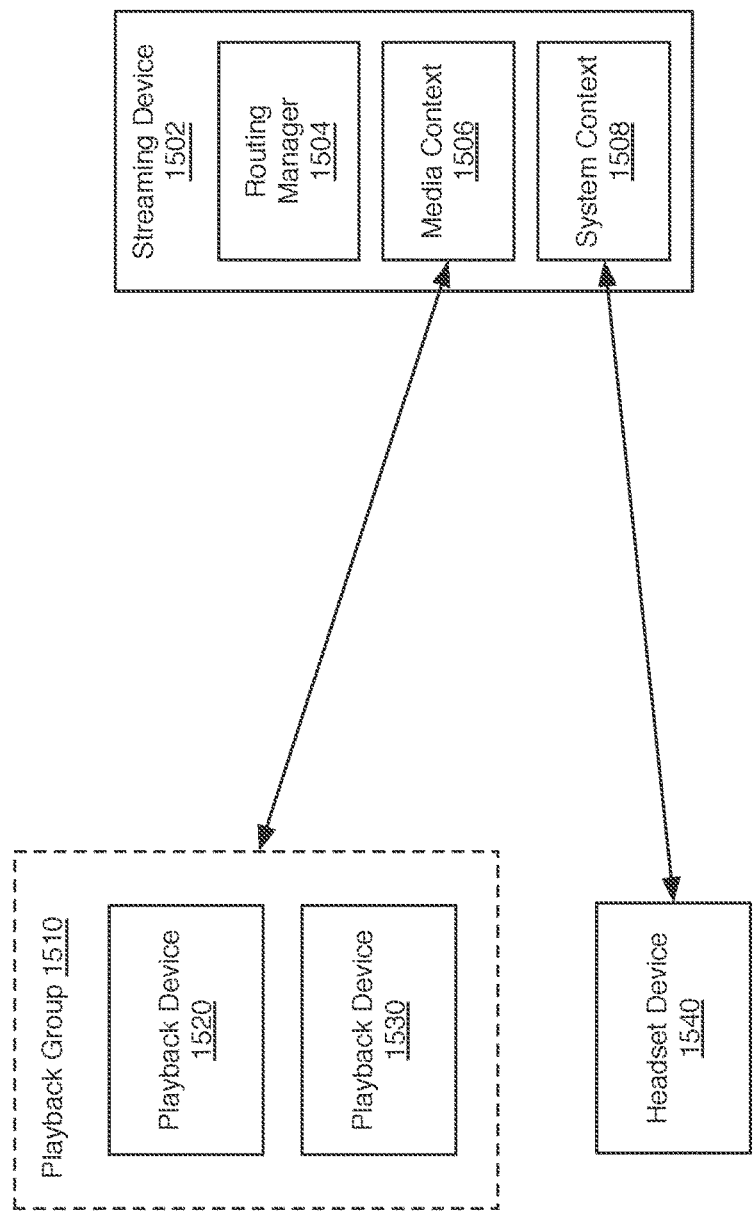
FIG. 15 is a block diagram of an example media system configured to dynamically route media data to playback devices.

FIG. 15 is a block diagram of an example media system 1500 configured to dynamically route media data to playback devices. For example, media system 1500 can correspond to media system 1400 described above. In some implementations, Media system 1500 can be configured to dynamically route media data (e.g., audio data, video data, etc.) to playback devices based on media data source contexts.

In some implementations, media system 1500 can include streaming device 1502. For example, streaming device 1502 can correspond to streaming device 510 and/or playback device 320 described above. For example, in some instances, streaming device 1502 can be a playback device 320 that performs the media streaming functions described with reference to streaming device 510.

In some implementations, streaming device 1502 can include routing manager 1504. For example, routing manager 1504 can correspond to session manager 330 described above. Routing manager 1504 can manage a repository of routing information describing available playback devices (e.g. playback devices 1420, 1430, etc.), current connections between streaming device 1410 and other devices, previous connections between streaming device 1410 and other devices, and/or playback group configurations (e.g., which playback devices are in which room of a house, which playback devices are in which dynamic and/or persistent playback groups, etc.). Routing manager 1504 can be configured with rules that define how to route media data based on media data source contexts, playback devices connections, type of playback device that is connected to streaming device 1502, and/or other criteria.

In some implementations, routing manager 1504 can route media data corresponding to media context 1506 to playback devices and/or playback groups while presenting media data corresponding to system context 1508 locally on or by streaming device 1502. For example, a user can provide input to streaming device 1502 indicating that streaming device 1502 should stream media data to playback group 1510. For example, playback group 1510 (e.g., dynamic playback group, persistent playback group, etc.) can include playback device 1520 and/or playback device 1530. Routing manager 1504 can determine a context (e.g., media context 1506, system context 1508) for media data generated by streaming device 1502 and stream the media data to playback group 1510 based on the context. For example, routing manager 1504 can stream media data corresponding to media context 1506 to playback group 1510 while presenting media data corresponding to system context 1508 locally by streaming device 1502 or a personal playback device (e.g., a headset, small personal speaker, small personal display screen, etc.) connected to streaming device 1502. For example, while streaming device 1502 is streaming audio for a movie to playback group 1510 for presentation, operating system input sounds (e.g., clicks) generated by streaming device 1502 can be presented by streaming device 1502. If streaming device 1502 is part of a persistent playback group (e.g., considered one logical device), then media data corresponding system context 1508 can be presented by each device in the persistent playback group.

In some implementations, routing manager 1504 can route media data corresponding to media context 1506 to playback devices and/or playback groups while presenting media data corresponding to system context 1508 locally on or by streaming device 1502. For example, a user can provide input to streaming device 1502 indicating that streaming device 1502 should stream media data to playback group 1510. For example, playback group 1510 (e.g., dynamic playback group, persistent playback group, etc.) can include playback device 1520 and/or playback device 1530. Routing manager 1504 can determine a context (e.g., media context 1506, system context 1508) for media data generated by streaming device 1502 and stream the media data to playback group 1510 based on the context. For example, routing manager 1502 can stream media data corresponding to media context 1506 to playback group 1510 while presenting media data corresponding to system context 1508 locally by streaming device 1502 or a personal playback device (e.g., a headset, small personal speaker, small personal display screen, etc.) connected to streaming device 1502. For example, while streaming device 1502 is streaming audio for a movie to playback group 1510 for presentation, operating system input sounds (e.g., clicks) generated by streaming device 1502 can be presented by streaming device 1502. If streaming device 1502 is part of a persistent playback group (e.g., considered one logical device), then media data corresponding system context 1508 can be presented by each device in the persistent playback group.

In some implementations, media system 1500 can include headset device 1540. For example, headset device 1540 can be a particular type of playback device 320. Headset device 1540 can be a personal playback device worn on or in the ears of a user of streaming device 1502, for example. Routing manager 1504 can determine how to route media data corresponding to media context 1506 and/or system context 1508 based on the type of playback device (e.g., headset, speakers, etc.) connected to streaming device 1502. For example, routing manager 1504 can implement special routing rules for headset playback devices, as described below.

In some implementations, routing manager 1504 can send media data corresponding to system context 1508 to headset device 1540. For example, if streaming device 1502 is a personal device (e.g., single user device, a smartphone, smart watch, etc.), then routing manager 1504 can route (e.g., send), media data corresponding to system context 1508 to headset device 1540 when headset device 1540 is connected to streaming device 1502.

In some implementations, routing manager 1504 can be configured with time-based rules for routing media data. For example, streaming device 1502 can be configured with a time period to playback device/playback group mapping that defines which playback devices to route media data to at corresponding times of the day. In a particular example, routing manger 1504 can be configured with a daytime routing configuration and a nighttime (e.g., 8 pm-9 am) routing configuration. The daytime routing configuration can specify that during the daytime time period (e.g., 9 am-8 pm), media data streamed from streaming device 1502 should be routed to a 5.1 surround sound speaker group (e.g., dynamic playback group, persistent playback group, etc.). The nighttime routing configuration can specify that during the night time period (e.g., 8 pm-9 am), media data streamed from streaming device 1502 should be routed to a single playback device or small group of playback devices (e.g., stereo pair, dynamic playback group, persistent playback group, etc.). The daytime and/or nighttime routing configuration can specify other playback parameters, including audio volume for the playback devices (e.g., higher volume during the daytime period, lower volume during the nighttime period).

In some implementations, routing manager 1502 can be configured with time-based rules for routing media data. For example, streaming device 1502 can be configured with a time period to playback device/playback group mapping that defines which playback devices to route media data to at corresponding times of the day. In a particular example, routing manger 1504 can be configured with a daytime routing configuration and a nighttime (e.g., 8 pm-9 am) routing configuration. The daytime routing configuration can specify that during the daytime time period (e.g., 9 am-8 pm), media data streamed from streaming device 1502 should be routed to a 5.1 surround sound speaker group (e.g., dynamic playback group, persistent playback group, etc.). The nighttime routing configuration can specify that during the night time period (e.g., 8 pm-9 am), media data streamed from streaming device 1502 should be routed to a single playback device or small group of playback devices (e.g., stereo pair, dynamic playback group, persistent playback group, etc.). The daytime and/or nighttime routing configuration can specify other playback parameters, including audio volume for the playback devices (e.g., higher volume during the daytime period, lower volume during the nighttime period).

Figure 16:
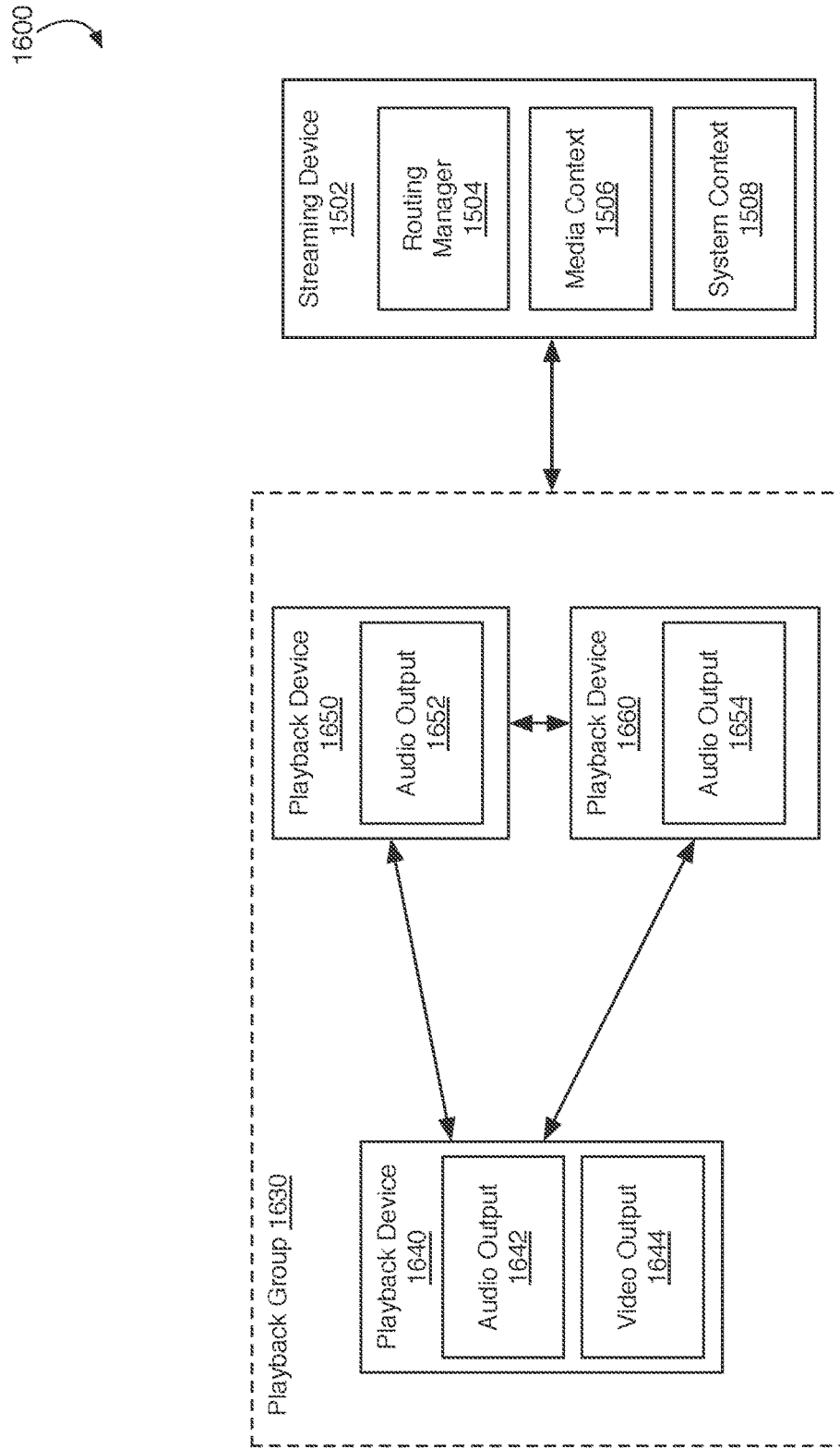
FIG. 16 is a block diagram of an example media system for dynamic routing based on playback device capabilities.

FIG. 16 is a block diagram of an example media system 1600 for dynamic routing based on playback device capabilities. For example, media system 1600 can correspond to media system 1500 described above. Media system 1600 can be configured to dynamically route media data to playback devices based on the capabilities of the respective playback devices. For example, streaming device 1502 can determine the routing of media data based on the playback capabilities of playback devices when streaming media data to a playback group (e.g. playback group 1630). Alternatively, the primary playback device (e.g., group leader) in a playback group can determine how to route media data received by the playback group based on the capabilities of playback devices in a playback group.

In some implementations, media system 1600 can include playback group 1630. For example, playback group 1630 can be a dynamic or persistent playback group. Playback group 1630 can include playback device 1640, playback device 1650, and/or playback device 1660. Each playback device can have different capabilities. For example, playback device 1640 may be capable of audio output 1642 (e.g., to speakers) and video output 1644 (e.g., to a display), while playback devices 1650 and/or 1660 may be capable of audio output 1652 and 1654, but not video output. The capabilities of each playback device can be reported or broadcast to the devices in playback group 1630 and/or streaming device 1502, for example. Thus, when streaming device 1502 streams a media item that includes audio and video data, streaming device 1502 can determine the playback capabilities of each device and route the media data for the media item accordingly. For example, streaming device 1502 can send audio and video media data to playback device 1640 while sending only audio media data to playback devices 1650 and 1660.

Alternatively, streaming device 1502 can send audio and video media data for the media item to the primary device in playback group 1630. When the primary device (e.g., playback device 1650) receives the audio and video media data, the primary device can determine the playback capabilities of each device in playback group 1630 and route the media data for the media item accordingly. For example, playback device 1650 (e.g., primary device) can present the audio data for the media item and send audio and video media data to playback device 1640 while sending only audio media data to playback devices 1660.

In some implementations, each playback device in playback group 1630 can determine how to process received media data based on each device's capabilities. For example, each playback device in playback group 1630 can receive all of the media data (e.g., audio and/or video) for the media item streamed by streaming device 1502. Each device can present or not present the received audio media data and/or video media data based on each device's capabilities. Moreover, a playback device can determine which media presentation subsystems of the playback device to enable based on the received media data. For example, playback device 1640 can be configured for audio output 1642 and video output 1644. When playback device 1640 receives media data that includes audio and not video data, playback device 1640 can present the audio data while disabling video output. For example, playback device 1640 can provide audio output through speakers connected to playback device 1640 while keeping a connected display powered off.

Figure 17:
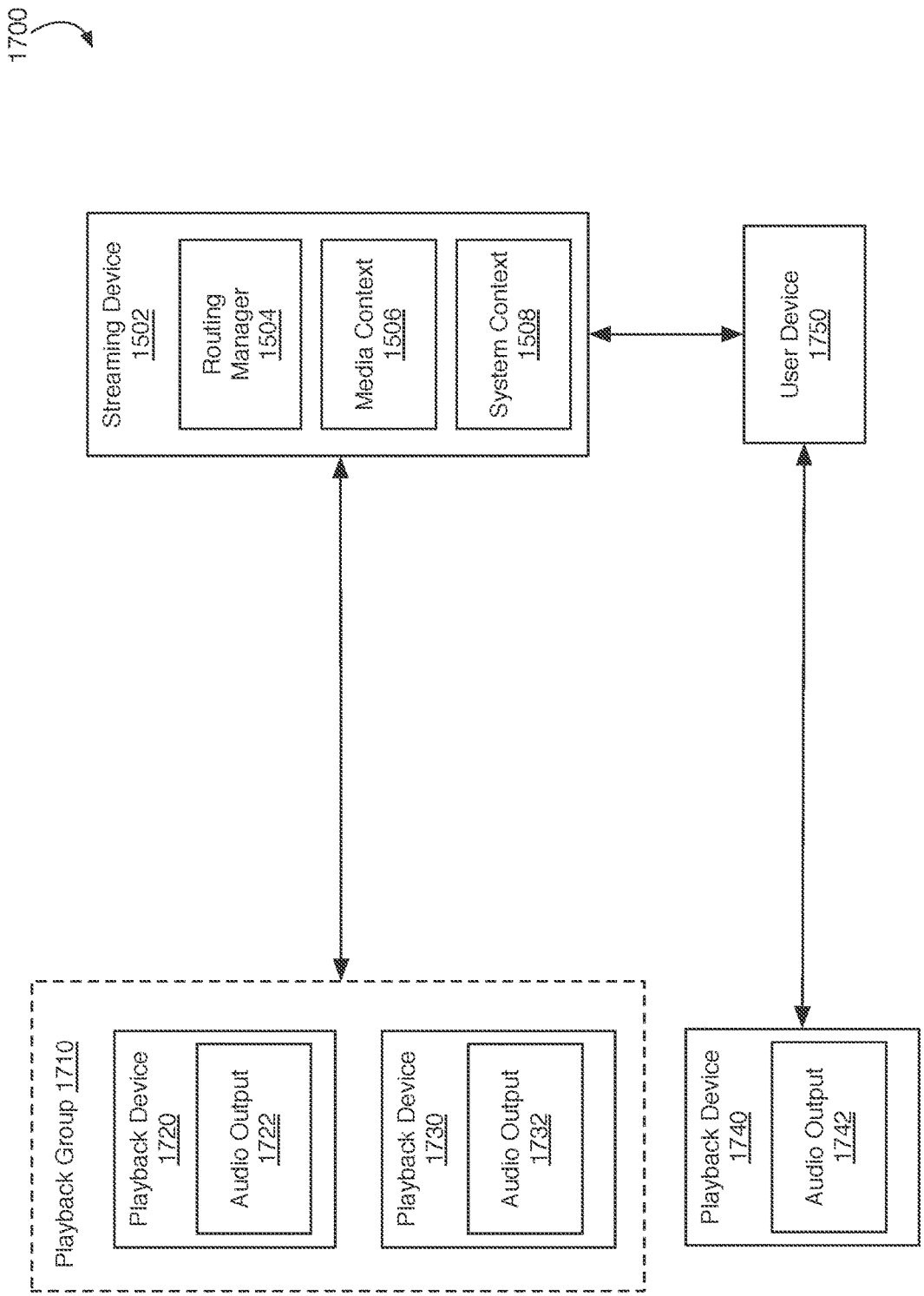
FIG. 17 is a block diagram of an example media system for providing access to media data in a second language.

FIG. 17 is a block diagram of an example media system 1700 for providing access to media data in a second language. For example, system 1700 can correspond to media system 1500 described above.

In some implementations, streaming device 1502 can be presenting a media item while streaming audio data for the media item to playback group 1710. Each playback device (e.g., playback device 1720, playback device 1730, etc.) in playback group 1710 (e.g., dynamic group, persistent group, etc.) can present audio output 1722, 1732 according to a language (e.g., English) configured in or by streaming device 1502.

In some implementations, the media item can include additional audio data that provides dialog in different languages. For example, the media item (e.g., a movie) can include dialog tracks (e.g., corresponding to speech translations for the dialog in the movie) in various languages (e.g., French, Chinese, Vietnamese, etc.).

A user (e.g., Chinese speaking user) of user device 1750 can provide input to connect user device 1750 to streaming device 1502. For example, when connected to streaming device 1502, user device 1750 can send information specifying the presentation language (e.g., Chinese) of user device 1750 to streaming device 1502. When the language specification for user device 1750 is received by streaming device 1502, routing manager 1504 can generate routing data indicating that Chinese language media data (e.g., Chinese dialog track for the movie) should be routed to user device 1750. Thus, while streaming device 1502 and/or playback group 1710 present the media item in the first language (e.g., English), streaming device 1502 can stream the media data (e.g., Chinese language dialog track) corresponding to the second language of user device 1750 to user device 1750.

A user (e.g., Chinese speaking user) of user device 1750 can provide input to connect user device 1750 to streaming device 1504. For example, when connected to streaming device 1502, user device 1750 can send information specifying the presentation language (e.g., Chinese) of user device 1750 to streaming device 1504. When the language specification for user device 1750 is received by streaming device 1502, routing manager 1503 can generate routing data indicating that Chinese language media data (e.g., Chinese dialog track for the movie) should be routed to user device 1750. Thus, while streaming device 1502 and/or playback group 1710 present the media item in the first language (e.g., English), streaming device 1502 can stream the media data (e.g., Chinese language dialog track) corresponding to the second language of user device 1750 to user device 1750.

In some implementations, media system 1700 can include playback device 1740. For example, playback device 1740 can be a headset, speaker, or other audio output device that provides audio output 1742. The user of user device 1750 can connect playback device 1740 to user device 1750 so that the second language media track received by user device 1750 from streaming device 1502 can be presented by playback device 1740. For example, the Chinese speaking user can wear a headset (playback device 1740) that presents dialog for a movie in Chinese, while watching the movie presented by streaming device 1502 on a television while other users listen to the movie dialog presented in English by playback group 1710.

Artificial Intelligence Interface

In some implementations, the media systems described herein can be configured to provide an artificial intelligence interface that can process spoken voice input provided by a user of the media systems. For example, the artificial intelligence (AI) interface can determine how to process media related input commands based on the type of media item, the playback groups (e.g., dynamic playback groups, persistent playback groups, etc.), and/or the specific playback devices specified in the user's voice input. For example, the spoken voice input can be received by a streaming device (e.g., streaming device 1502) through an AI interface of the streaming device.

In some implementations, streaming device 1502 can receive a voice input command to play a media item everywhere. For example, "everywhere" can include all playback devices connected to a network environment (e.g., home, work, etc.) or associated with an environment (e.g., home, work, etc.) configured in home application 332. In some implementations, "everywhere" can include all playback devices for which routing manager 1504 has connection and/or routing information. When streaming device 1502 receives the "play everywhere" command with respect to a media item, routing manager 1504 can determine how to route the media item based on the type of media item. For example, if the media item is an audio media item (e.g., music, audiobook, podcast, etc.), then routing manager 1504 can stream the audio media item to all playback devices capable of audio output, as described above. Alternatively, if the media item is an audio media item (e.g., music, audiobook, podcast, etc.), then routing manager 1504 can stream the audio media item only to playback devices capable of only audio output. If the media item is an audio/video media item (e.g., movie, television show, etc.), then routing manager 1504 can stream the audio media item to all playback devices capable of audio output or video output, as described above.

In some implementations, streaming device 1502 can receive a voice input command to play a media item to a playback group or playback groups. For example, when streaming device 1502 receives a "play to group" voice command, routing manager 1504 can determine, based on the playback group data stored on streaming device 1504, the playback devices associated with the playback group identified in the voice command. For example, the playback group can correspond to a dynamic group, a persistent group, a room group, or any other type of configured group. Streaming device 1502 can then stream the media item identified in the voice input command to the specified group. In some implementations, routing manager 1504 can stream the media item to the playback devices in the specified group based on the output capabilities of the playback devices, as described above.

In some implementations, streaming device 1502 can receive a voice input command to play a media item to specific types of devices. For example, the different types of devices can include set-top-boxes, smart speakers, specific models of devices, etc. The voice input command can specify that streaming device 1502 should send the media item to all set-top-boxes or all streaming devices for example. When streaming device 1502 receives the voice input command, routing manager 1504 can determine which playback devices correspond to the specified type of device and stream the media item identified in the voice input command to the playback devices of the specified type.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 18:
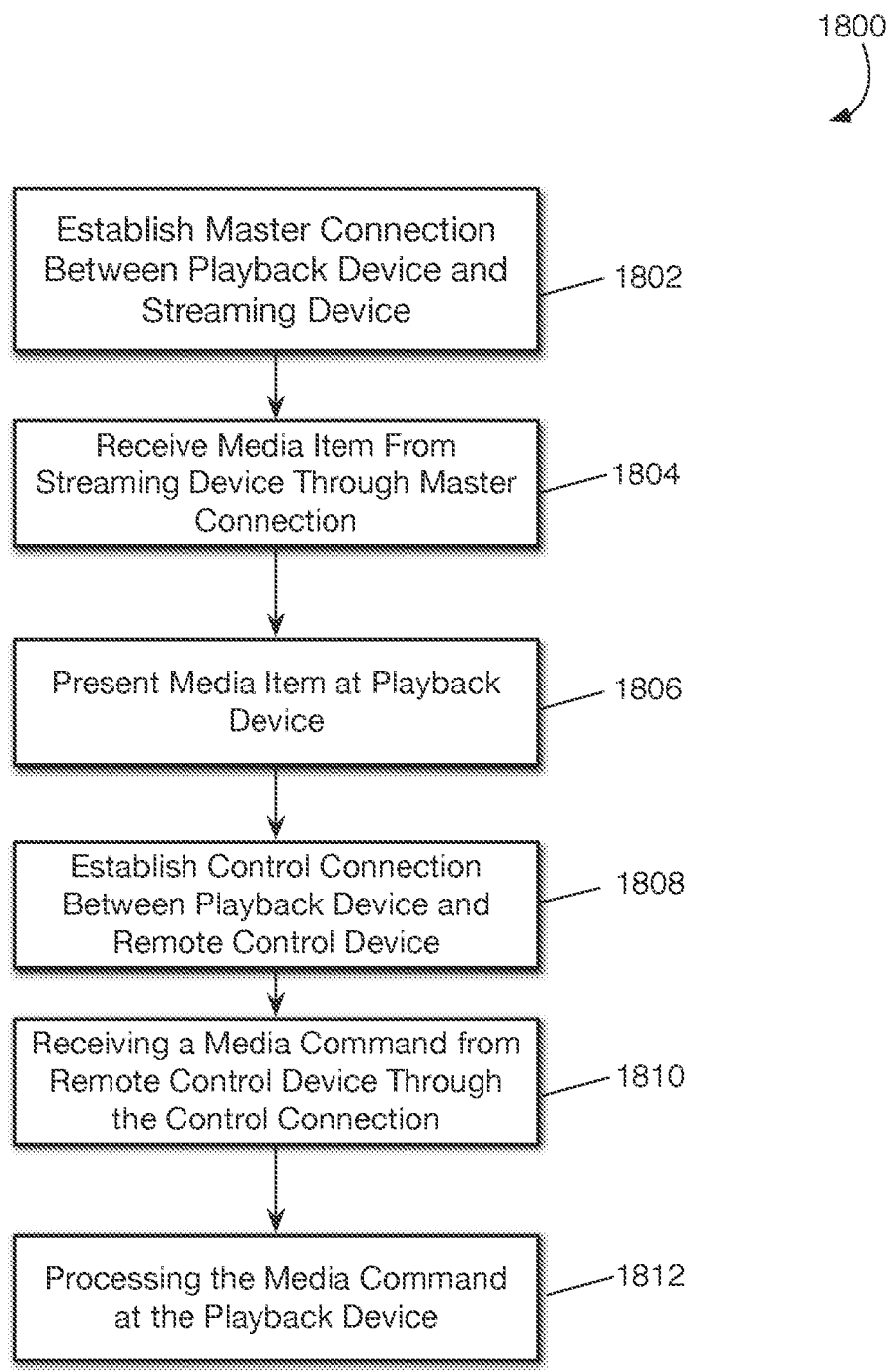
FIG. 18 is flow diagram of an example process 1800 for remotely controlling a playback device.

FIG. 18 is flow diagram of an example process 1800 for remotely controlling a playback device. For example, process 1800 can be performed by a playback device to allow a remote control device to provide remote control commands through a control connection while the playback device maintains an active streaming connection (e.g., master connection) with a streaming device. The remote control connection and the master connection can be separate connections that have separate functionality. For example, the remote control connection can be used to receive commands from remote control devices and/or send state information to the remote control devices without interrupting, impacting, or hijacking the master connection. The master connection can be used to receive streaming media data from the streaming device and/or communicate with the streaming device.

At step 1802, the playback device can establish a master connection between the playback device and the streaming device. For example, the playback device can broadcast a message advertising its availability to other devices. The message can include data that receiving devices (e.g., streaming device) can use to connect to the playback device. For example, the message can include a device identifier for the playback device that can be used by the streaming device to connect to the playback device over a local area network, wi-fi network, or some other network to which both the playback device and the streaming device are connected. When the streaming device receives the advertisement, the streaming device can present a graphical user interface identifying the playback device. The user of the streaming device can then select the playback device as the playback device for a selected media item or other media data. After receiving the user's selection of the playback device, the streaming device can communicate with the playback device to establish the master connection. Since playing multiple media items simultaneously at the playback device would make for an unpleasant experience for the user, the playback device may only manage a single master connection at a time.

At step 1804, the playback device can receive a media item from the streaming device through the master connection. For example, the streaming device can stream the media item to the playback device through the master connection, send the entire media item through the master connection, or send a reference (e.g., link, URL, etc.) to the media item through the master connection. Thus, when this specification describes sending or streaming media items from a streaming device to a playback device, the sending or streaming can be performed by streaming the media item to the playback device through the master connection, sending the entire media item through the master connection, or sending a reference (e.g., link, URL, etc.) to the media item that the playback device can use to obtain the media item. Alternatively, the streaming device can send an identifier for the media item to the playback device through the master connection and the playback device can obtain the media item from another source (e.g., a network source, locally from storage on the playback device, etc.).

At step 1806, the playback device can present the media item at the playback device. For example, if the media item is an audio media item (e.g., music), then the playback device can play the audio media item through speakers of the playback device. If the media item is a video media item, then the playback device can present the media item using a display of the playback device.

At step 1808, the playback device can establish a control connection between the playback device and a remote control device. For example, the remote control device can receive the advertisement message broadcast by the playback device as described above. The remote control device can use the data in the advertisement message to send a message the playback device to establish a control connection that allows the remote control device to obtain playback status information and/or send commands that allows the remote control device to control the playback of a media item being presented by the playback device. Since multiple remote control devices may present playback status information and may provide remote control commands, the playback device may manage multiple control connections to multiple different remote control devices. Moreover, because the control connection is not a master connection, the control connection can be established without interrupting playback of the currently playing media item and without disrupting or hijacking the master connection.

At step 1810, the playback device can receive a media command from the remote control device through the control connection. For example, the media command can be a request for playback status information (e.g., identification of the currently playing media item, the position of playback in the media item, current volume level, functions supported by the application presenting the media item, capabilities of the playback device, etc.). The media command can be a playback control command that stops, starts, skips, fast forwards, rewinds, adjusts volume, or commands some other change to the playback of the currently playing media item.

At step 1812, the playback device can process the media command. For example, the playback device can process the media command by executing the media command locally at the playback device. For example, stop playback commands, status requests, etc., may be executed locally at the playback device. Alternatively, the playback device can process the media command by forwarding the media command to the streaming device through the master connection. For example, since the streaming device is the source of the media item, the streaming device is managing playback of the media item and may need to coordinate playback across multiple playback devices. Thus, the playback device may forward the media command (e.g., status request, skip command, fast forward command, pause command, volume adjustments, etc.) to the streaming device so that the streaming device can process the media command and make corresponding adjustments at the playback devices that are presenting the media item.

Figure 19:
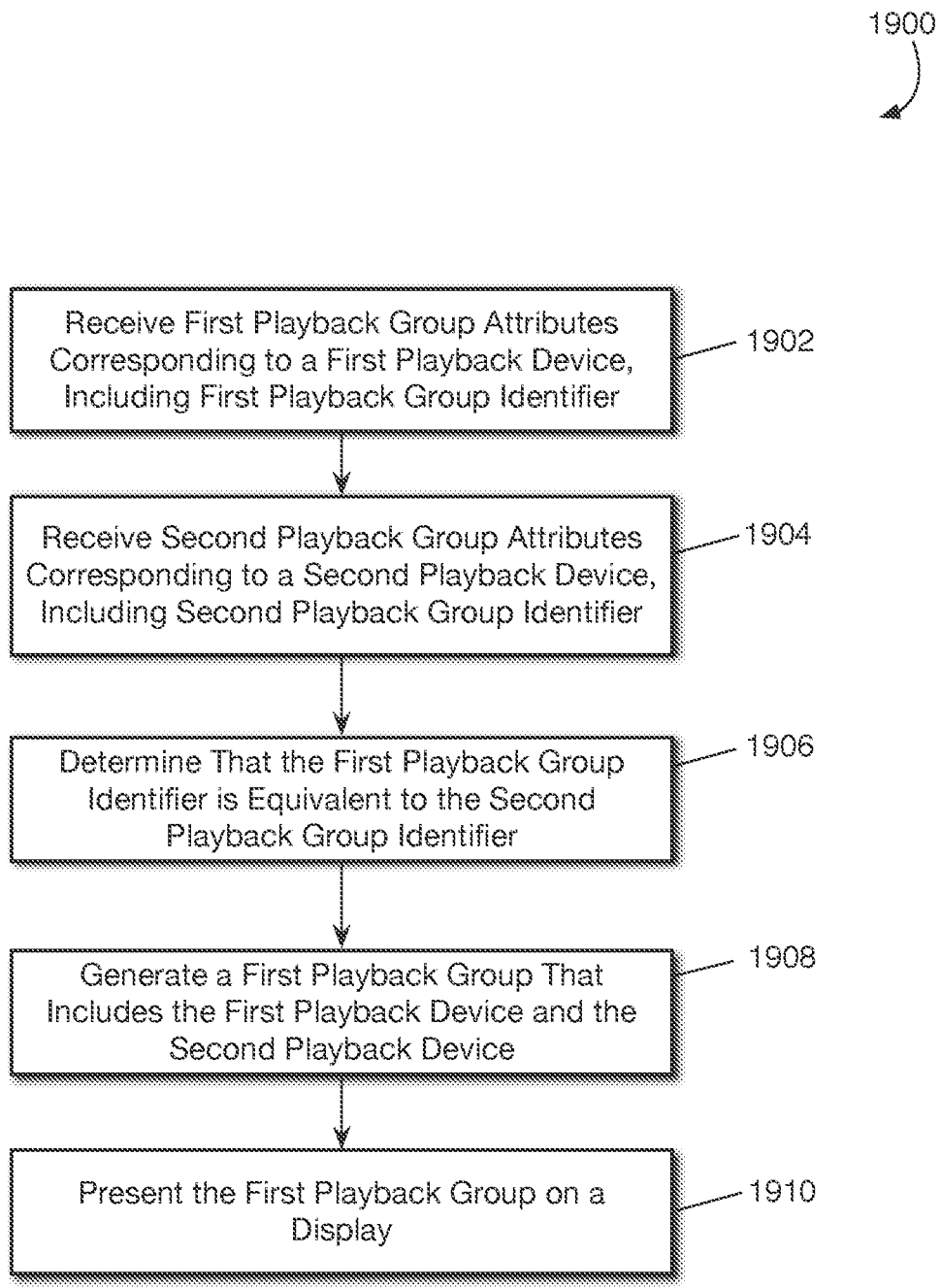
FIG. 19 is a flow diagram of an example process for managing playback groups.

FIG. 19 is a flow diagram of an example process 1900 for managing playback groups. For example, process 1900 can be performed by a computing device (e.g., a remote control device, a streaming device, etc.) to determine groupings of playback devices based on playback device attributes received from various playback devices. After the playback device groups are determined, the computing device can present the playback device groups on a display of the computing device and the user of the computing device can select a playback group to which to stream media items so that all playback devices in the selected group can present the user-selected media items.

At step 1902, the computing device can receive playback group attributes corresponding to a first playback device. For example, the computing device can receive the playback group attributes in a message broadcast by the playback device advertising the playback device's availability and/or capabilities. The playback group attributes can include a first playback group identifier. For example, the first playback group identifier can be a dynamic playback group identifier. The first playback group identifier can be a persistent playback group identifier. The playback group attributes can include other attributes as described above.

At step 1904, the computing device can receive playback group attributes corresponding to a second playback device. For example, the computing device can receive the playback group attributes in a message broadcast by the playback device advertising the playback device's availability and/or capabilities. The playback group attributes can include a second playback group identifier. For example, the second playback group identifier can be a dynamic playback group identifier. The second playback group identifier can be a persistent playback group identifier. The playback group attributes can include other attributes as described above.

At step 1906, the computing device can determine that the first playback group identifier is equivalent to the second playback group identifier. For example, the computing device can compare the first playback group identifier to the second playback group identifier and determine that the first playback group identifier and the second playback group identifier are identical and that the first playback device and the second playback device belong to the same playback device group.

At step 1908, the computing device can generate a first playback group that includes the first playback device and the second playback device. For example, the computing device can store playback group data indicates that the first playback device and the second playback device are in the same playback device group. The playback group data can also include information identifying the type of playback group (e.g., persistent, dynamic) and/or the capabilities of the playback devices in the playback group. In some implementations, a single playback device may belong to multiple dynamic playback groups. Thus, the second playback device may provide playback group attributes that identify multiple dynamic playback groups. Moreover, a single playback device may belong to both a persistent playback group and a dynamic playback group. For example, the persistent playback group that includes the second playback device may also be a playback device included in a dynamic playback group, as described above. Thus, the second playback device may provide playback group attributes that identify multiple dynamic playback groups and a single persistent playback group.

At step 1910, the computing device can present the first playback group on a display of the computing device. For example, the computing device can present the first playback device and the second playback device as a single entity or as a single device on a display of the computing device. This allows the user to make a single group selection, instead of selecting multiple playback devices, when the user wishes to send the playback of a media item to multiple playback devices. When the user selects a playback group, the computing device can send (e.g., stream) a user selected media item to the playback group so that each playback device in the selected playback group can synchronously present the media item with other playback devices in the same playback group, as described above.

Figure 20:
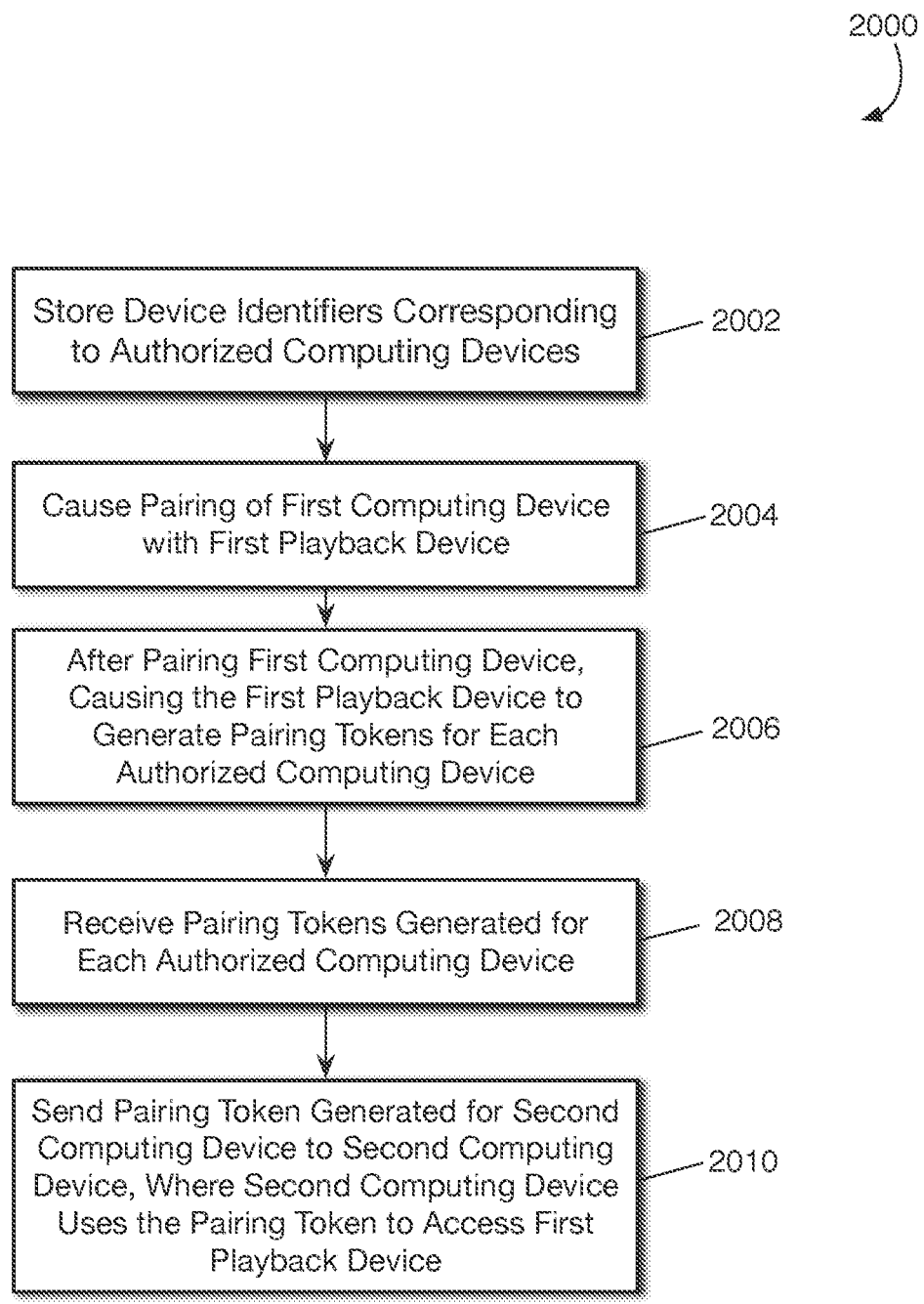
FIG. 20 is a flow diagram of an example process for efficiently pairing authorized user devices with a playback device.

FIG. 20 is a flow diagram of an example process 2000 for efficiently pairing authorized user devices with a playback device. For example, process 2000 can be performed by a user device (e.g., a streaming device, a remote control device, etc.). The user device can, for example, be configured with device identifiers (or user identifiers) for devices that are authorized to access or interact with playback devices within an environment (e.g., home environment, office environment, etc.). The environment can be defined based on geographic area. The environment can be defined based on networks used to manage or interact with playback devices within an environment. When the user device is paired with a playback device, the user device can send the authorized device identifiers to the playback device to cause the playback device to generating pairing tokens for the authorized device identifiers. Thus, user device can serve as a proxy for, and perform the pairing process on behalf of, the other authorized user devices.

At step 2002, the user device can store device identifiers corresponding to authorized computing devices. For example, an administrator or other authorized user of the environment can provide input to the user device, or another computing device, to identify users and/or user devices that are authorized to access playback devices within the environment. For example, the administrator (e.g., a parent) within a home environment can provide input to the user device to identify other users (e.g., spouse, children, friends, etc.) who should be allowed to access playback devices within the home environment. The user device can then store the device identifiers for the authorized computing devices in an authorized user database on the user device. This authorized user database, or individual records therein, may be shared or synchronized with the other authorized computing devices.

At step 2004, the user device can cause the user device to be paired with a first playback device. For example, the user of the user device (e.g., the first computing device) can provide input to the user device indicating that the user device should connect to, or pair with, the first playback device. The user device and the first playback device can perform a pairing process, e.g., including receiving user input of a pairing code, to pair the user device and the first playback device. If the pairing is successful, the first playback device can send a pairing token to the first playback device that the first playback device can use to access the services and/or functionality of the first playback device without having to perform the pairing process again. For example, the user device can include the pairing token in subsequent requests to the first playback device. The first playback device can determine that the user device is authorized to access the first playback device based on the pairing token, as described above.

At step 2006, the user device can cause the first playback device to generate pairing tokens for each authorized computing device. For example, after successfully pairing the user device with the playback device, the user device can automatically send the device identifiers for the authorized computing devices (e.g., other user devices) to the first playback device. When the authorized device identifiers are received, the first playback device can generate pairing tokens for each of the authorized device identifiers. Thus, by sending the authorized device identifiers to the first playback device to generate the pairing tokens, the user device has performed the pairing process on behalf of each of the identified authorized devices thereby saving the user's of the authorized devices the burden of having to go through the pairing process themselves which may be even more burdensome when pairing with multiple playback devices.

At step 2008, the user device can receive the pairing tokens generated for each authorized computing device. For example, after the first playback device generates the pairing tokens for each authorized device identifier, the first playback device can send to the user device data mapping each authorized device identifier to its respective pairing token. The user device can then store the mapping of device identifiers to pairing tokens in the authorized user database stored on the user device.

At step 2010, the user device can send a pairing token generated for a second computing device to the second computing device. For example, after performing the pairing process on behalf of the authorized computing devices, the user device can send the pairing tokens to each authorized computing device. For example, the pairing token generated for the second computing device by the first playback device can be sent to the second computing device. The second computing device can then use the pairing token to access the functionality, features, and/or services of the first playback device.

Although process 2000 is described with reference to a single playback device (e.g., first playback device), the environment may include multiple playback devices. Thus, process 2000 can be performed for each playback device within the environment to pair the authorized computing devices with each playback device without forcing the users of the authorized computing devices to go through the pairing process with each playback device. However, if a playback device that receives a pairing token from a computing device fails to validate the pairing token, or if the playback device does not have an identifier for the computing device stored on the playback device, then the playback device can prevent the computing device from accessing the playback device until the computing device performs a pairing process with the computing device that requires user input of a code or performs some other pairing process, as described above.

Figure 21:
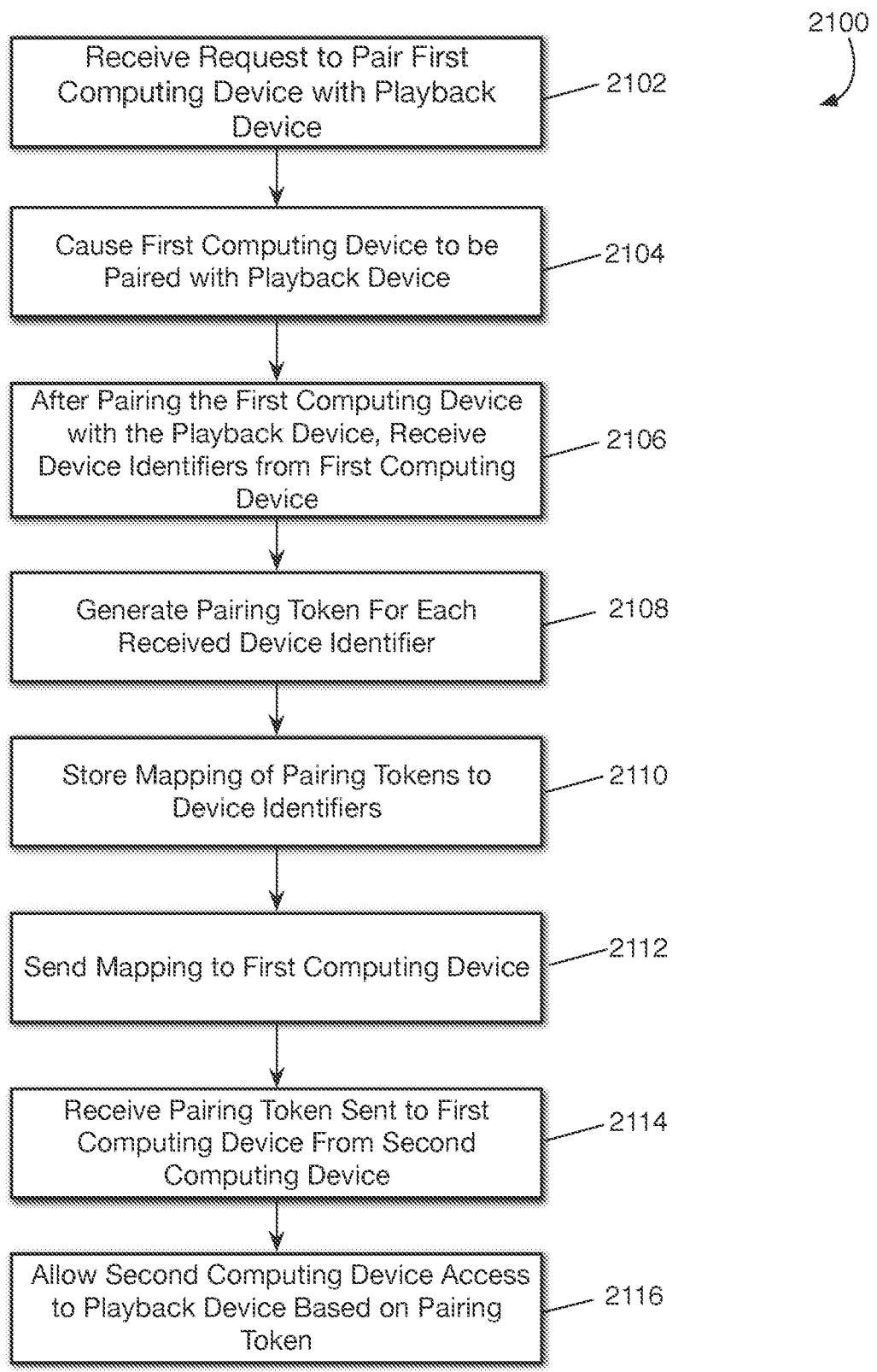
FIG. 21 is a flow diagram of an example process for generating pairing tokens for multiple user devices.

FIG. 21 is a flow diagram of an example process 2100 for generating pairing tokens for multiple user devices. For example, process 2100 can be performed by a playback device to generate pairing tokens for multiple authorized user devices (e.g. authorized computing devices) so that a separate, user involved pairing process does not have to be performed with each authorized user device.

At step 2102, the playback device can receive a request to pair a first computing device with the playback device. For example, the playback device can receive a request from a user device to pair the user device with the playback device.

At step 2104, the playback device can cause the first computing device to be paired with the playback device. For example, the playback device can present a code that a user of the user device (e.g., the first computing device) can enter into the user device. The user device can send the code to the playback device and if the playback device determines that the code received from the user device matches the code presented by the playback device, the playback device can generate a pairing token for the user device. The playback device can send the pairing token to the user device so that the user device can use the pairing token to access the playback device. Once the playback device sends the pairing token to the user device the devices are paired.

At step 2106, the playback device can receive device identifiers from the first computing device. For example, the paired user device can send the device identifiers for other authorized user devices (e.g., authorized computing devices) to the playback device to initiate pairing on behalf of the other authorized user devices. The user device can send the device identifiers after pairing with the playback device and/or along with the pairing token generated for the paired user device so that the playback device can determine that the user device is authorized to perform the pairing process on behalf of the other authorized user devices.

At step 2108, the playback device can generate a pairing token for each received device identifier. For example, the playback device can generate a unique pairing token for each identified authorized user device.

At step 2110, the playback device can store a mapping of pairing tokens to device identifiers. For example, the playback device can store a database (e.g., an authorized user database) that maps device identifiers to corresponding unique pairing tokens so that when a pairing token is later received from a computing device that is attempting to access the playback device, the playback device can compare the device identifier and pairing token provided by the computing device to the mapping to determine if the computing device is currently paired with the playback device.

At step 2112, the playback device can send the mapping to the first computing device. For example, the playback device can send the mapping of device identifiers to pairing tokens to the first computing device. The first computing device can then distribute the pairing tokens to the appropriate authorized computing devices, as described above.

At step 2114, the playback device can receive a pairing token sent to the first computing device from a second computing device. For example, the playback device can receive a particular pairing token and a device identifier from the second computing device. The playback device may receive a pairing token from the second computing device generated by the playback device even though the playback device may have never communicated with, or provide a pairing token to, the second computing device before.

At step 2116, the playback device can allow the second computing device access to the playback device based on the pairing token. For example, the playback device can compare the device identifier and the pairing token received from the second computing device to the device identifiers and pairing tokens stored in the authorized user database (e.g., mapping) stored on the playback device. If the pairing token-device identifier pair are found within the authorized user database, then playback device can allow the second computing device to access the playback device. If the device identifier is not found within the authorized user database, or if the token mapped to the device identifier does not match the received pairing token, then playback device can prevent the second computing device from accessing the playback device until the second computing device successfully pairs with the computing device.

Figure 22:
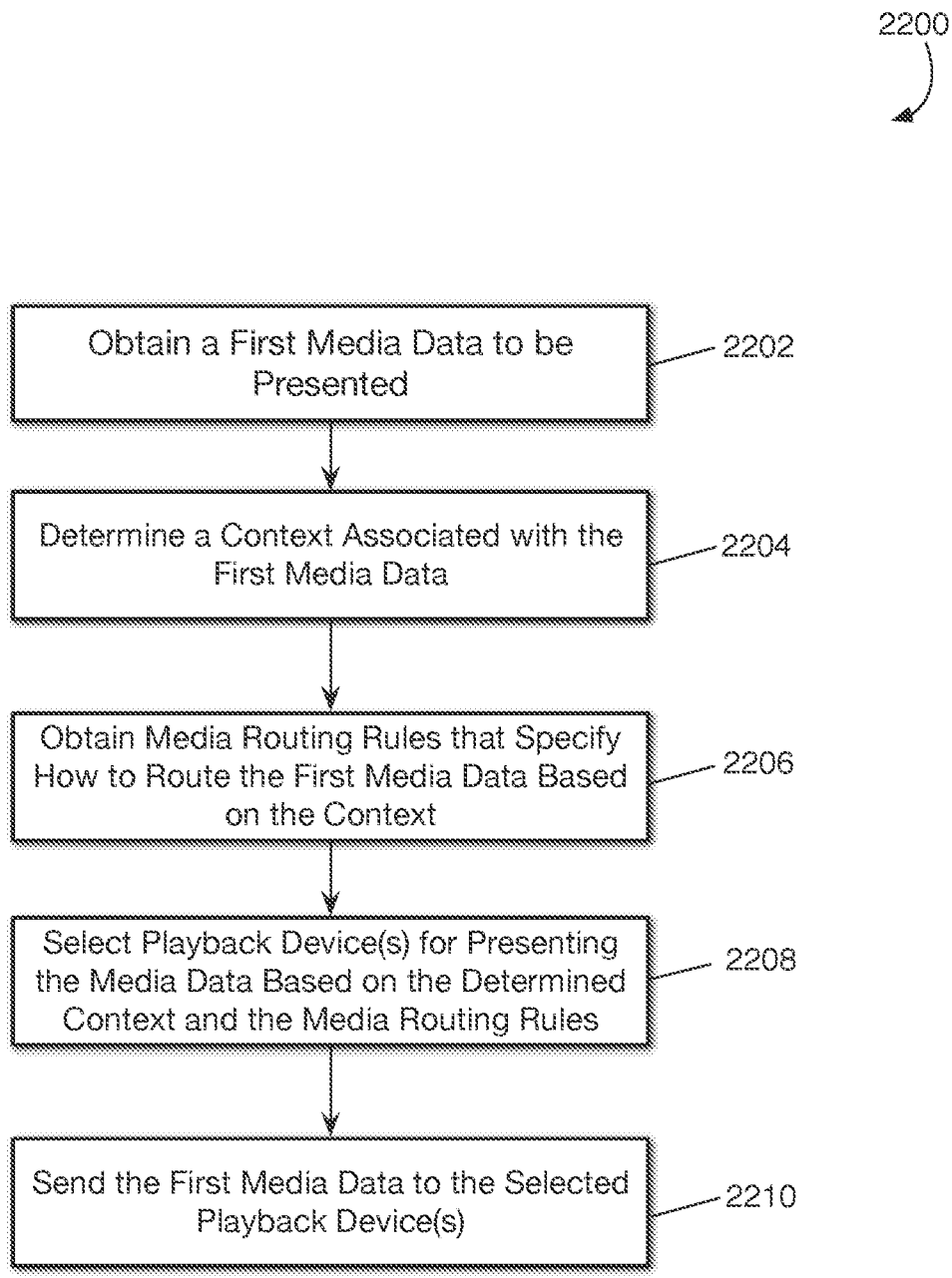
FIG. 22 is a flow diagram of an example process for contextual routing of media data.

FIG. 22 is a flow diagram of an example process 2200 for contextual routing of media data. For example, process 2200 can be performed by computing device (e.g., a streaming device) to route audio and/or video output associated with media items, software applications, and/or operating systems to an appropriate playback device.

At step 2202, the computing device can obtain a first media data to be presented. For example, the media data can correspond to a media item (e.g., movie, music, audio book, etc.). The media data can correspond to sounds or images generated by software, such as game application sounds, operating system sounds, etc. Thus, the computing device can obtain the first media data from software applications configured to present movies, music, etc., from gaming software applications, operating system software, or any other audio or video generating component of the computing device.

At step 2204, the computing device can determine a context associated with the first media data. For example, the context can be a system context associated with software generated sounds or images. The context can be a media context associated with the presentation of media items, such as movies, music, etc. The context can be determined based on the source of the media data. For example, if the source is a movie or music application, then the computing device can determine that the context is the media context. If the source is a game application or the operating system, then the computing device can determine that the context is the system context.

At step 2206, the computing device can obtain media routing rules that specify how to route the first media data based on the context. For example, the rules can specify that media data associated with the system context should be routed locally. For example, routing locally can include presenting the media data on the local computing device or presenting the media data through personal playback devices (e.g., headsets, personal speakers, personal display devices, etc.) connected to the local computing device. The rules can specify that media data associated with the media context should be routed to remote playback devices. For example, if the computing device is currently routing playback of media items to a remote playback device (or group of devices) or if the computing device has previously routed playback of media items to a remote playback device, then the computing device can route media data associated with the media context to the remote playback device.

At step 2208, the computing device can select a playback device or playback devices for presenting the media data based on the determined context and the media routing rules. For example, can compare the determined context to the media routing rules to determine which playback device to select for presenting the media data. Based on the rules, the computing device can select the computing device (e.g., local device and/or personal playback devices) as the playback device when the media data is associated with the system context. Based on the rules, the computing device can select a remote playback device (or group of playback devices) as the playback device when the media data is associated with the media context.

At step 2210, the computing device can send the first media data to the selected playback device or devices. For example, the computing device can send the first media data to the speakers and/or display of the computing device or personal playback devices connected to the computing device. The computing device can send the first media data to a remote playback device or group of playback devices for presentation.

In some implementations, the computing device can simultaneously route system context media data and media context media data. For example, the computing device may be streaming a movie to a remote playback group while presenting video game output on the display and through the speakers of the computing device. Thus, the computing device can process and route multiple instances of media data to different playback devices simultaneously.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 23:
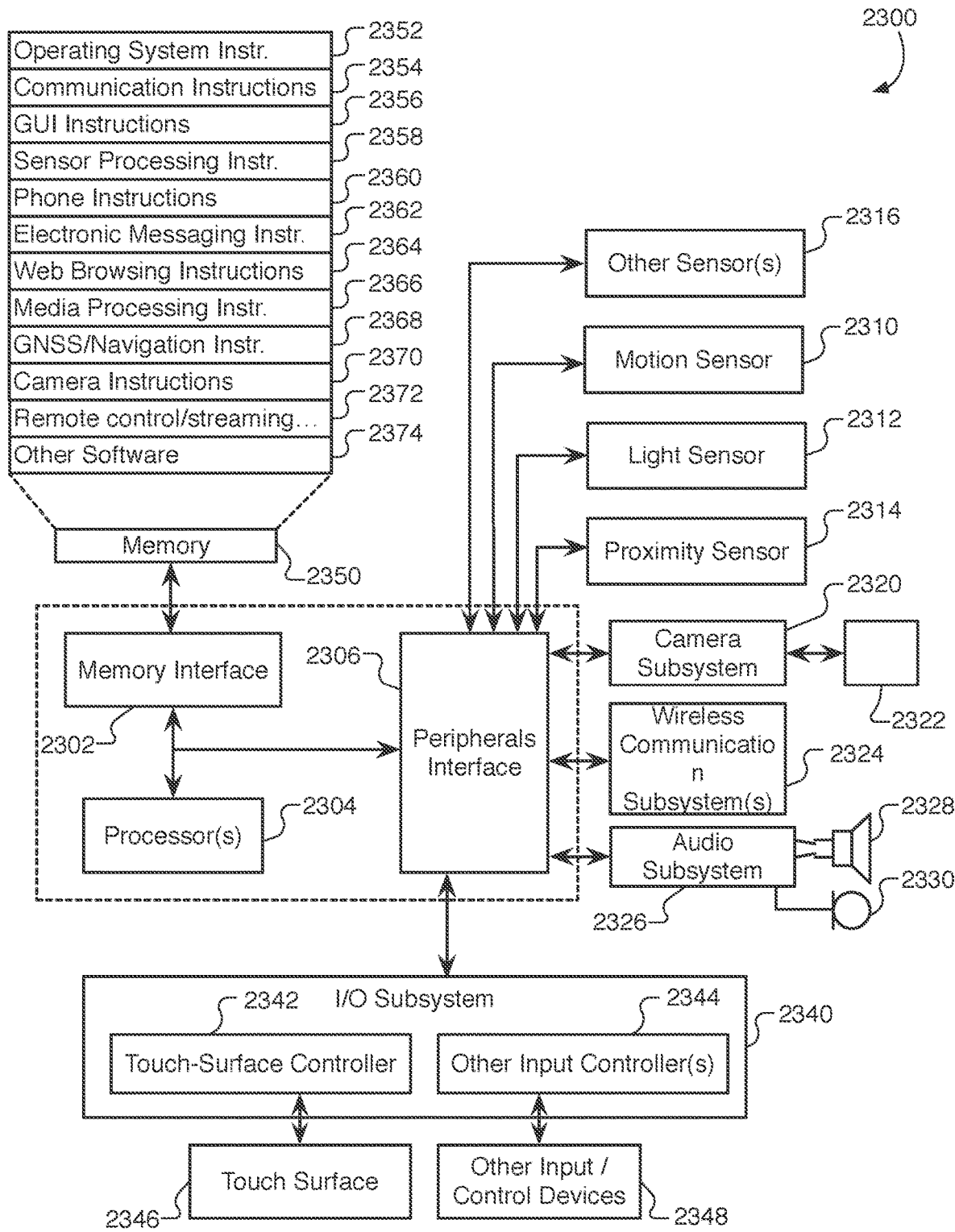
FIG. 23 is a block diagram of an example computing device that can implement the features and processes of FIGS. 1-22.

FIG. 23 is a block diagram of an example computing device 2300 that can implement the features and processes of FIGS. 1-22. The computing device 2300 can include a memory interface 2302, one or more data processors, image processors and/or central processing units 2304, and a peripherals interface 2306. The memory interface 2302, the one or more processors 2304 and/or the peripherals interface 2306 can be separate components or can be integrated in one or more integrated circuits. The various components in the computing device 2300 can be coupled by one or more communication buses or signal lines.

Sensors, devices, and subsystems can be coupled to the peripherals interface 2306 to facilitate multiple functionalities. For example, a motion sensor 2310, a light sensor 2312, and a proximity sensor 2314 can be coupled to the peripherals interface 2306 to facilitate orientation, lighting, and proximity functions. Other sensors 2316 can also be connected to the peripherals interface 2306, such as a global navigation satellite system (GNSS) (e.g., GPS receiver), a temperature sensor, a biometric sensor, magnetometer or other sensing device, to facilitate related functionalities.

A camera subsystem 2320 and an optical sensor 2322, e.g., a charged coupled device (CCD) or a complementary metal-oxide semiconductor (CMOS) optical sensor, can be utilized to facilitate camera functions, such as recording photographs and video clips. The camera subsystem 2320 and the optical sensor 2322 can be used to collect images of a user to be used during authentication of a user, e.g., by performing facial recognition analysis.

Communication functions can be facilitated through one or more wireless communication subsystems 2324, which can include radio frequency receivers and transmitters and/or optical (e.g., infrared) receivers and transmitters. The specific design and implementation of the communication subsystem 2324 can depend on the communication network(s) over which the computing device 2300 is intended to operate. For example, the computing device 2300 can include communication subsystems 2324 designed to operate over a GSM network, a GPRS network, an EDGE network, a Wi-Fi or WiMax network, and a Bluetooth™ network. In particular, the wireless communication subsystems 2324 can include hosting protocols such that the computing device 2300 can be configured as a base station for other wireless devices.

An audio subsystem 2326 can be coupled to a speaker 2328 and a microphone 2330 to facilitate voice-enabled functions, such as speaker recognition, voice replication, digital recording, and telephony functions. The audio subsystem 2326 can be configured to facilitate processing voice commands, voiceprinting and voice authentication, for example.

The I/O subsystem 2340 can include a touch-surface controller 2342 and/or other input controller(s) 2344. The touch-surface controller 2342 can be coupled to a touch surface 2346. The touch surface 2346 and touch-surface controller 2342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2346.

The other input controller(s) 2344 can be coupled to other input/control devices 2348, such as one or more buttons, rocker switches, thumb-wheel, infrared port, USB port, and/or a pointer device such as a stylus. The one or more buttons (not shown) can include an up/down button for volume control of the speaker 2328 and/or the microphone 2330.

In one implementation, a pressing of the button for a first duration can disengage a lock of the touch surface 2346; and a pressing of the button for a second duration that is longer than the first duration can turn power to the computing device 2300 on or off. Pressing the button for a third duration can activate a voice control, or voice command, module that enables the user to speak commands into the microphone 2330 to cause the device to execute the spoken command. The user can customize a functionality of one or more of the buttons. The touch surface 2346 can, for example, also be used to implement virtual or soft buttons and/or a keyboard.

In some implementations, the computing device 2300 can present recorded audio and/or video files, such as MP3, AAC, and MPEG files. In some implementations, the computing device 2300 can include the functionality of an MP3 player, such as an iPod™.

The memory interface 2302 can be coupled to memory 2350. The memory 2350 can include high-speed random-access memory and/or non-volatile memory, such as one or more magnetic disk storage devices, one or more optical storage devices, and/or flash memory (e.g., NAND, NOR).

The memory 2350 can store an operating system 2352, such as Darwin, RTXC, LINUX, UNIX, OS X, WINDOWS, or an embedded operating system such as VxWorks.

The operating system 2352 can include instructions for handling basic system services and for performing hardware dependent tasks. In some implementations, the operating system 2352 can be a kernel (e.g., UNIX kernel). In some implementations, the operating system 2352 can include instructions for performing voice authentication. For example, operating system 2352 can implement the features as described with reference to FIGS. 1-22.

The memory 2350 can also store communication instructions 2354 to facilitate communicating with one or more additional devices, one or more computers and/or one or more servers. The memory 2350 can include graphical user interface instructions 2356 to facilitate graphic user interface processing; sensor processing instructions 2358 to facilitate sensor-related processing and functions; phone instructions 2360 to facilitate phone-related processes and functions; electronic messaging instructions 2362 to facilitate electronic-messaging related processes and functions; web browsing instructions 2364 to facilitate web browsing-related processes and functions; media processing instructions 2366 to facilitate media processing-related processes and functions; GNSS/Navigation instructions 2368 to facilitate GNSS and navigation-related processes and instructions; and/or camera instructions 2370 to facilitate camera-related processes and functions.

The memory 2350 can store other software instructions 2372 to facilitate other processes and functions, such as the processes and functions as described with reference to FIGS. 1-22.

The memory 2350 can also store other software instructions 2374, such as web video instructions to facilitate web video-related processes and functions; and/or web shopping instructions to facilitate web shopping-related processes and functions. In some implementations, the media processing instructions 2366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2350 can include additional instructions or fewer instructions. Furthermore, various functions of the computing device 2300 can be implemented in hardware and/or in software, including in one or more signal processing and/or application specific integrated circuits.

We claim:

1. A method comprising:
   establishing, by a playback device of a group of playback devices, a wireless master connection with a streaming device, wherein the master connection is configured for the playback device to wirelessly receive media data corresponding to a media item from the playback device to enable presentation of the media item by one or more of the group of playback devices;
   receiving, by the playback device, the media data corresponding to the media item from the streaming device through the master connection;
   establishing, by the playback device, a control connection with a remote control device, wherein the control connection is configured for the playback device to receive media commands related to the media item from the remote control device;
   determining, by the playback device, respective capabilities of a first playback device and a second playback device in the group of playback devices;
   transmitting, by the playback device based on the respective capabilities of the first playback device, at least a first portion of the media data to the first playback device;
   transmitting, by the playback device based on the respective capabilities of the second playback device, at least a second portion of the media data to the second playback device;
   receiving, by the playback device, a media command from the remote control device through the control connection;
   transmitting, by the playback device, a first control command to the first selected playback device, the first control command being based on the media command; and
   transmitting, by the playback device, a second control command to the second selected playback device, the second control command being based on the media command;
   determining, by the playback device, respective capabilities of a first playback device and a second playback device in the group of playback devices;
   transmitting, by the playback device based on the respective capabilities of the first playback device, at least a first portion of the media data to the first playback device;
   transmitting, by the playback device based on the respective capabilities of the second playback device, at least a second portion of the media data to the second playback device;
   receiving, by the playback device, a media command from the remote control device through the control connection;
   transmitting, by the playback device, a first control command to the first playback device, the first control command being based on the media command; and
   transmitting, by the playback device, a second control command to the second playback device, the second control command being based on the media command.

2. The method of claim 1, further comprising, responsive to establishing the control connection between the playback device and the remote control device, automatically pairing one or more authorized user devices with the playback device.

3. The method of claim 1, wherein the control connection is established without disrupting the wireless master connection between the playback device and the streaming device.

4. The method of claim 1, wherein the respective playback devices in the playback group wirelessly download media data from the streaming device.

5. The method of claim 1, wherein the respective playback devices in the playback group receive media data from a playback group leader of the playback group.

6. The method of claim 5, wherein during establishment of the control connection, the playback device sends an indication to the remote control device specifying whether or not the playback device is the playback group leader of the playback group.

7. The method of claim 1, wherein the control connection is established in a pairing process without interrupting presentation of the media item on the playback device.

8. The method of claim 1, further comprising:
transmitting, by the playback device, to the remote control device, information identifying the playback device as a leader of the playback group, wherein the playback device receives the media command from the remote control device based on the information identifying the playback device as the leader of the playback group.

9. The method of claim 1,
wherein the first portion of the media data is different than the second portion of the media data; and
wherein the first control command is different than the second control command.

10. A system comprising:
one or more processors; and
a non-transitory computer readable medium including one or more sequences of instructions that, when executed by the one or more processors, cause the one or more processors to perform operations comprising:
establishing, by a playback device of a group of playback devices, a wireless master connection with a streaming device, wherein the master connection is configured for the playback device to wirelessly receive media data corresponding to a media item from the playback device to enable presentation of the media item by one or more of the group of playback devices;
receiving, by the playback device, the media data corresponding to the media item from the streaming device through the master connection;
establishing, by the playback device, a control connection with a remote control device, wherein the control connection is configured for the playback device to receive media commands related to the media item from the remote control device;
determining, by the playback device, respective capabilities of a first playback device and a second playback device in the group of playback devices;
transmitting, by the playback device based on the respective capabilities of the first playback device, at least a first portion of the media data to the first playback device;
transmitting, by the playback device based on the respective capabilities of the second playback device, at least a second portion of the media data to the second playback device;
receiving, by the playback device, a media command from the remote control device through the control connection;
transmitting, by the playback device, a first control command to the first playback device, the first control command being based on the media command; and
transmitting, by the playback device, a second control command to the second playback device, the second control command being based on the media command.

11. The system of claim 10, wherein the operations further comprise, responsive to establishing the control connection between the playback device and the remote control device, automatically pairing one or more authorized user devices with the playback device.

12. The system of claim 10, wherein the control connection is established without disrupting the wireless master connection between the playback device and the streaming device.

13. The system of claim 10, wherein the respective playback devices in the playback group wirelessly download media data from the streaming device.

14. The system of claim 10, wherein the respective playback devices in the playback group receive media data from a playback group leader of the playback group.

15. The system of claim 14, wherein during establishment of the control connection, the playback device sends an indication to the remote control device specifying whether or not the playback device is the playback group leader of the playback group.

16. The system of claim 10, wherein the control connection is established in a pairing process without interrupting presentation of the media item on the playback device.

17. A non-transitory computer readable medium including one or more sequences of instructions that, when executed by one or more processors, cause the one or more processors to perform operations comprising:
establishing, by a playback device of a group of playback devices, a wireless master connection with a streaming device, wherein the master connection is configured for the playback device to wirelessly receive media data corresponding to a media item from the playback device to enable presentation of the media item by one or more of the group of playback devices;
receiving, by the playback device, the media data corresponding to the media item from the streaming device through the master connection;
establishing, by the playback device, a control connection with a remote control device, wherein the control connection is configured for the playback device to receive media commands related to the media item from the remote control device;
determining, by the playback device, respective capabilities of a first playback device and a second playback device in the group of playback devices;
transmitting, by the playback device based on the respective capabilities of the first playback device, at least a first portion of the media data to the first playback device;
transmitting, by the playback device based on the respective capabilities of the second playback device, at least a second portion of the media data to the second playback device;
receiving, by the playback device, a media command from the remote control device through the control connection;
transmitting, by the playback device, a first control command to the first playback device, the first control command being based on the media command; and
transmitting, by the playback device, a second control command to the second playback device, the second control command being based on the media command.

18. The non-transitory computer readable medium of claim 17, wherein the operations further comprise, responsive to establishing the control connection between the playback device and the remote control device, automatically pairing one or more authorized user devices with the playback device.

19. The non-transitory computer readable medium of claim 17, wherein the control connection is established in a pairing process without disrupting the wireless master connection between the playback device and the streaming device and without interrupting presentation of the media item on the playback device.

20. The non-transitory computer readable medium of claim 17, wherein the respective playback devices in the playback group wirelessly download media data from the streaming device.

21. The non-transitory computer readable medium of claim 17, wherein the respective playback devices in the playback group receive media data from a playback group leader of the playback group.

22. The non-transitory computer readable medium of claim 21, wherein during establishment of the control connection, the playback device sends an indication to the remote control device specifying whether or not the playback device is the playback group leader of the playback group.

\* \* \* \* \*